ASSOCIATIVE MEMORY ORDERED RETRIEVAL

Filed Dec. 29, 1961 49 Sheets-Sheet 1

INVENTOR
ROBERT R. SEEBER
BY George Baran
ATTORNEY

FIG.2A1
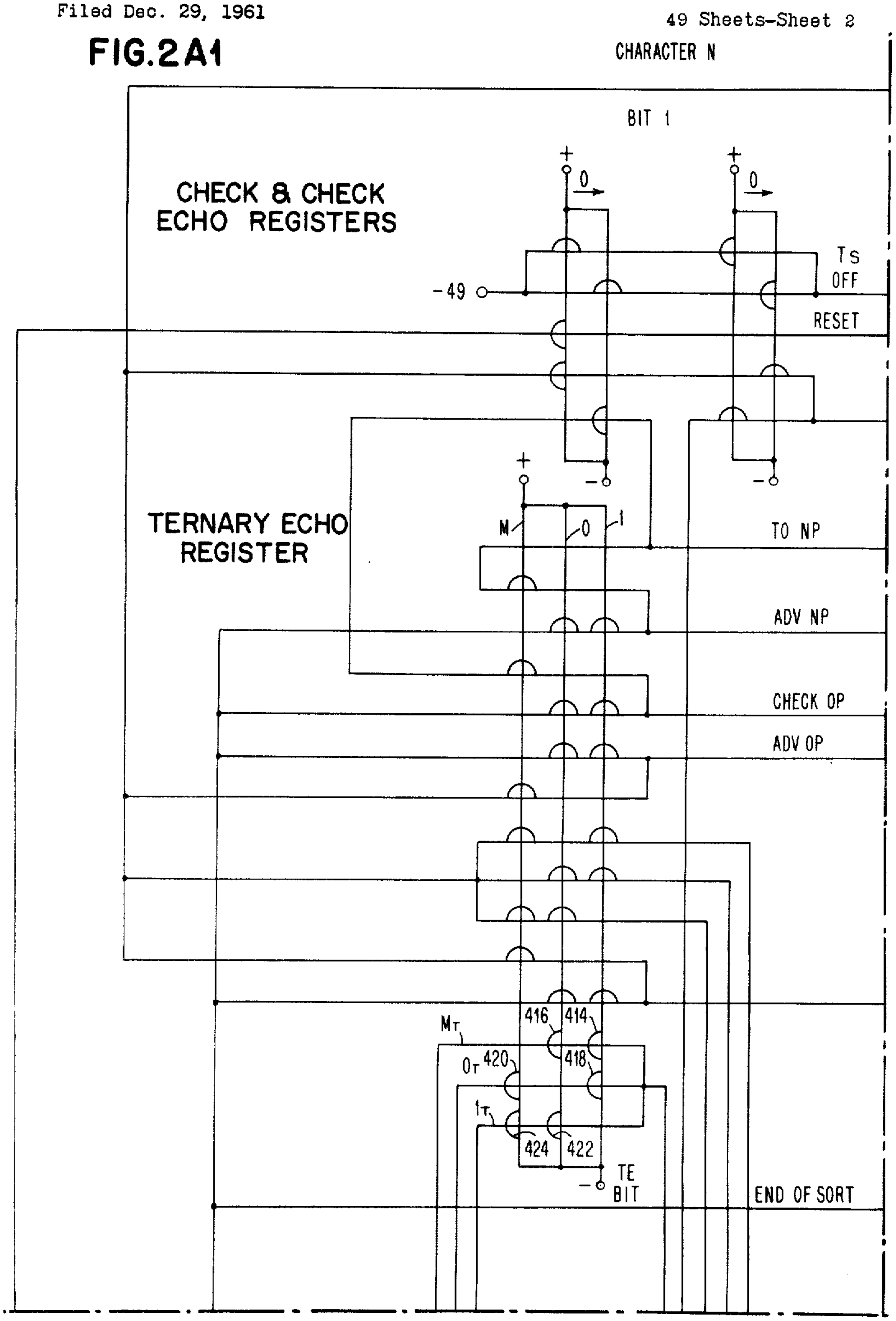

FIG.2A2
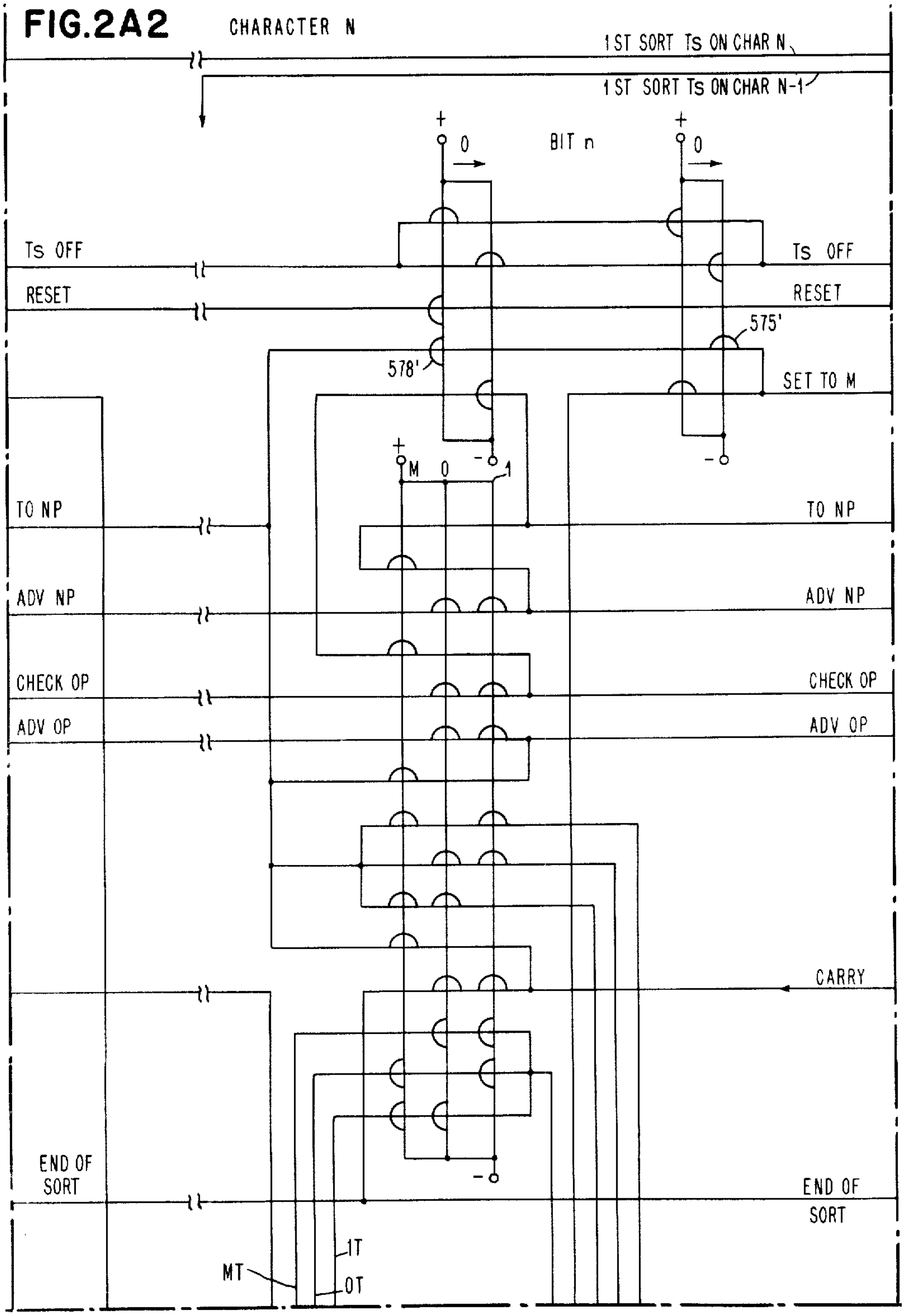

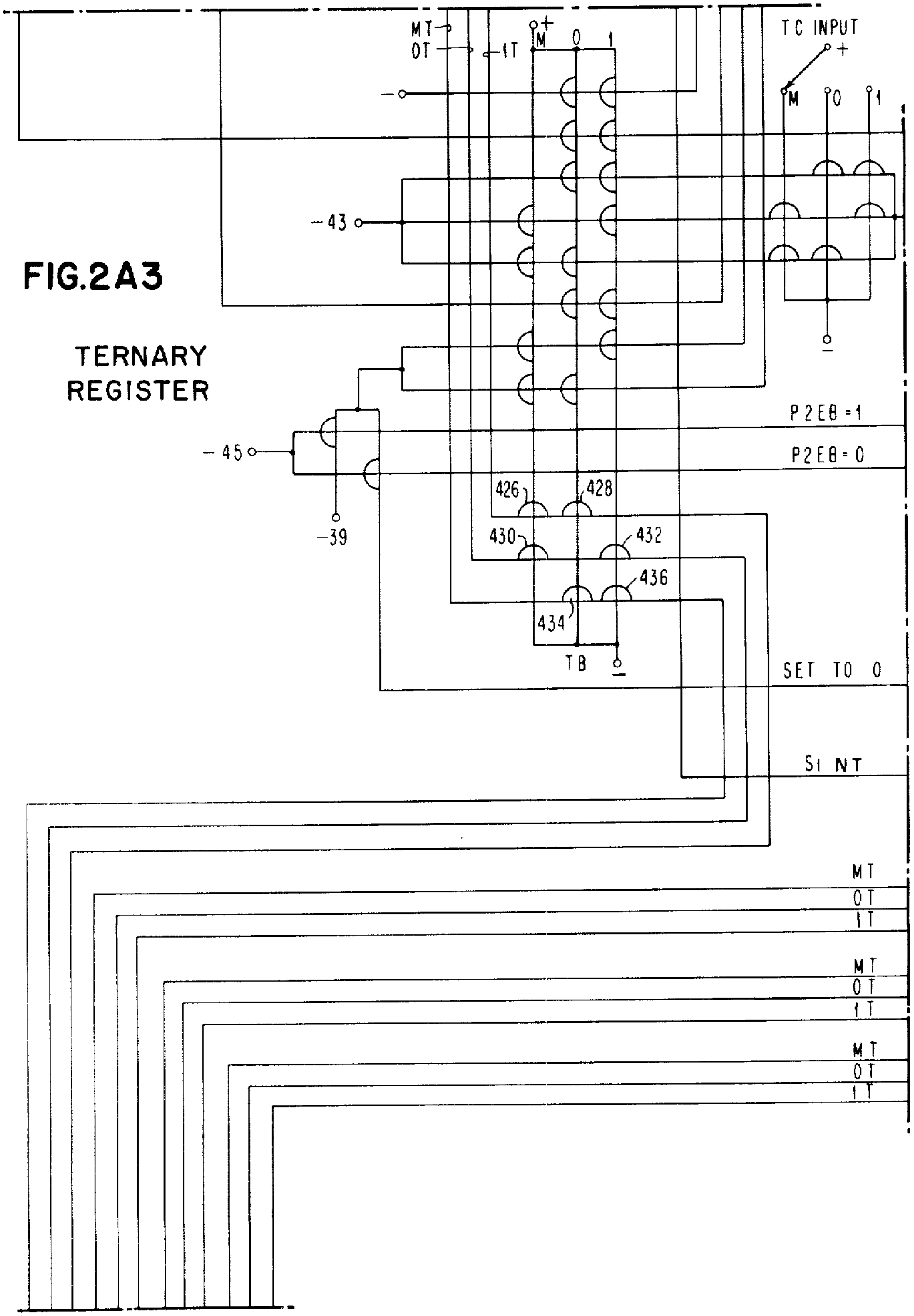
FIG. 2A3

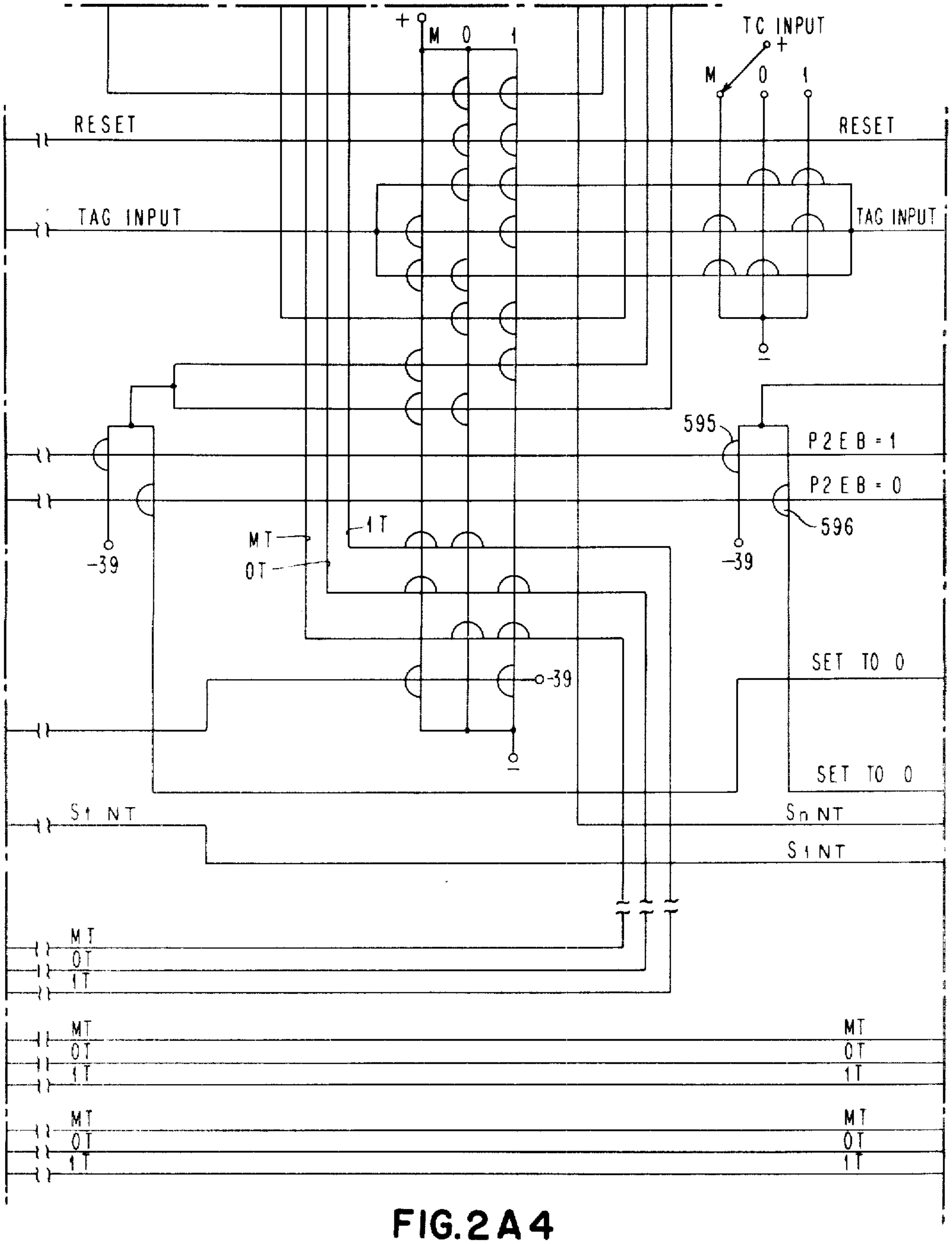
FIG. 2A4

May 3, 1966 R. R. SEEBER 3,249,921
ASSOCIATIVE MEMORY ORDERED RETRIEVAL
Filed Dec. 29, 1961 49 Sheets-Sheet 6
FIG. 2B1
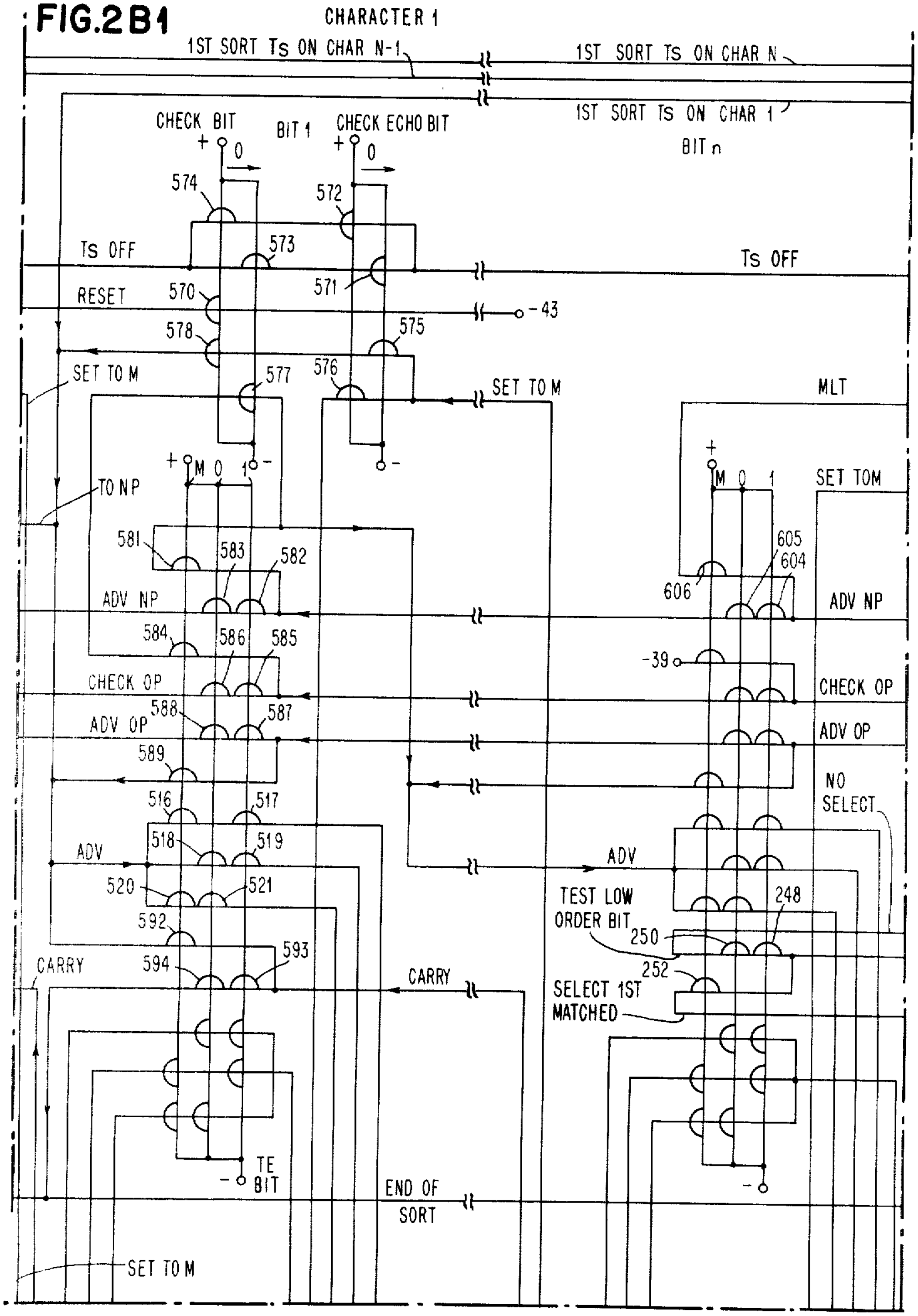

FIG. 2B2
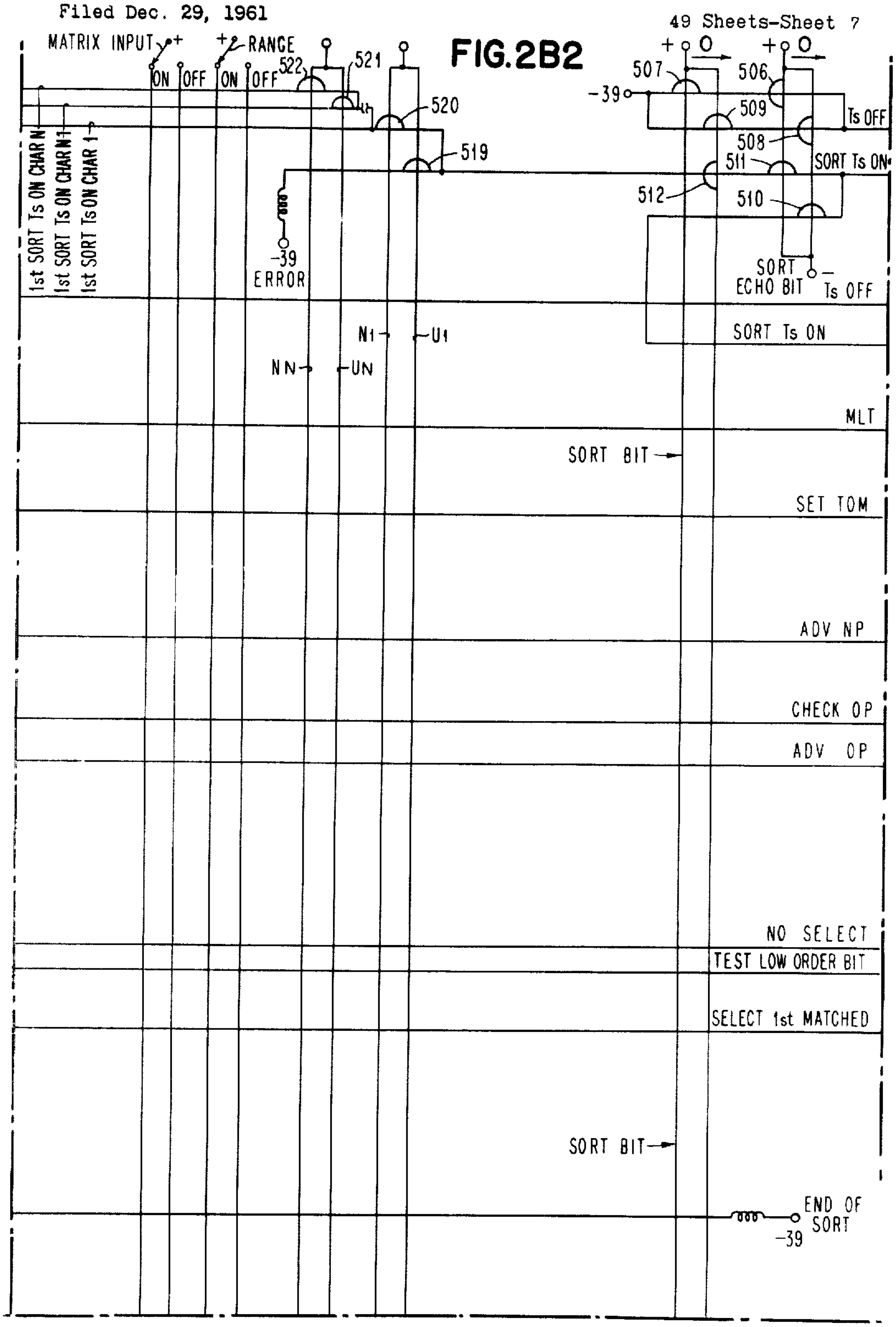

May 3, 1966 R. R. SEEBER 3,249,921
ASSOCIATIVE MEMORY ORDERED RETRIEVAL
Filed Dec. 29, 1961 49 Sheets-Sheet 8
FIG. 2B3
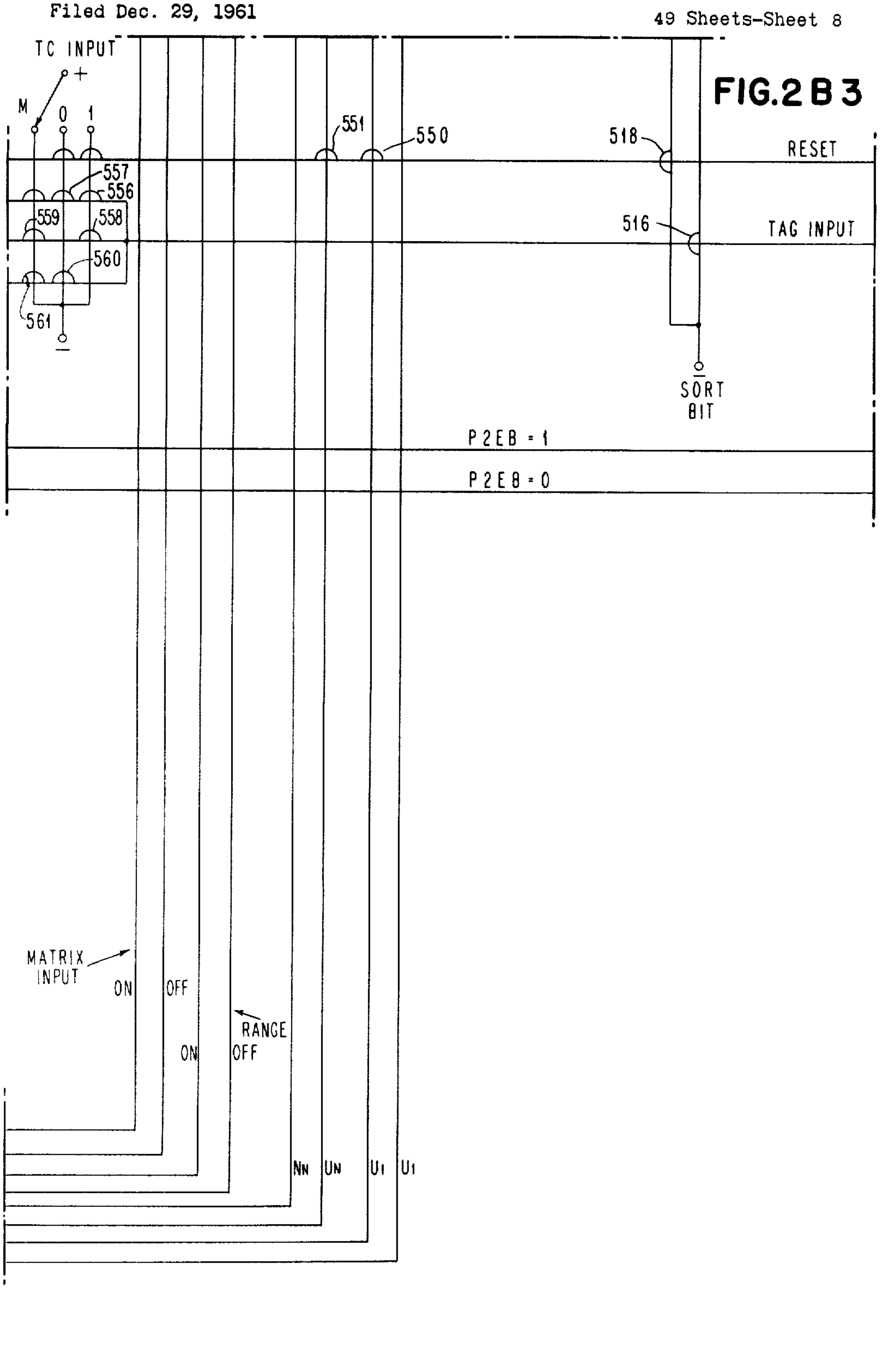

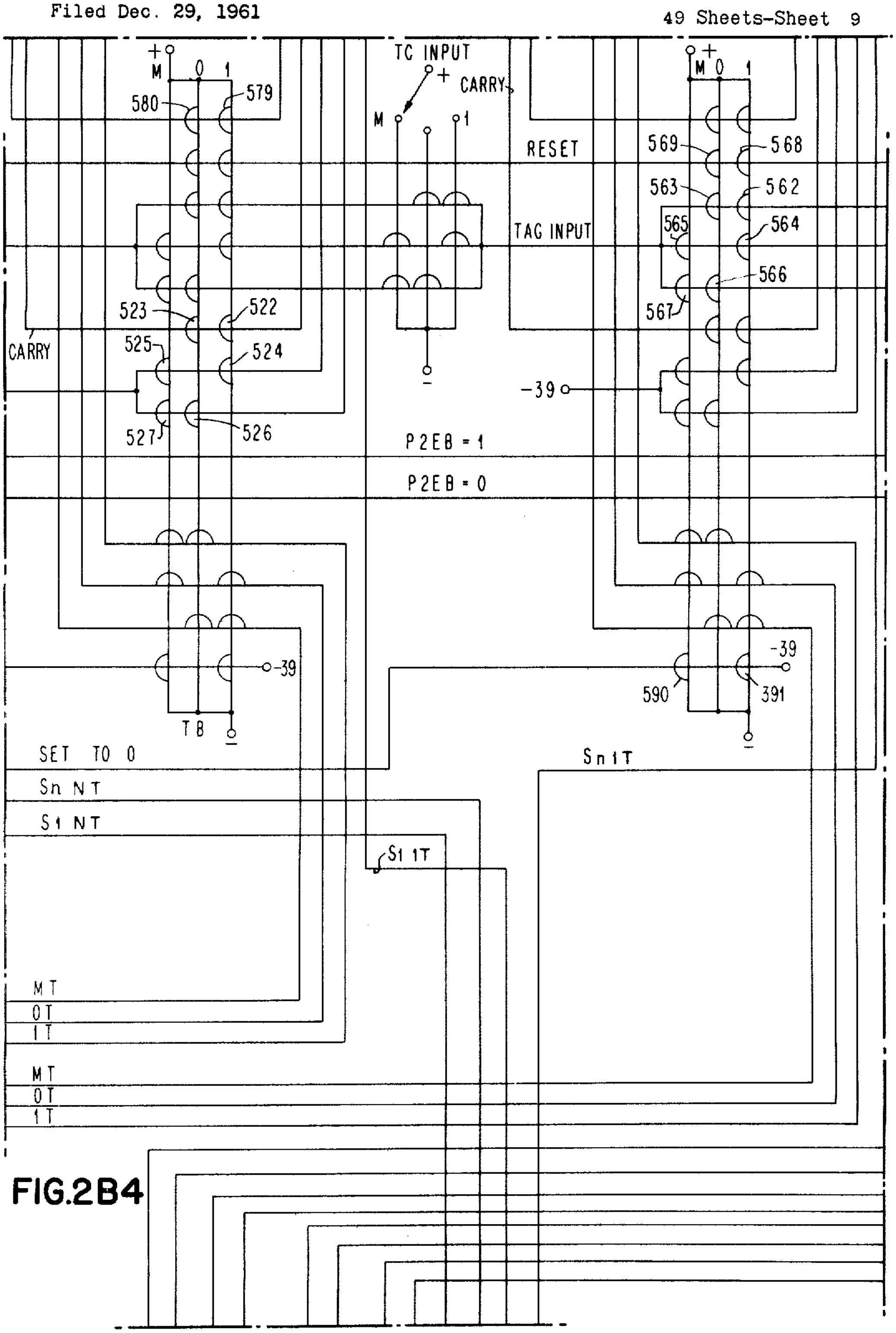
FIG.2B4

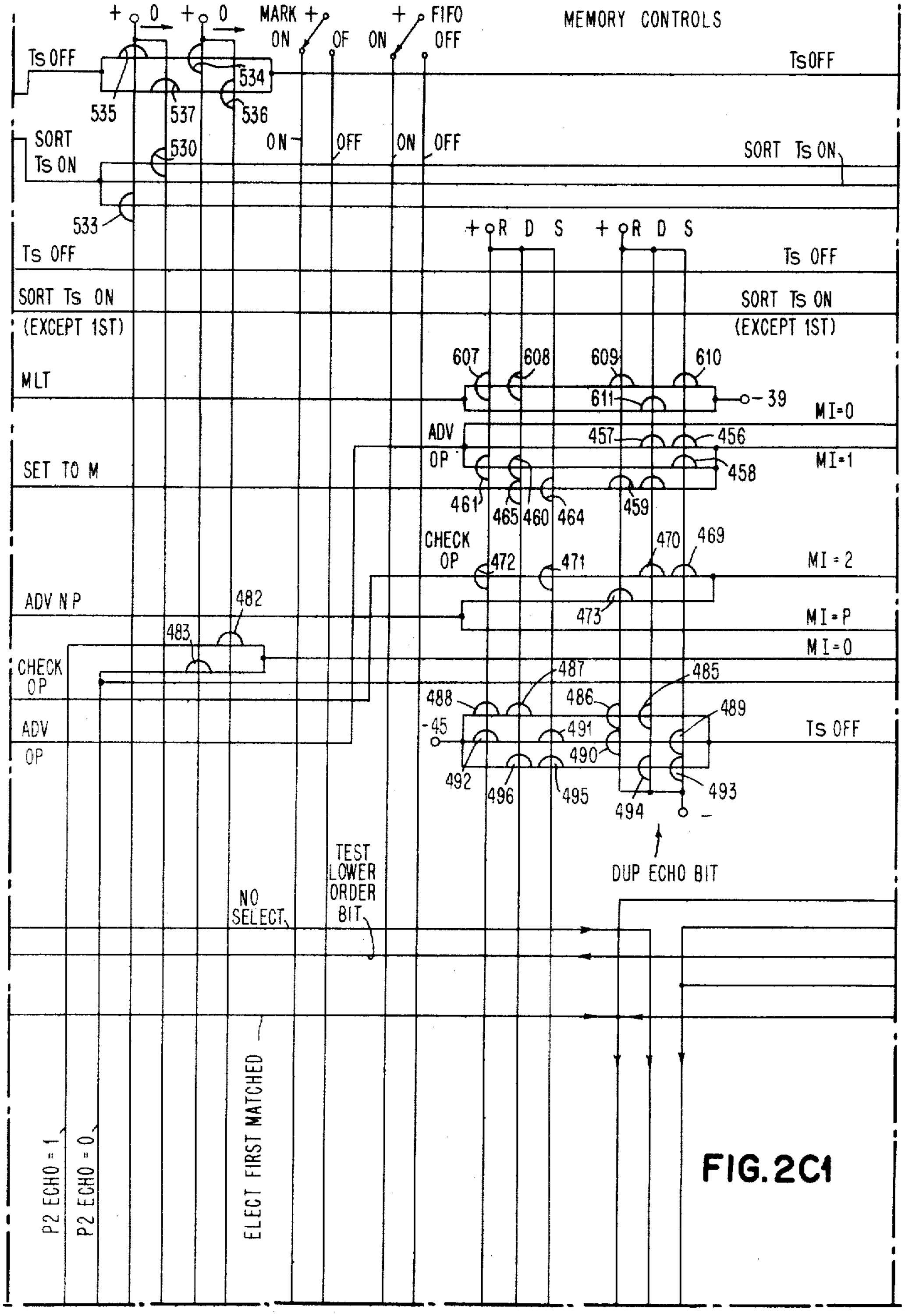
FIG. 2C1

May 3, 1966 R. R. SEEBER 3,249,921
ASSOCIATIVE MEMORY ORDERED RETRIEVAL
Filed Dec. 29, 1961 49 Sheets-Sheet 11
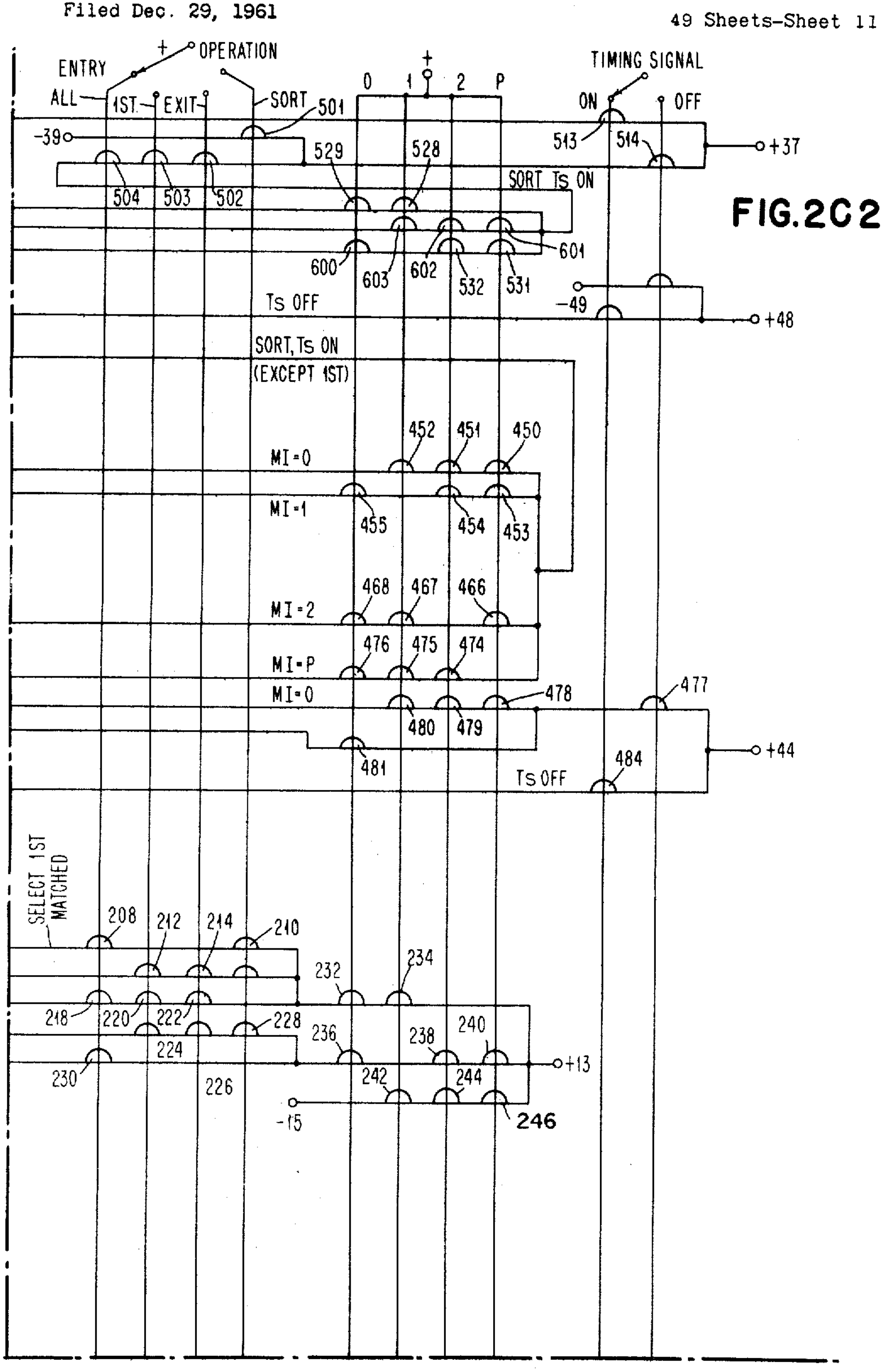
FIG. 2C2

May 3, 1966 R. R. SEEBER 3,249,921
ASSOCIATIVE MEMORY ORDERED RETRIEVAL
Filed Dec. 29, 1961 49 Sheets-Sheet 12
FIG.2C3
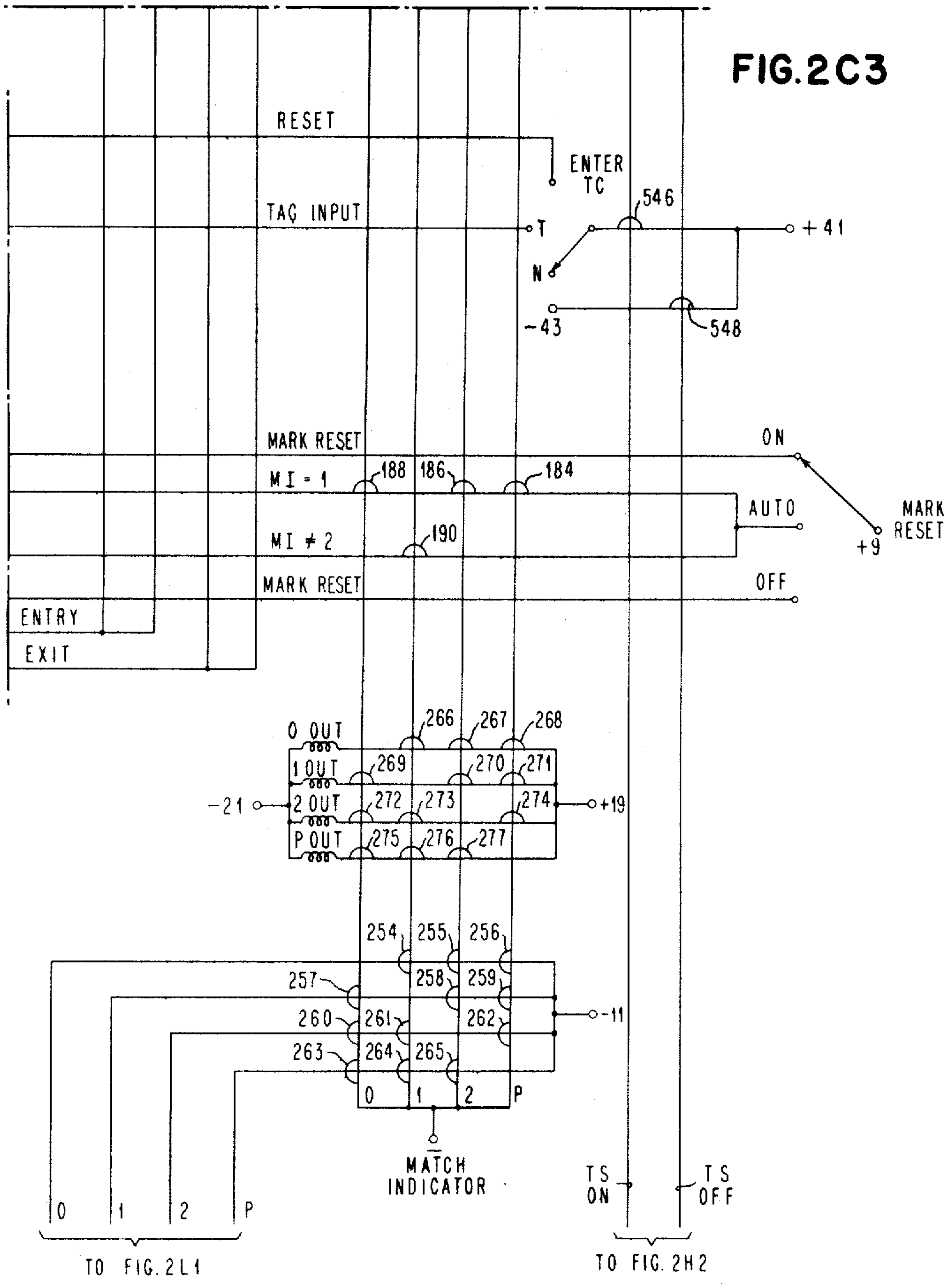

FIG. 2C4
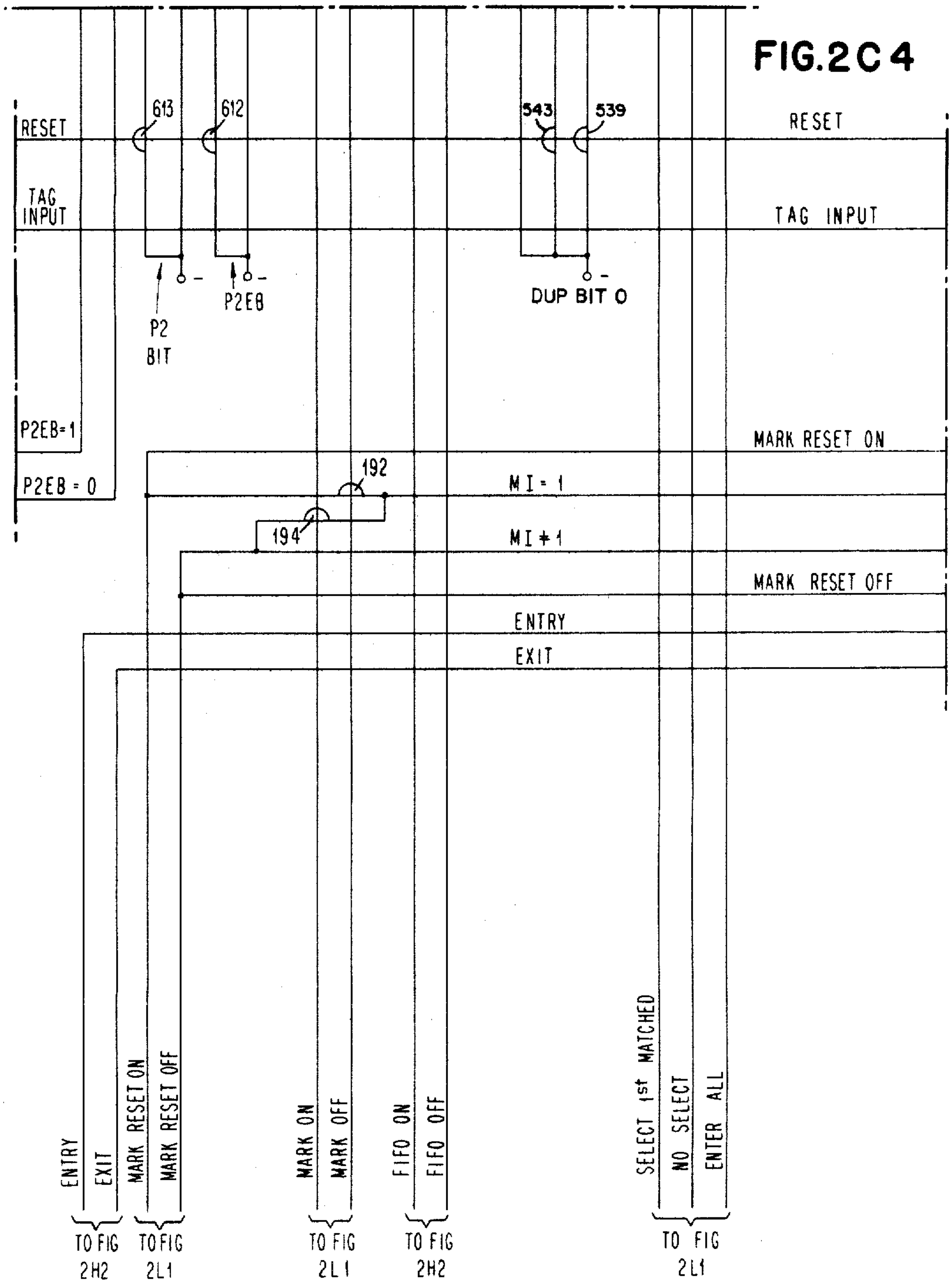

May 3, 1966 R. R. SEEBER 3,249,921
ASSOCIATIVE MEMORY ORDERED RETRIEVAL
Filed Dec. 29, 1961 49 Sheets-Sheet 14
FIG.2D1
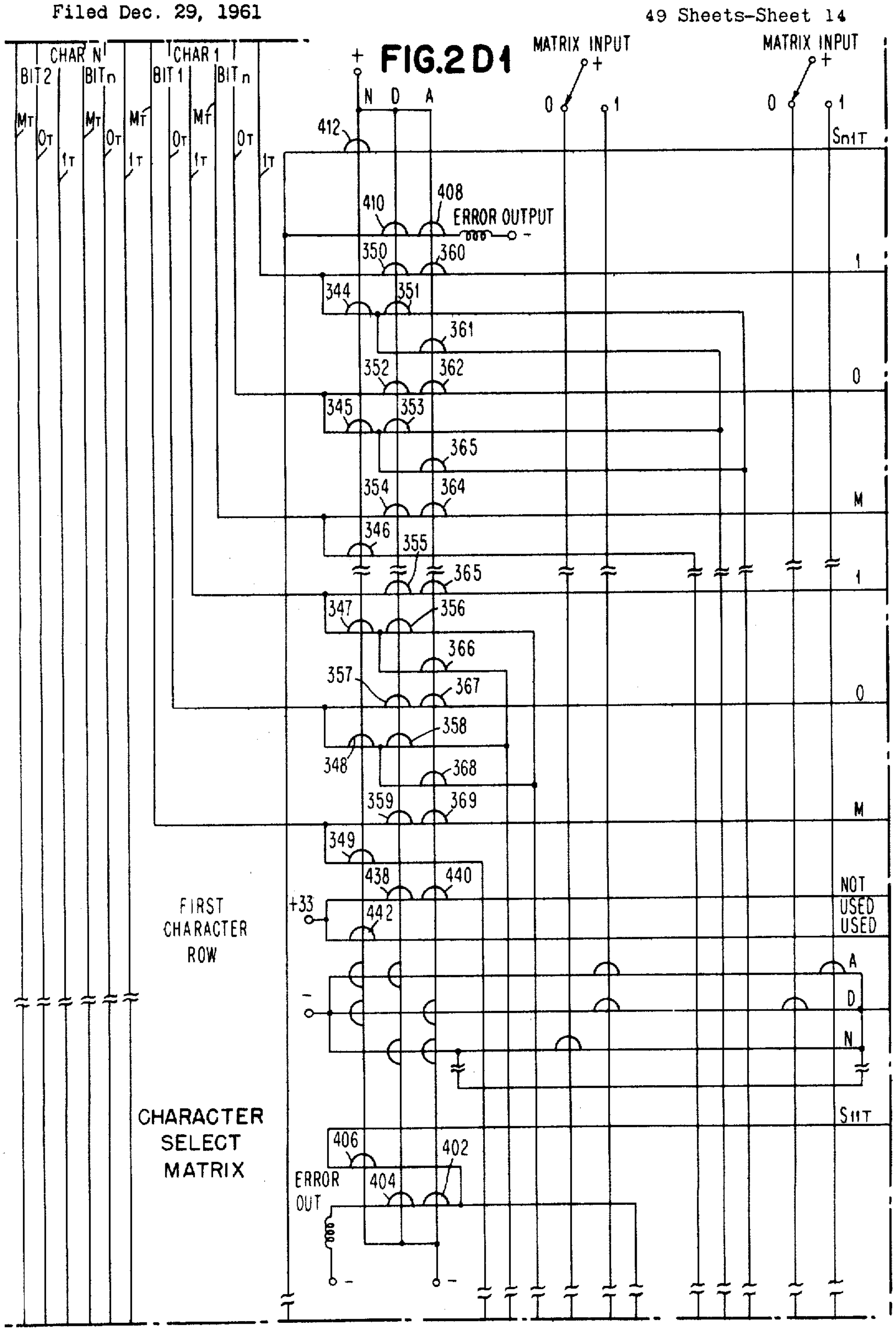

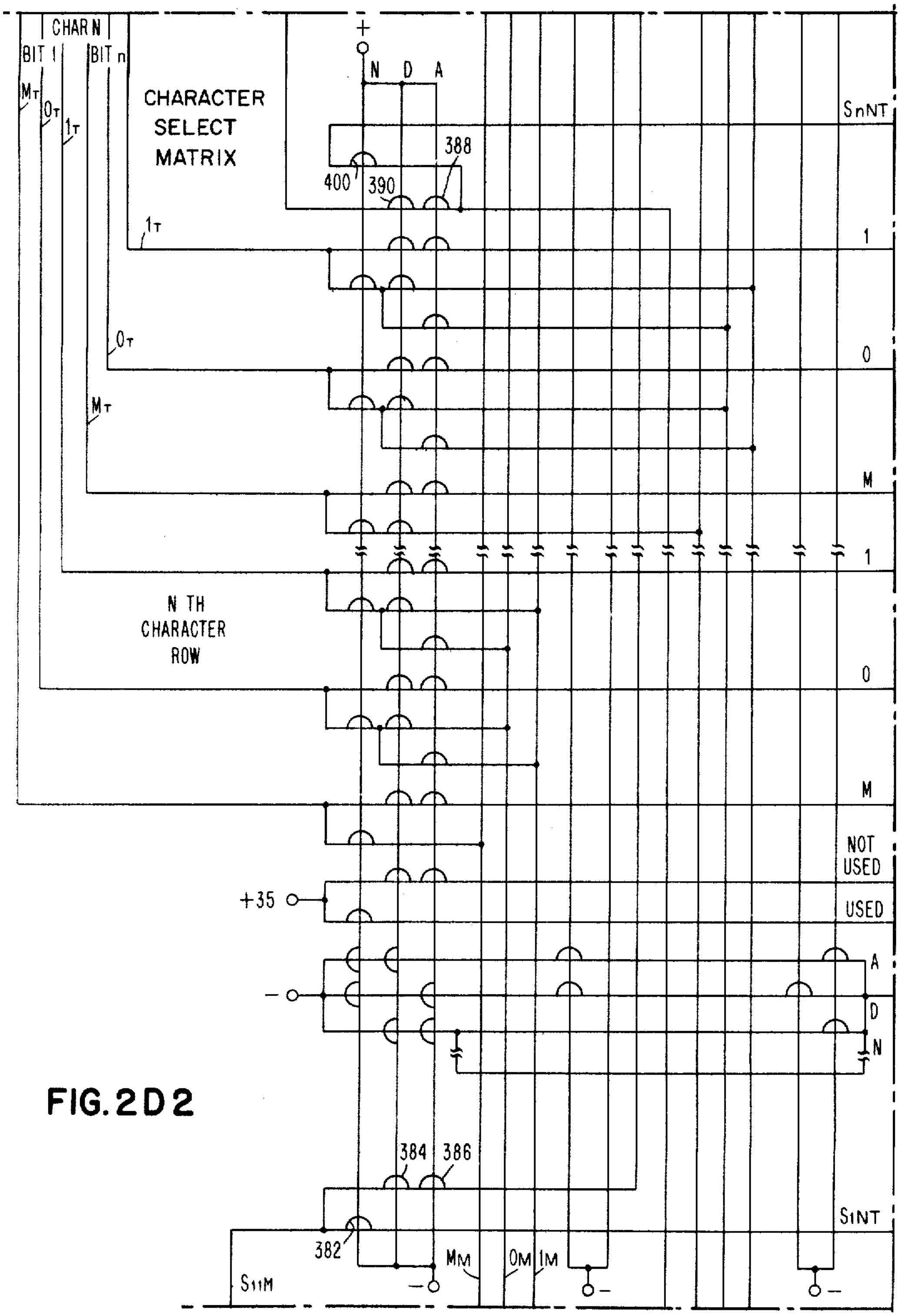
FIG. 2D2

FIG. 2E1
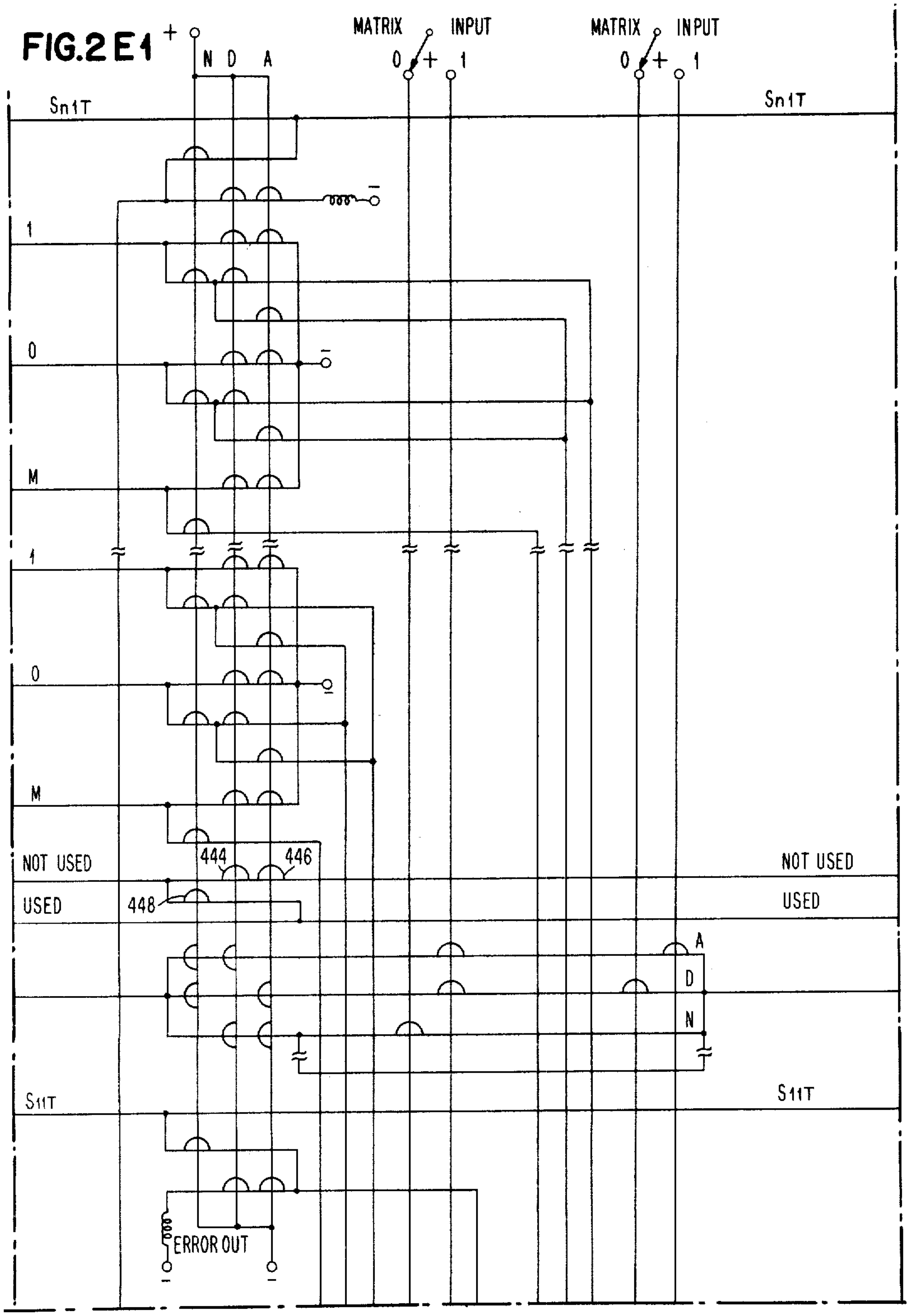

FIG. 2E2
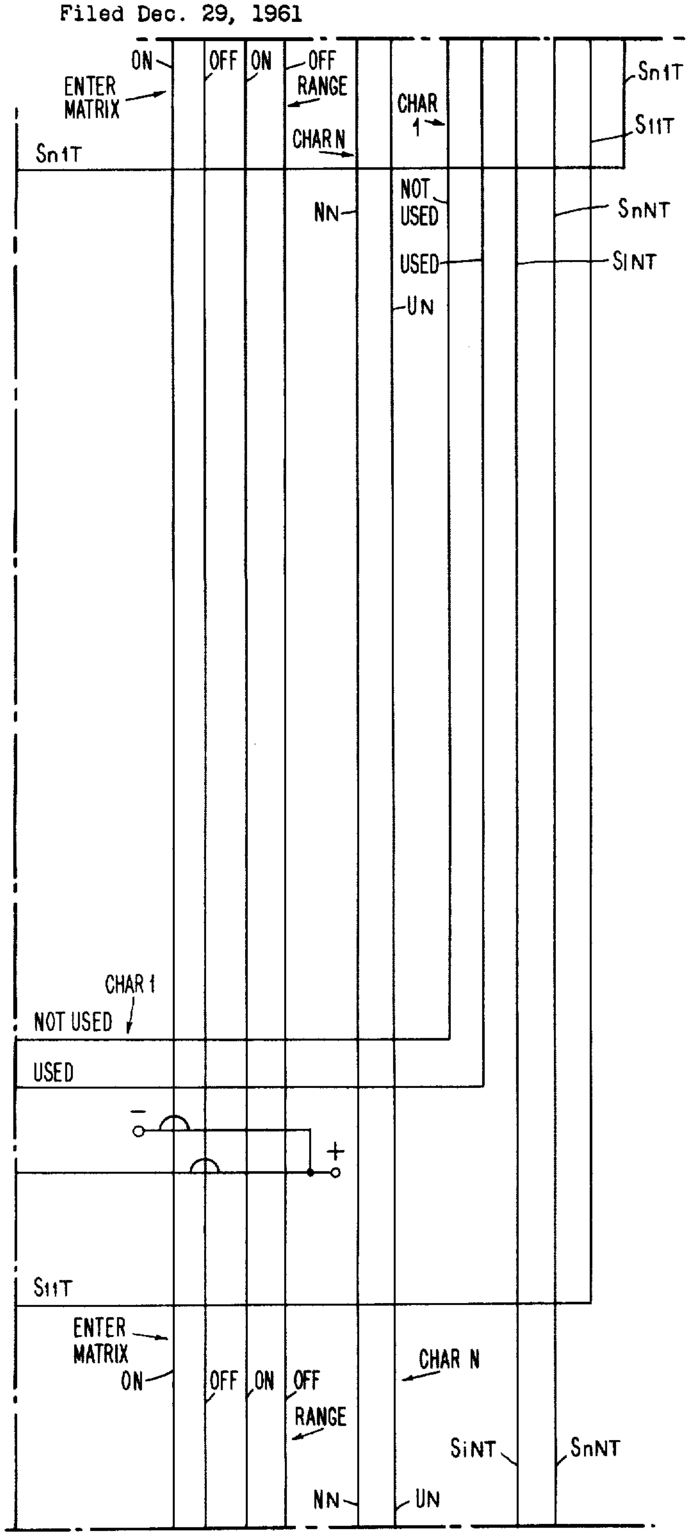

May 3, 1966 R. R. SEEBER 3,249,921
ASSOCIATIVE MEMORY ORDERED RETRIEVAL
Filed Dec. 29, 1961 49 Sheets-Sheet 18
FIG. 2E3
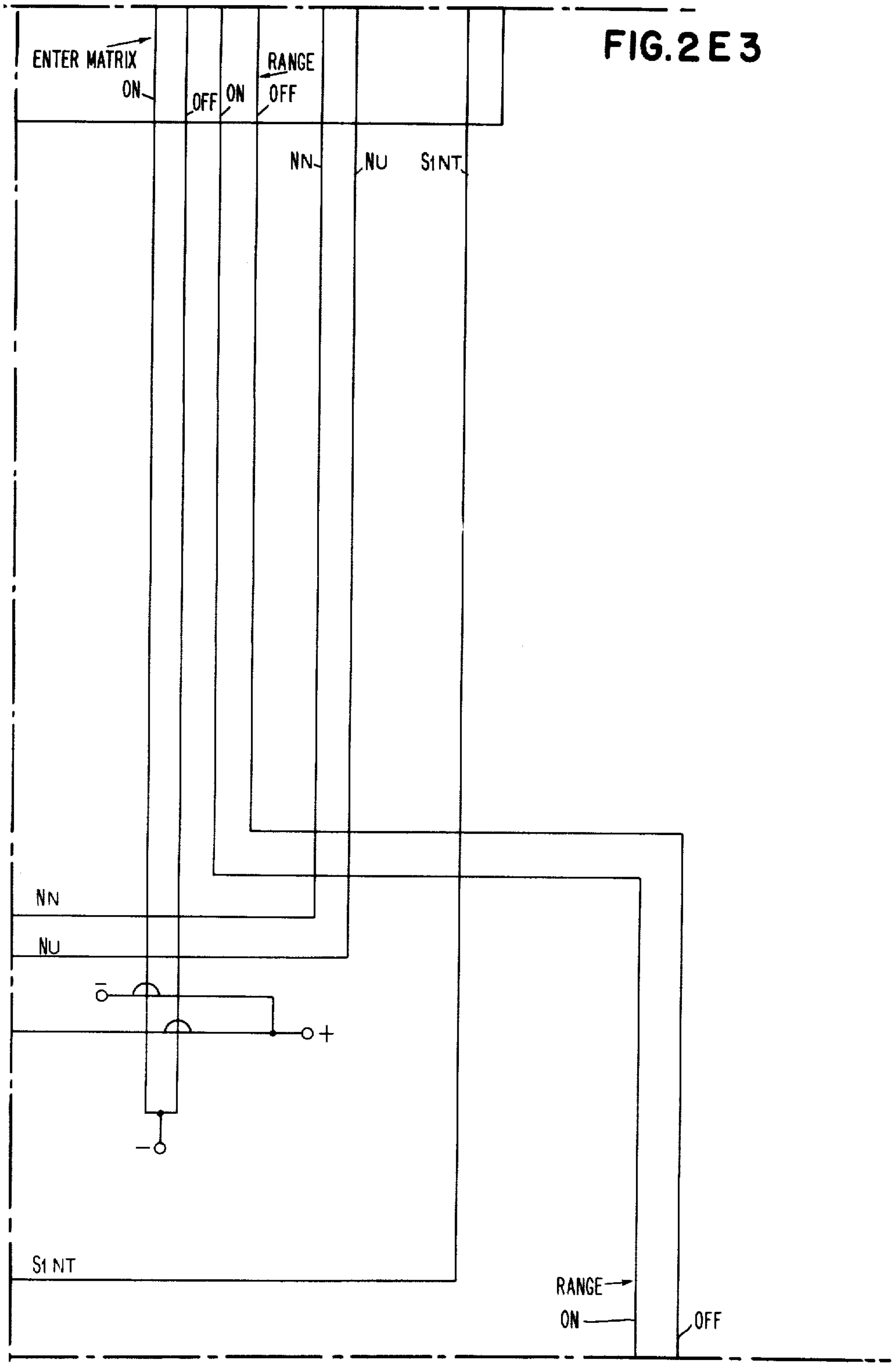

FIG. 2E4
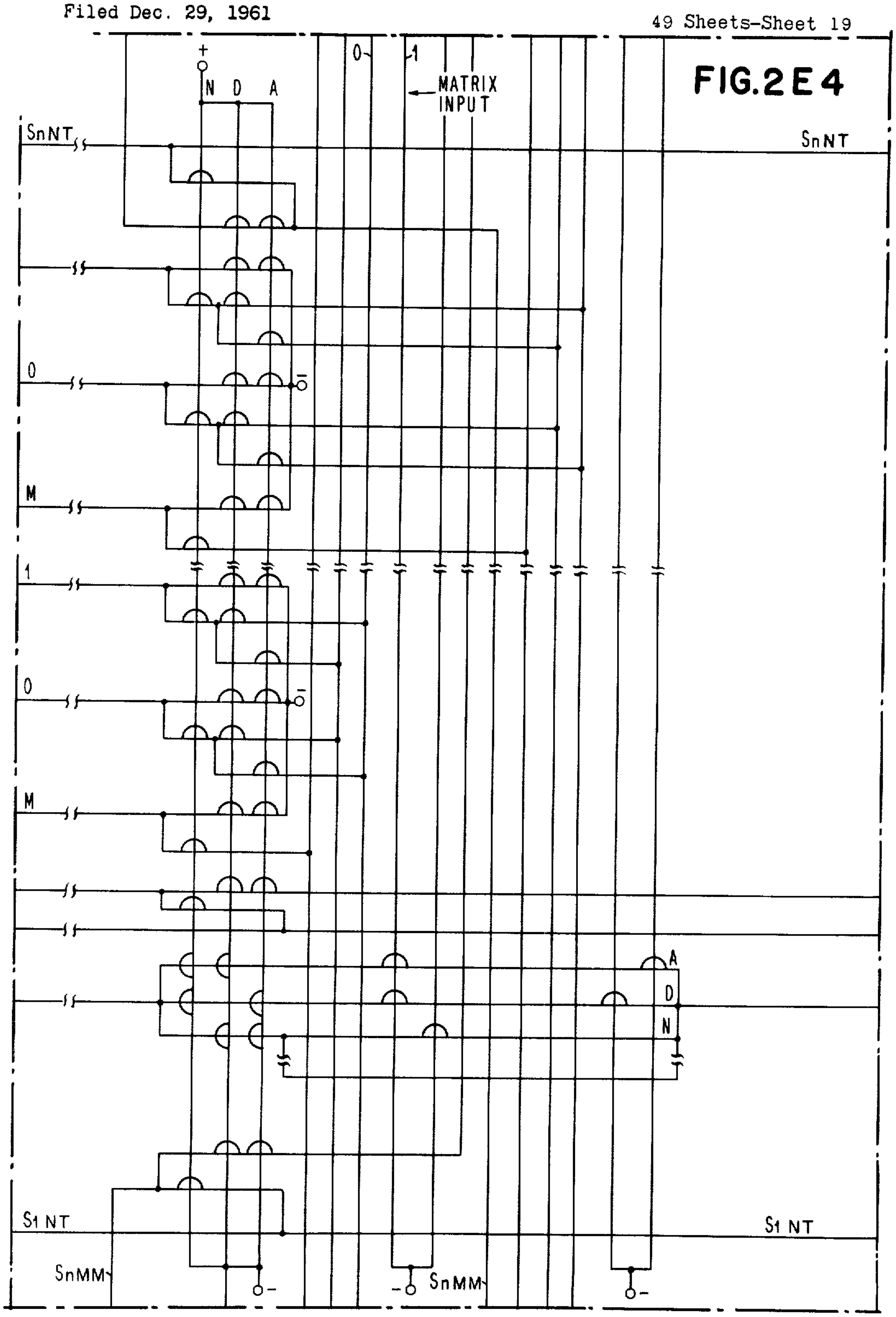

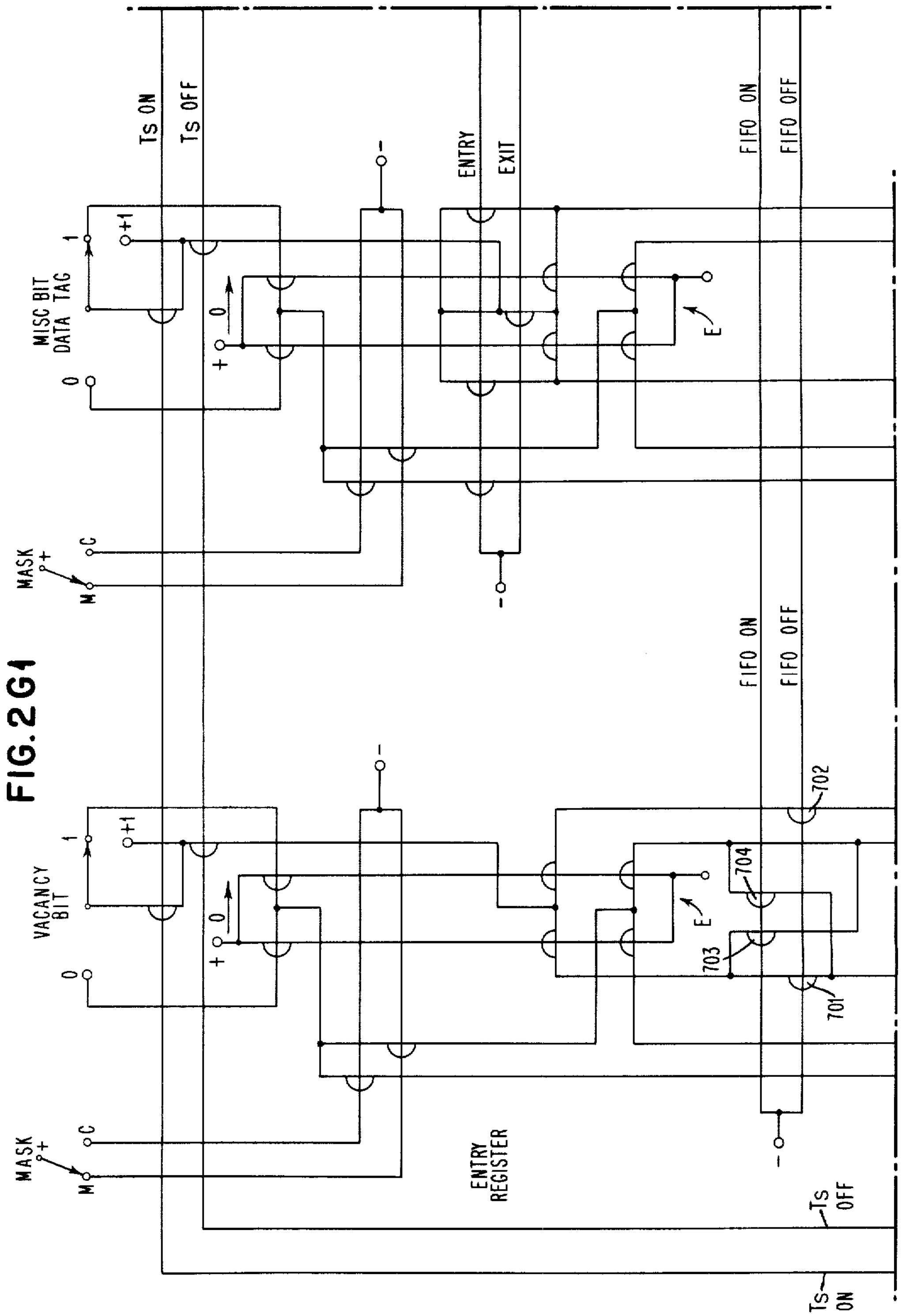
FIG. 2G1

ASSOCIATIVE MEMORY ORDERED RETRIEVAL
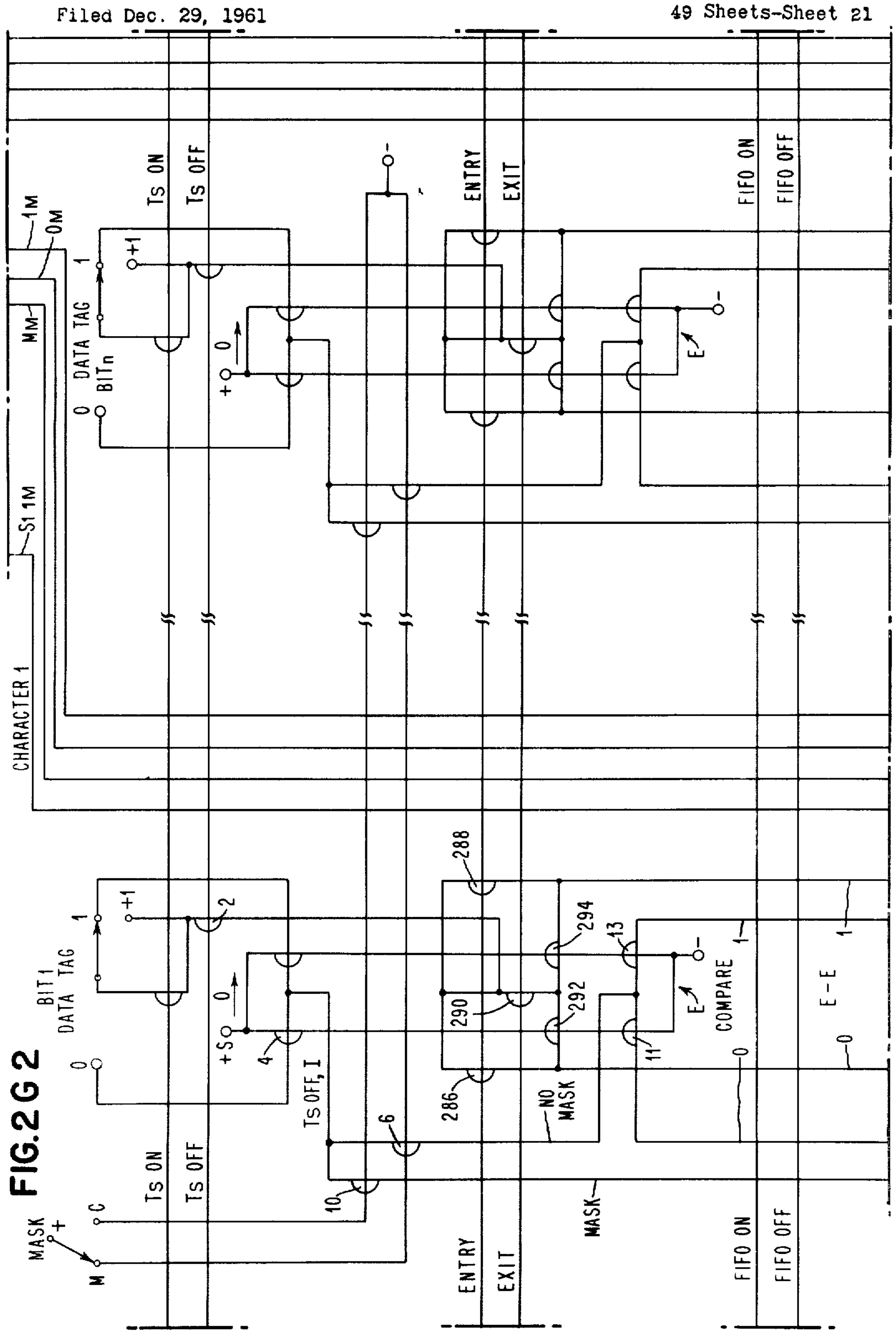
FIG. 2G2

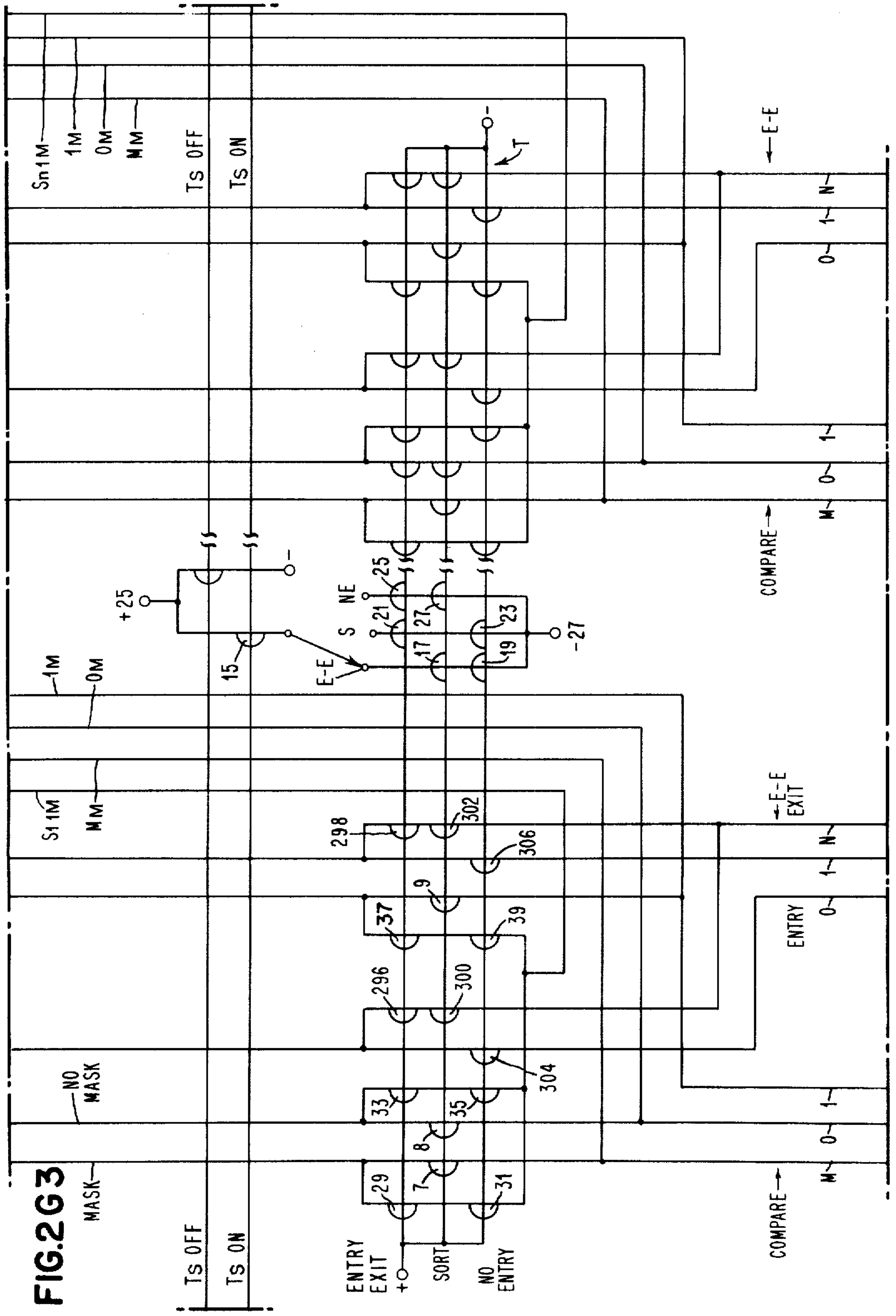
FIG.2G3

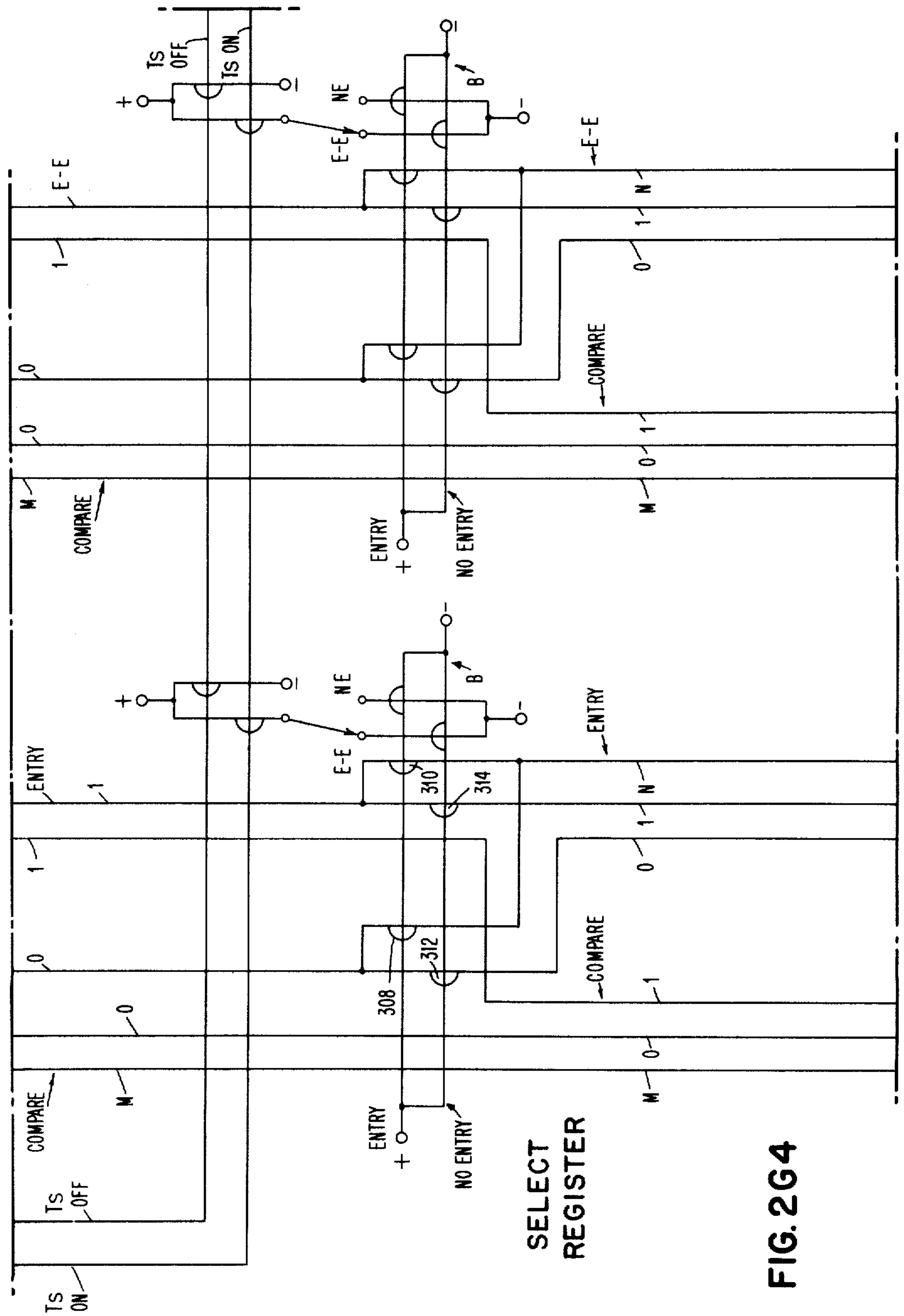
FIG. 2G4

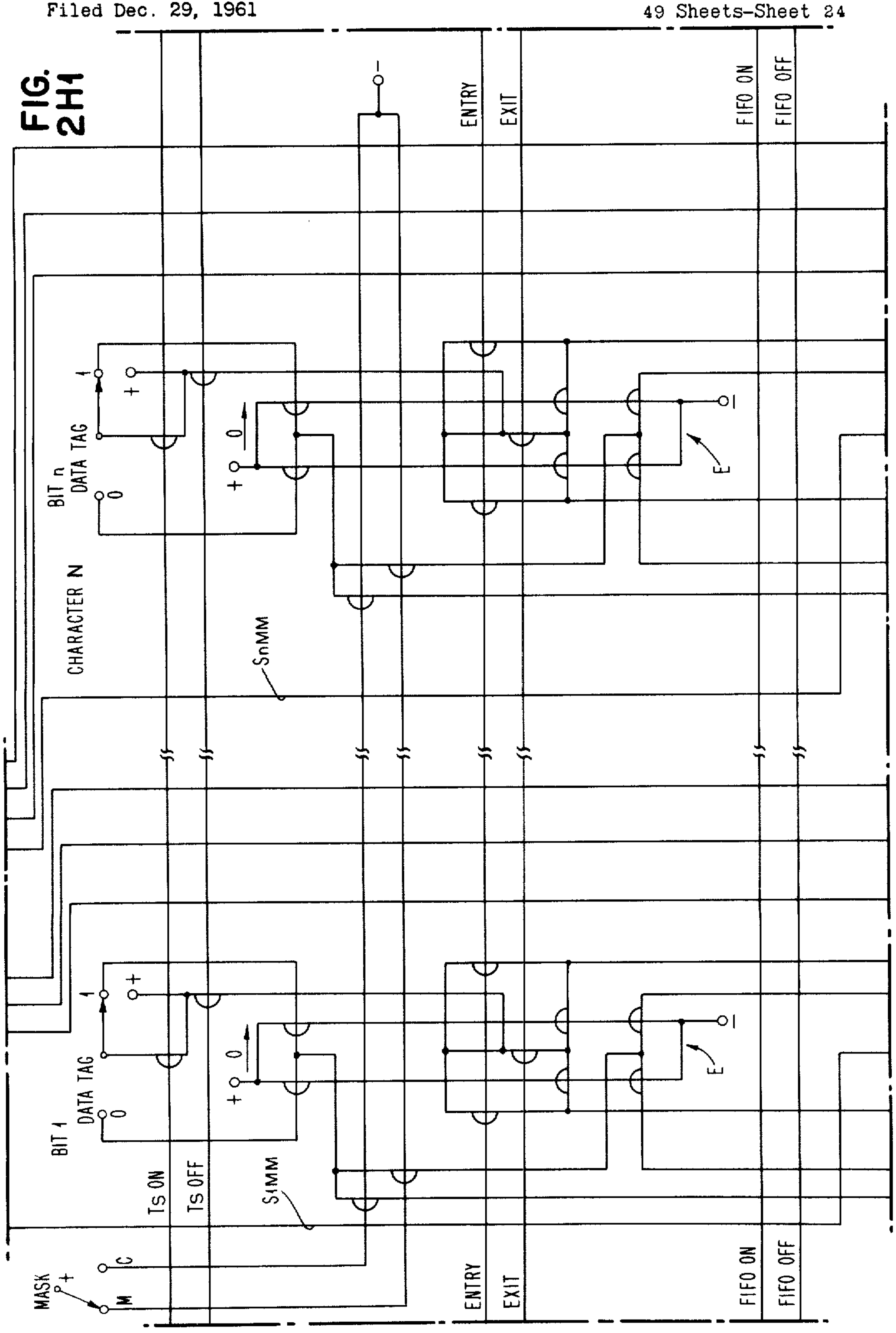
FIG. 2H1

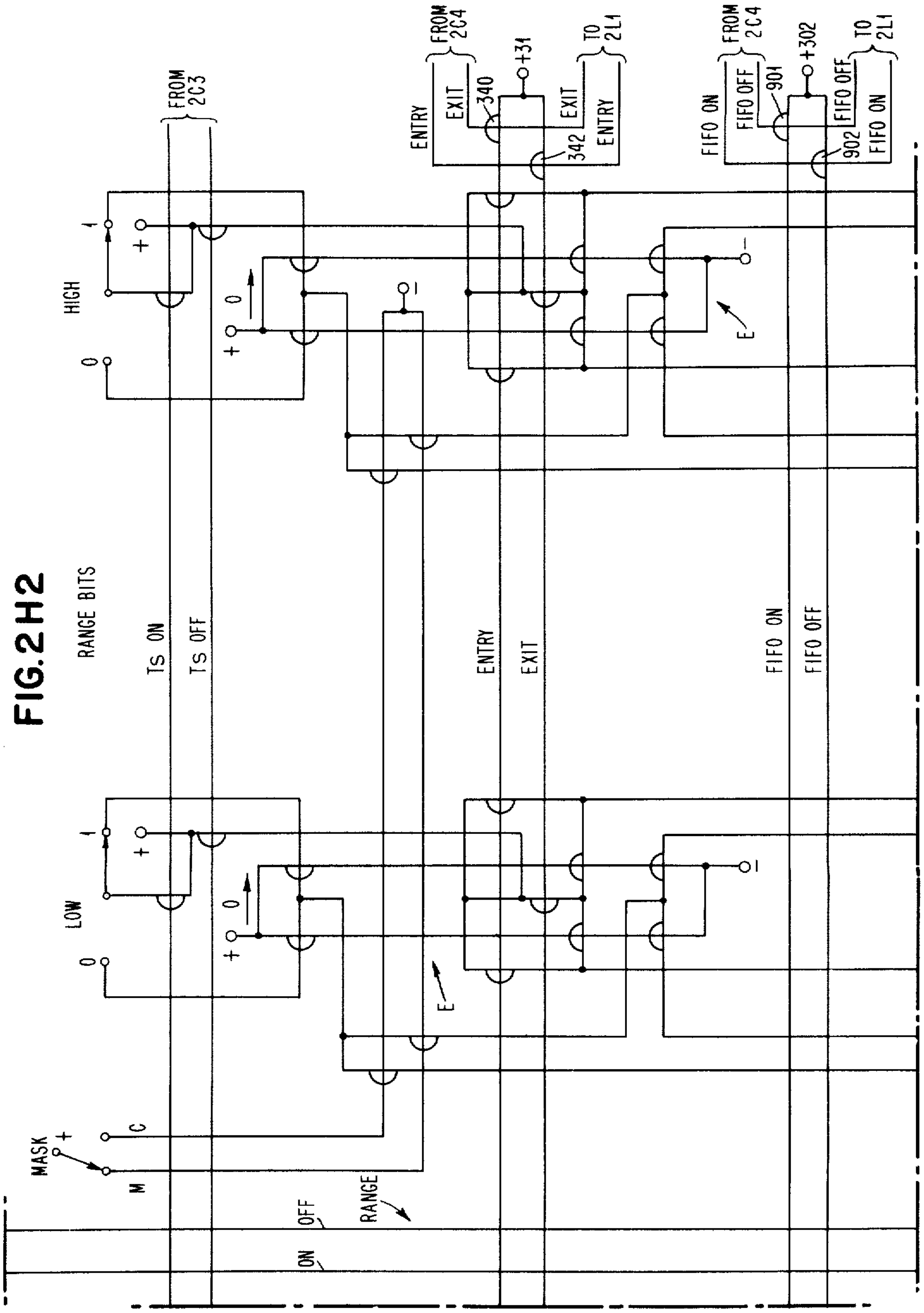
FIG.2H2

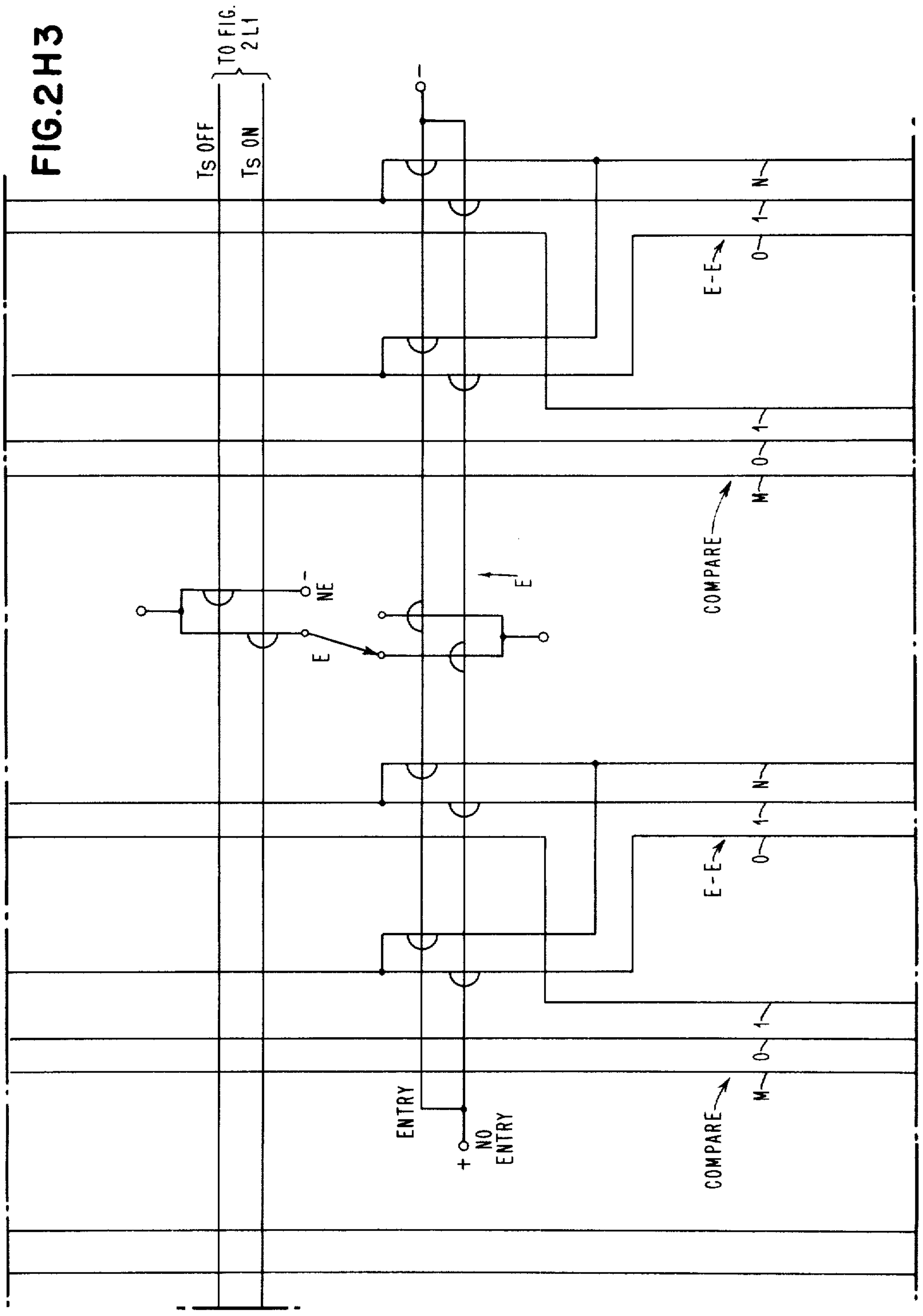
FIG. 2H3

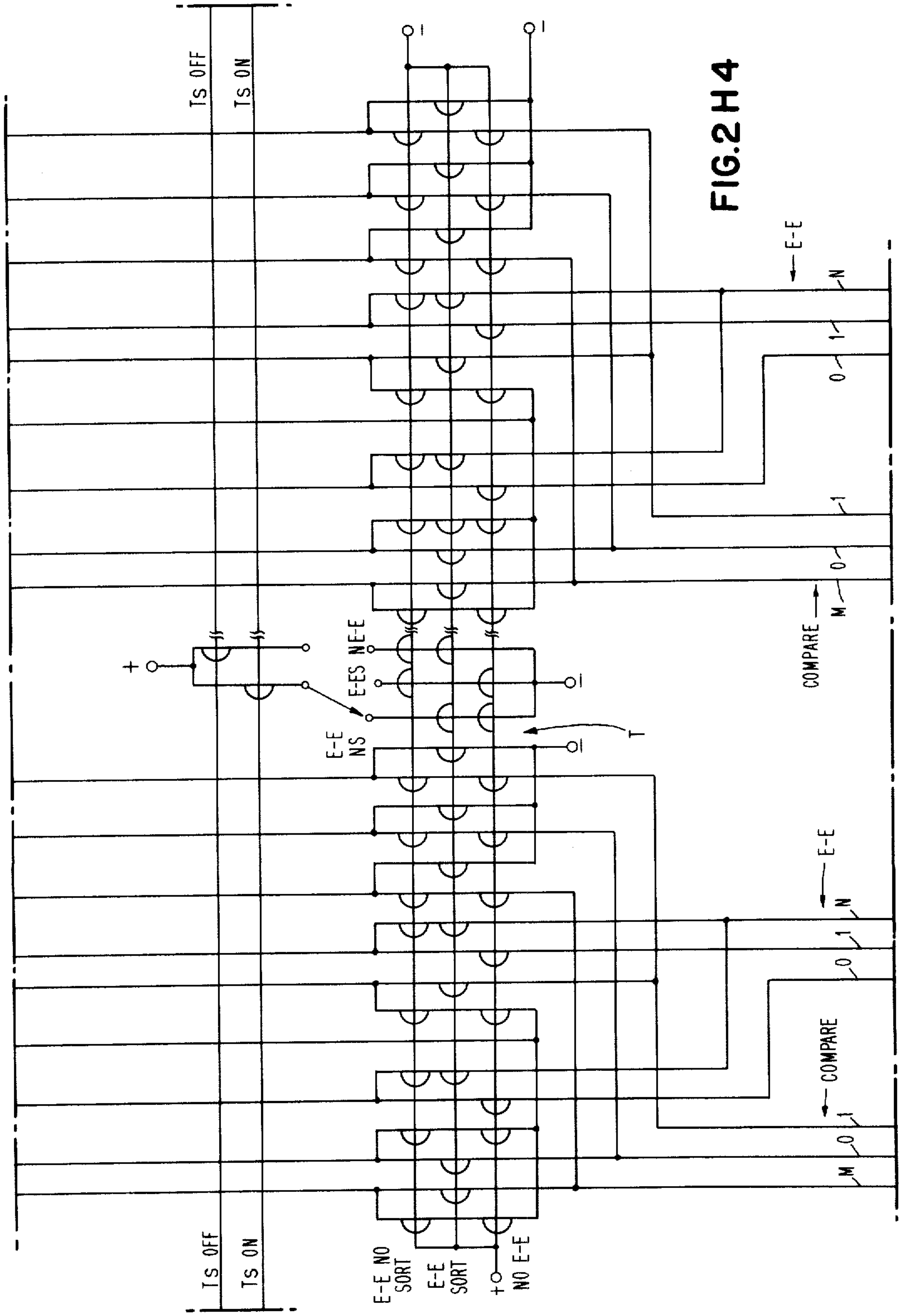
FIG. 2H4

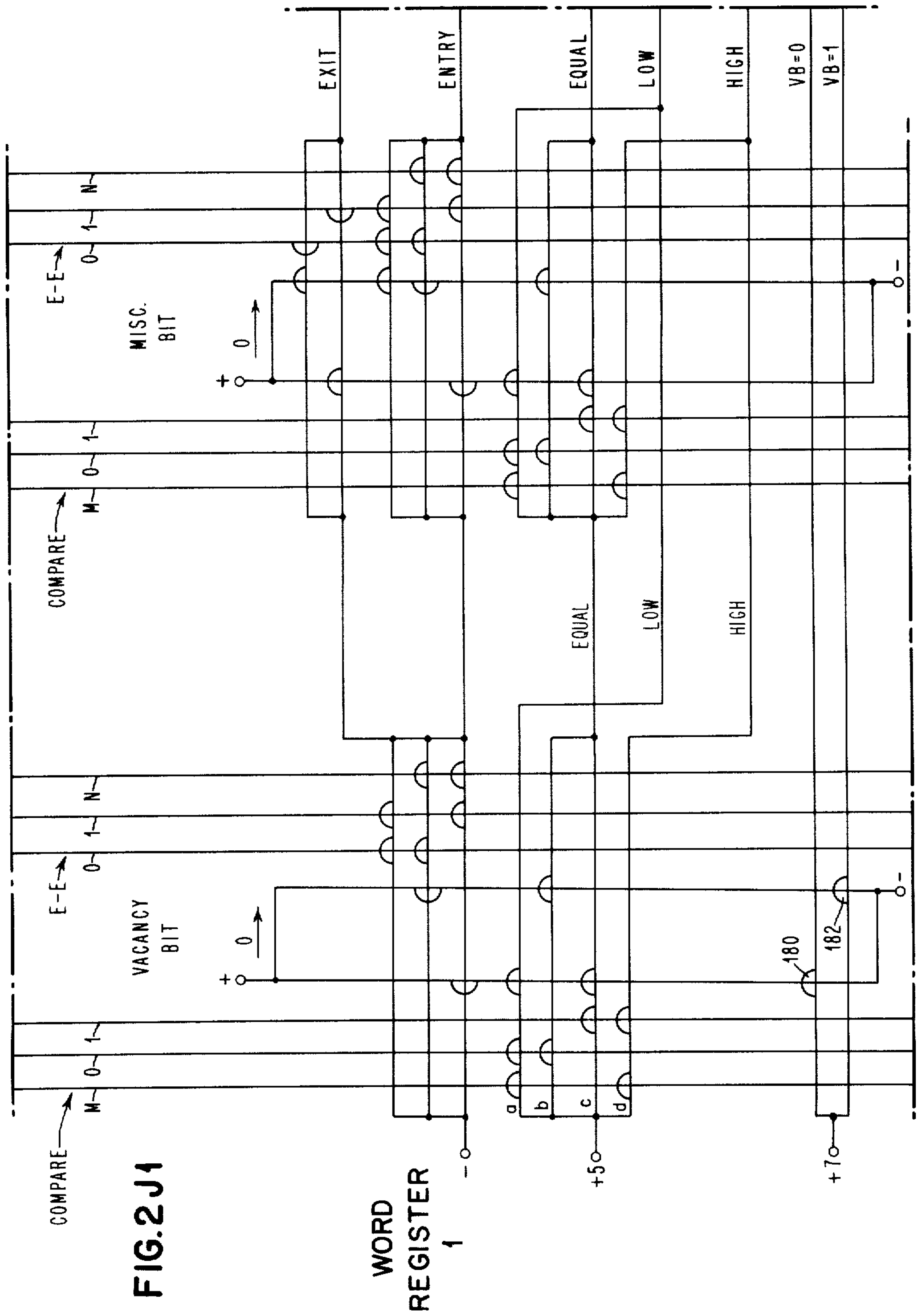
FIG. 2J1

May 3, 1966 R. R. SEEBER 3,249,921
ASSOCIATIVE MEMORY ORDERED RETRIEVAL
Filed Dec. 29, 1961 49 Sheets-Sheet 29
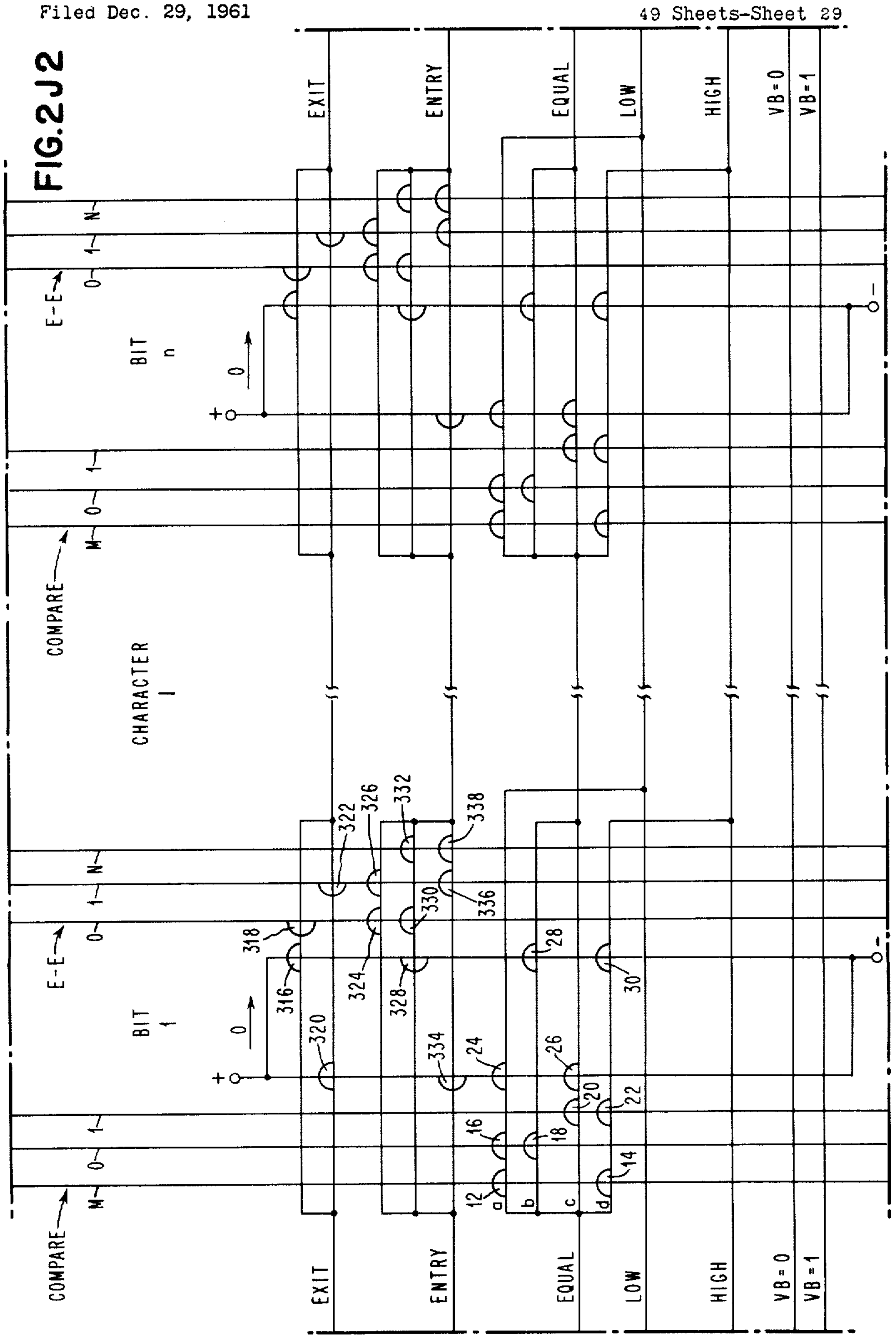
FIG. 2J2

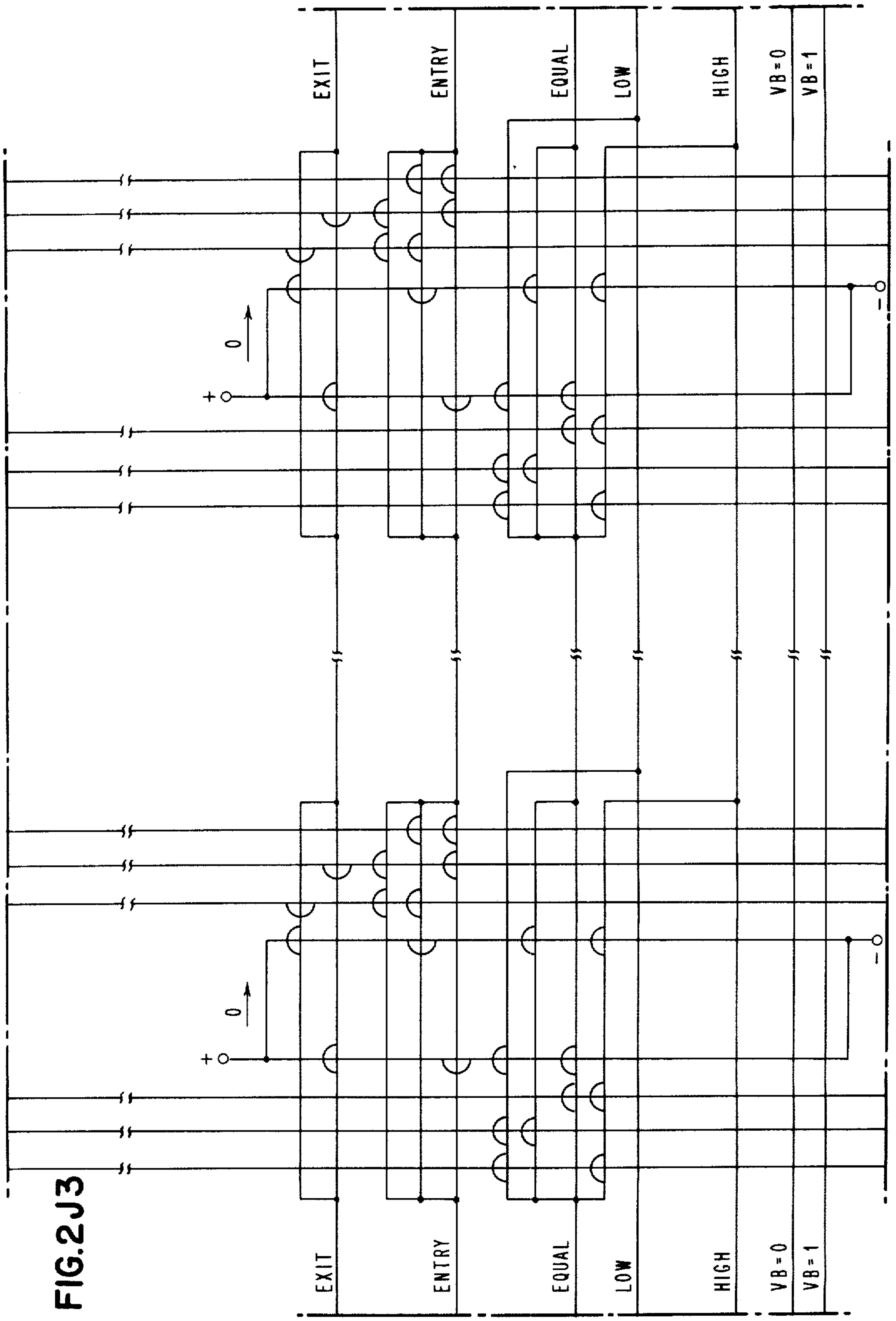
FIG.2J3

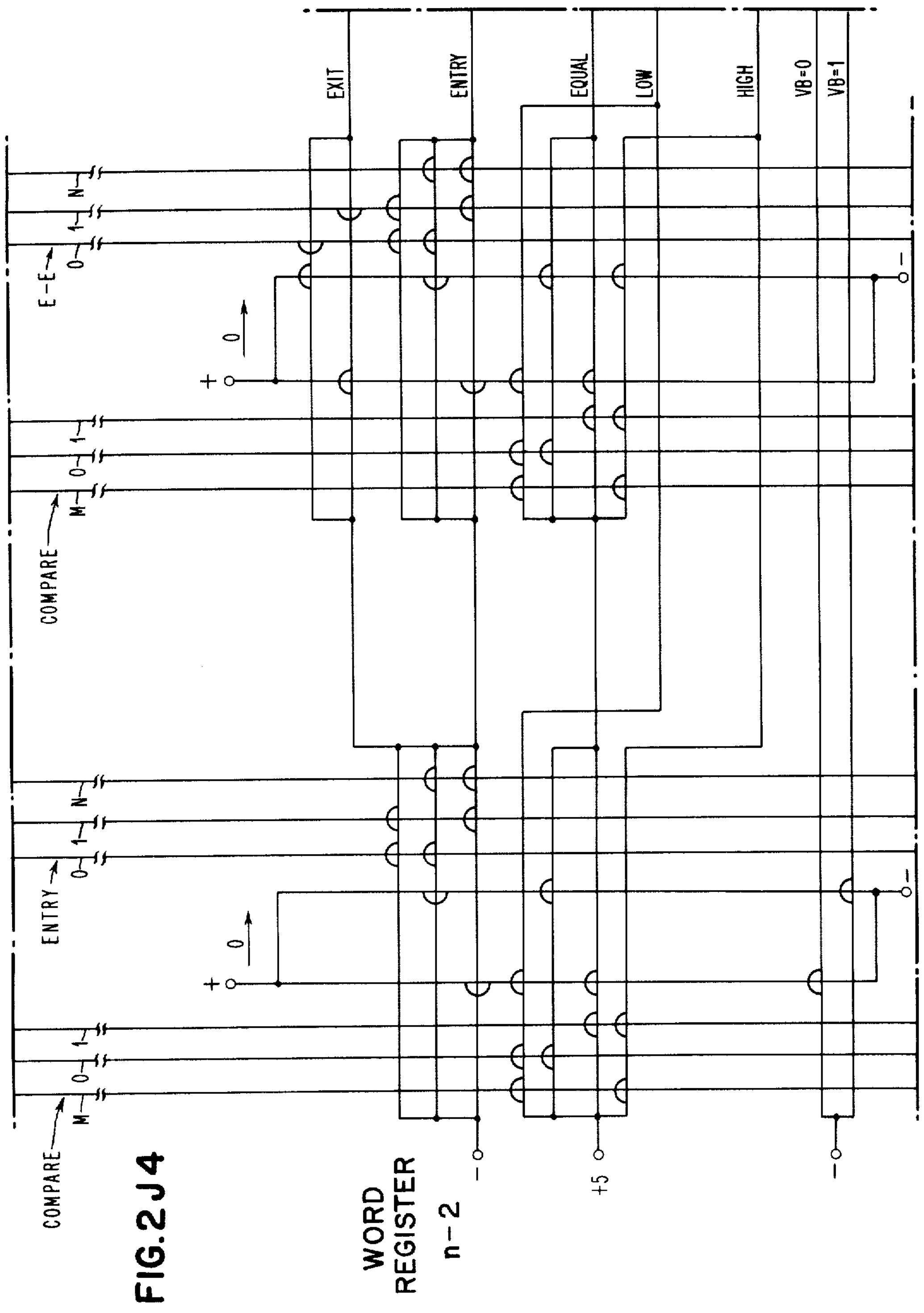
FIG. 2J4

May 3, 1966 R. R. SEEBER 3,249,921
ASSOCIATIVE MEMORY ORDERED RETRIEVAL
Filed Dec. 29, 1961 49 Sheets-Sheet 32
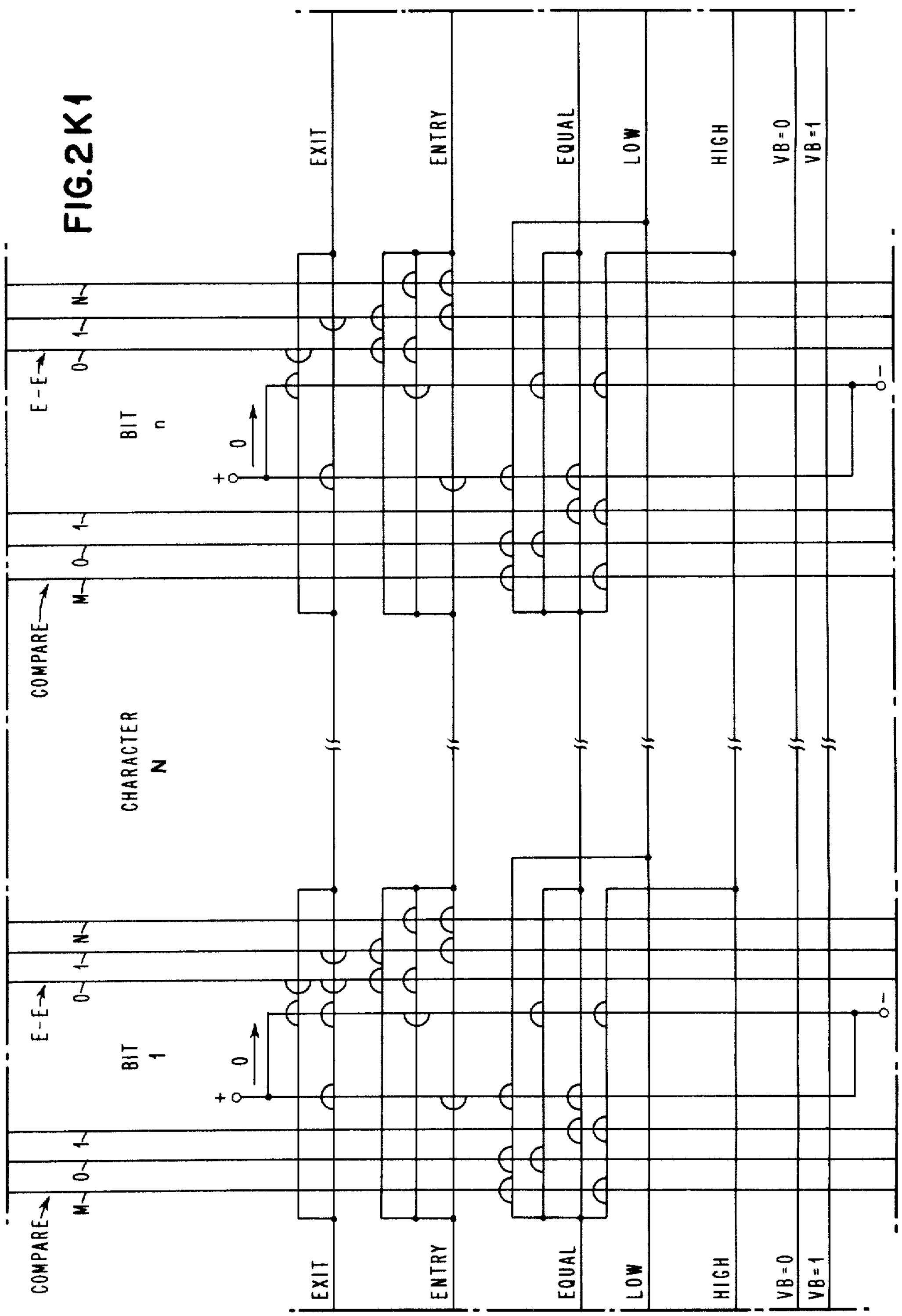
FIG.2K1

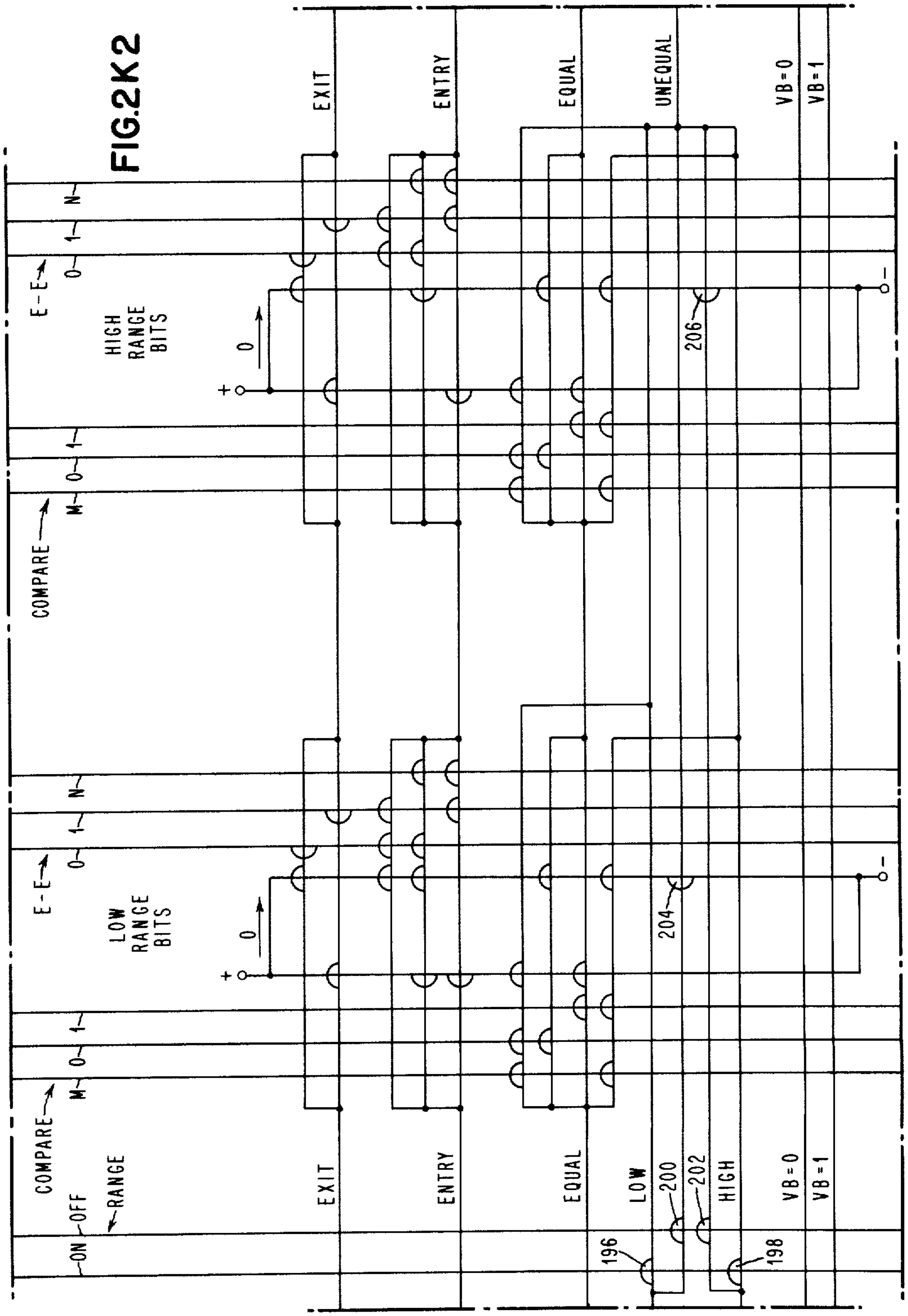
FIG.2K2

May 3, 1966 R. R. SEEBER 3,249,921
ASSOCIATIVE MEMORY ORDERED RETRIEVAL
Filed Dec. 29, 1961 49 Sheets-Sheet 34
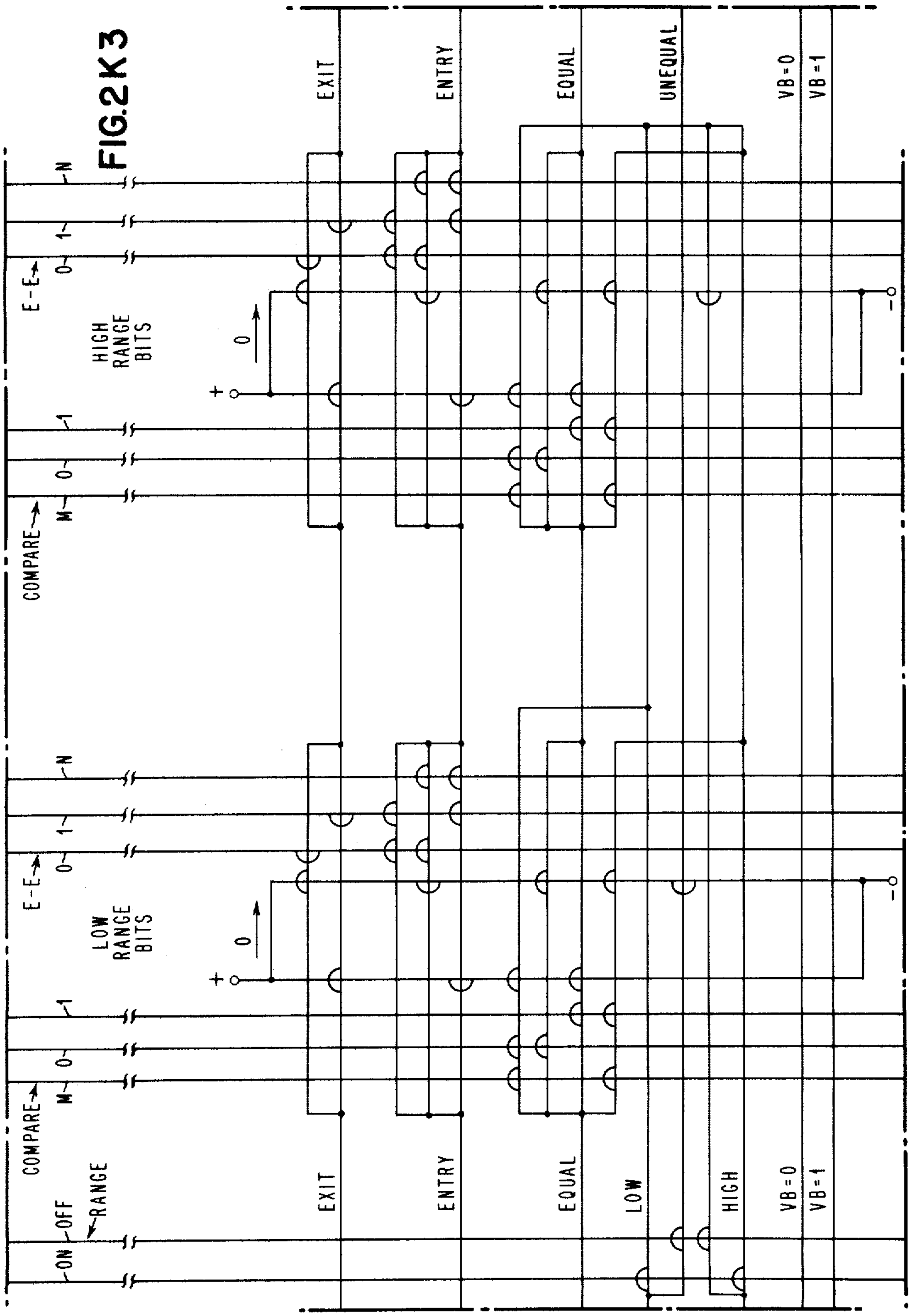
FIG. 2K3

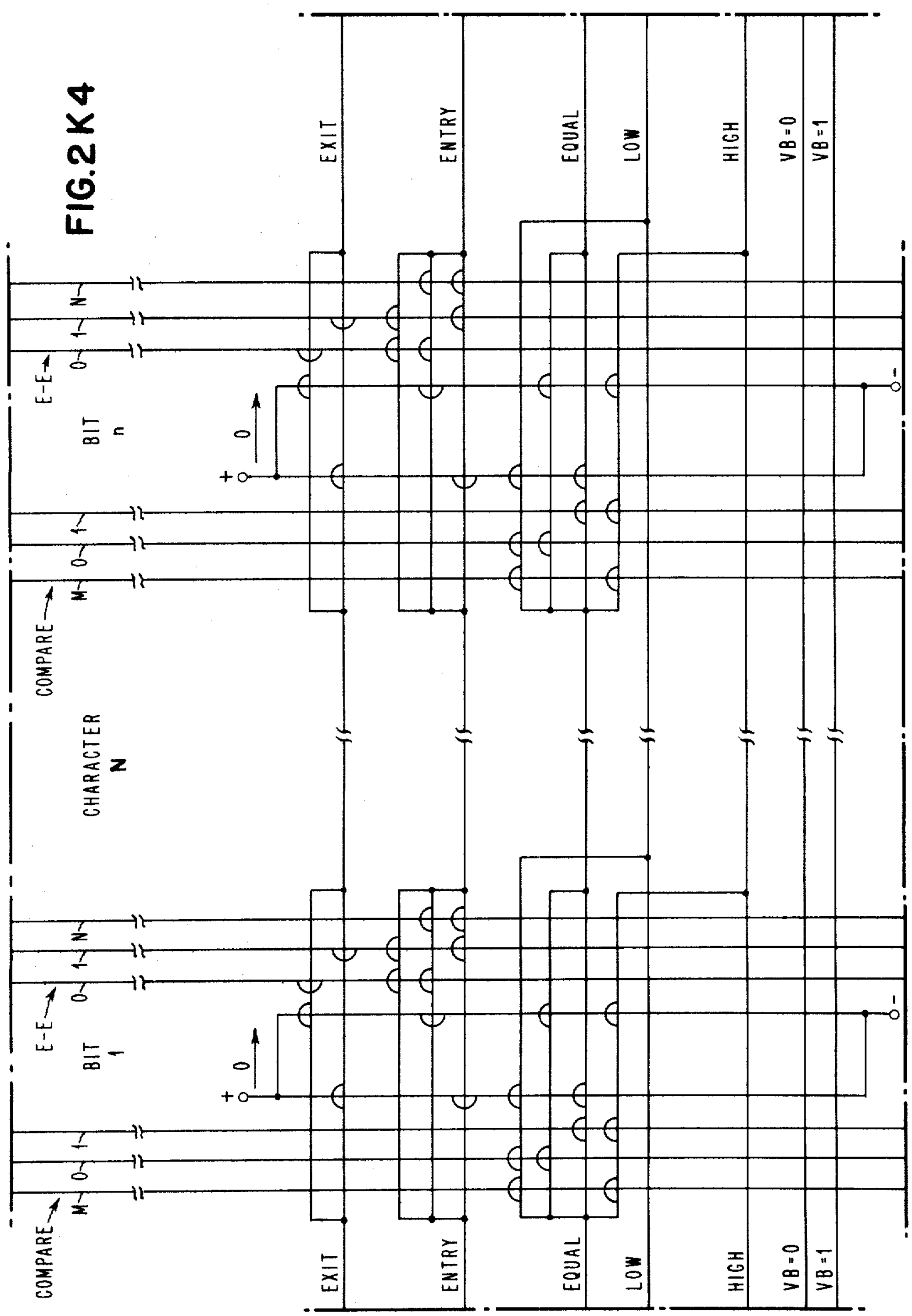
FIG.2K4

May 3, 1966 R. R. SEEBER 3,249,921
ASSOCIATIVE MEMORY ORDERED RETRIEVAL
Filed Dec. 29, 1961 49 Sheets-Sheet 36
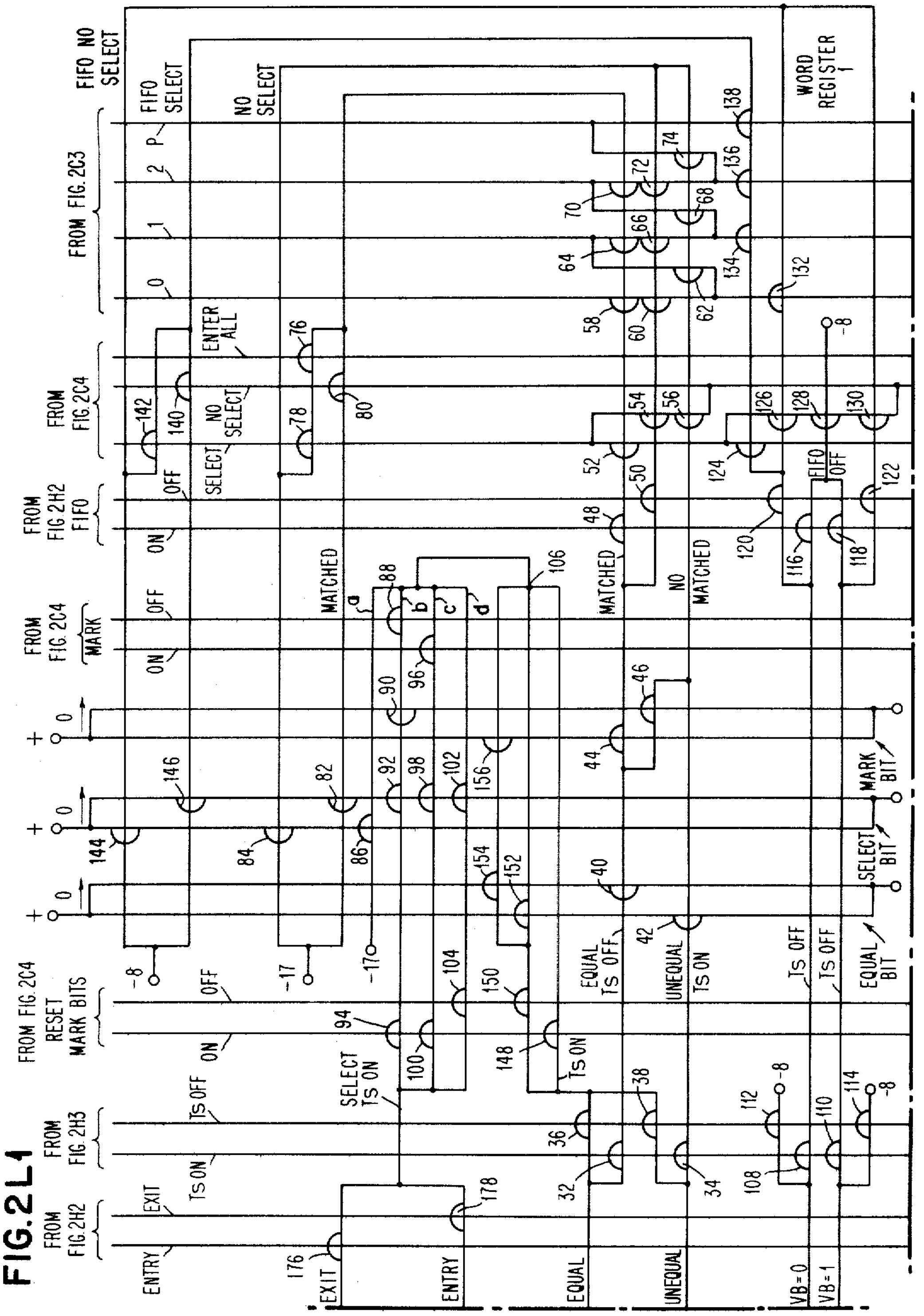
FIG. 2L1

May 3, 1966 R. R. SEEBER 3,249,921
ASSOCIATIVE MEMORY ORDERED RETRIEVAL
Filed Dec. 29, 1961 49 Sheets-Sheet 37
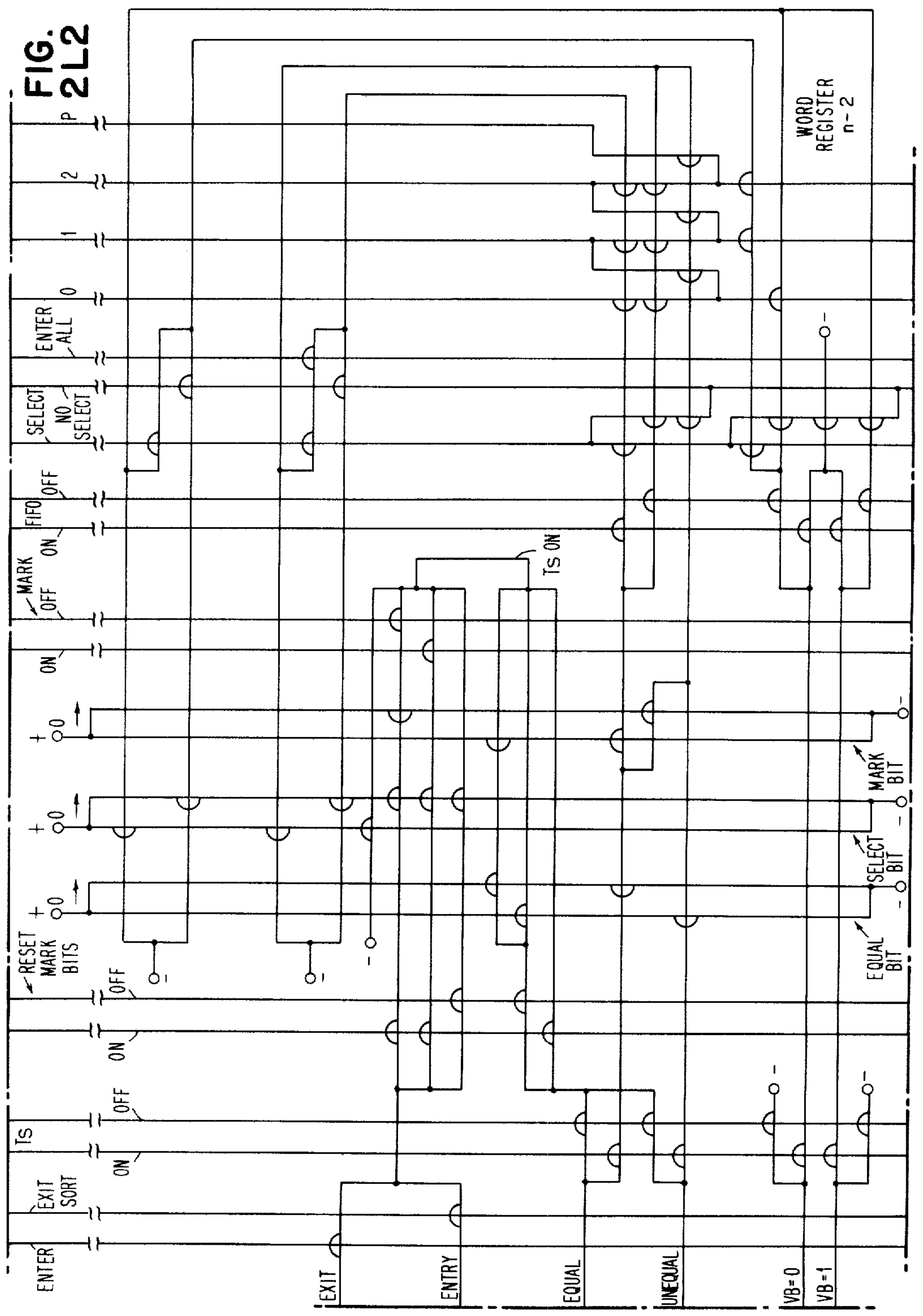
FIG. 2L2

May 3, 1966 R. R. SEEBER 3,249,921
ASSOCIATIVE MEMORY ORDERED RETRIEVAL
Filed Dec. 29, 1961 49 Sheets-Sheet 38
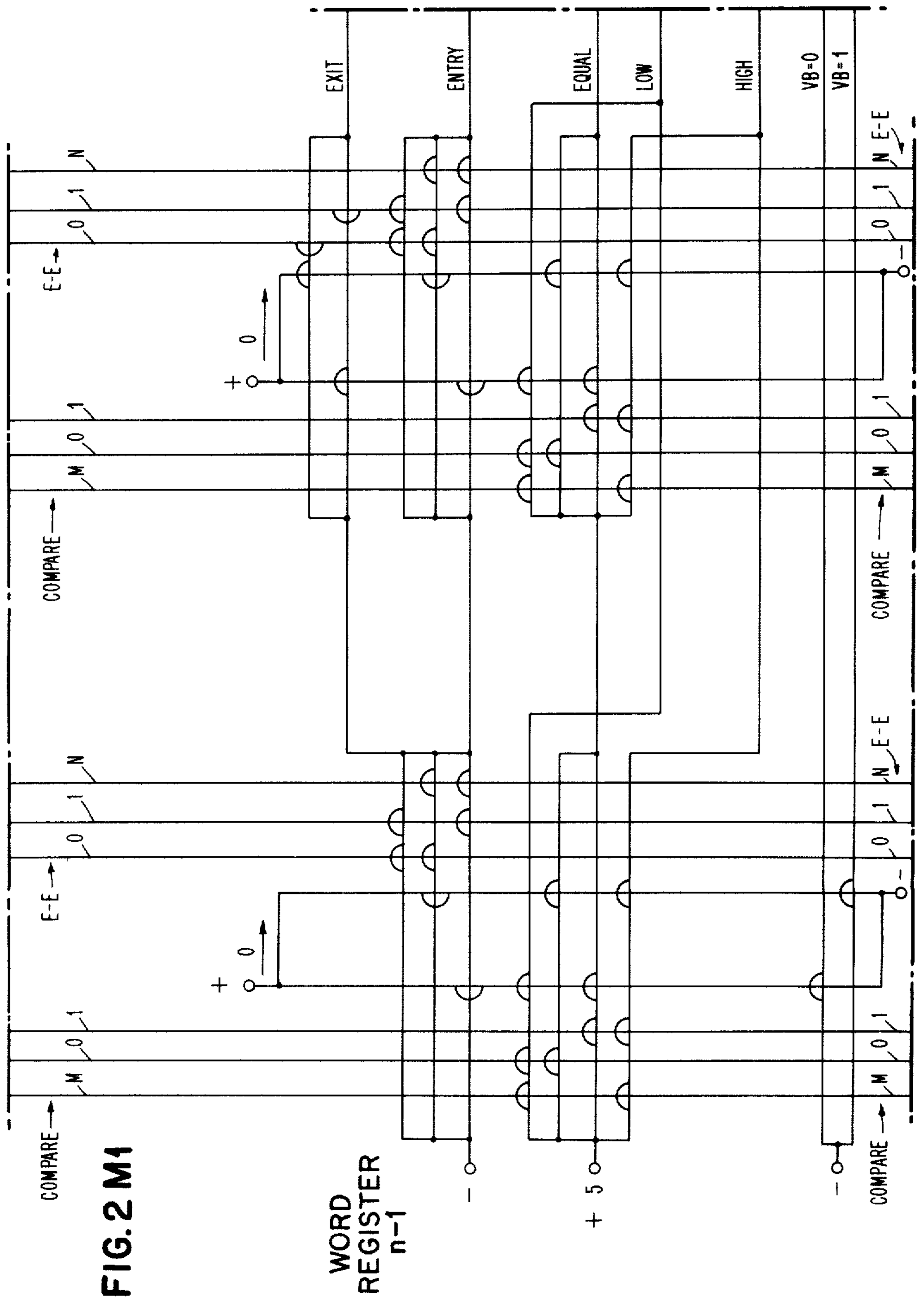
FIG. 2 M1

May 3, 1966 R. R. SEEBER 3,249,921
ASSOCIATIVE MEMORY ORDERED RETRIEVAL
Filed Dec. 29, 1961 49 Sheets-Sheet 39
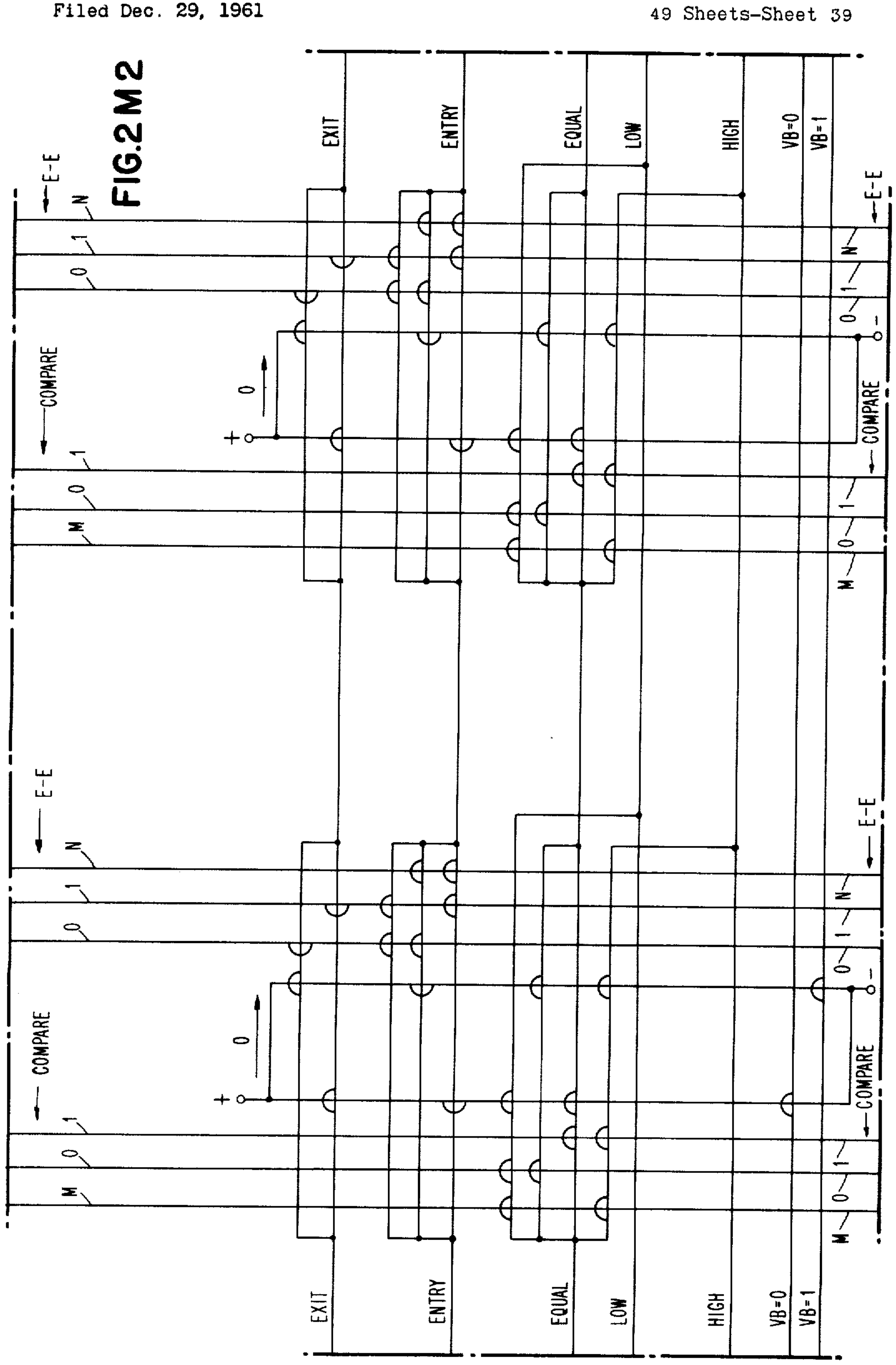
FIG.2M2

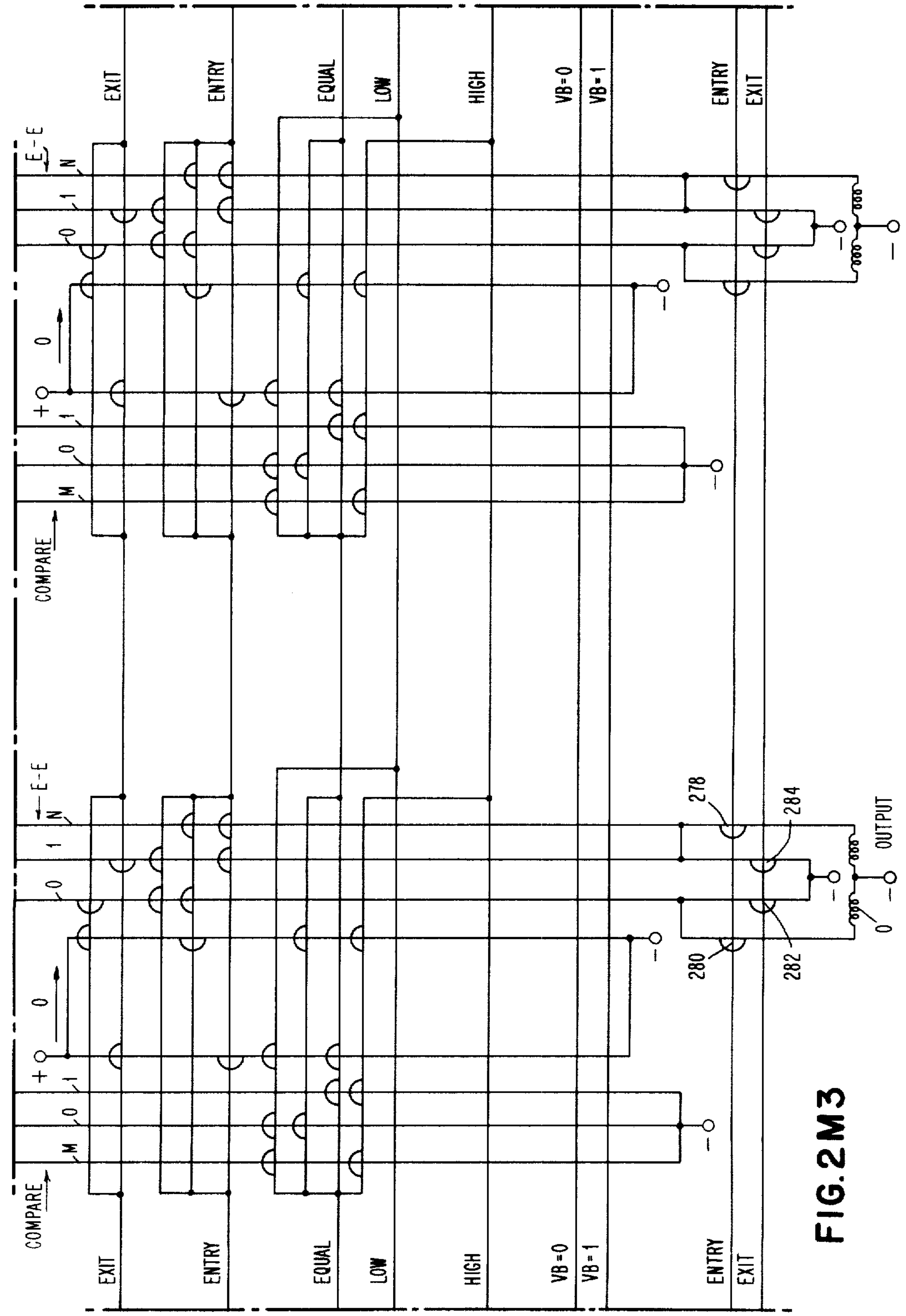
FIG. 2M3

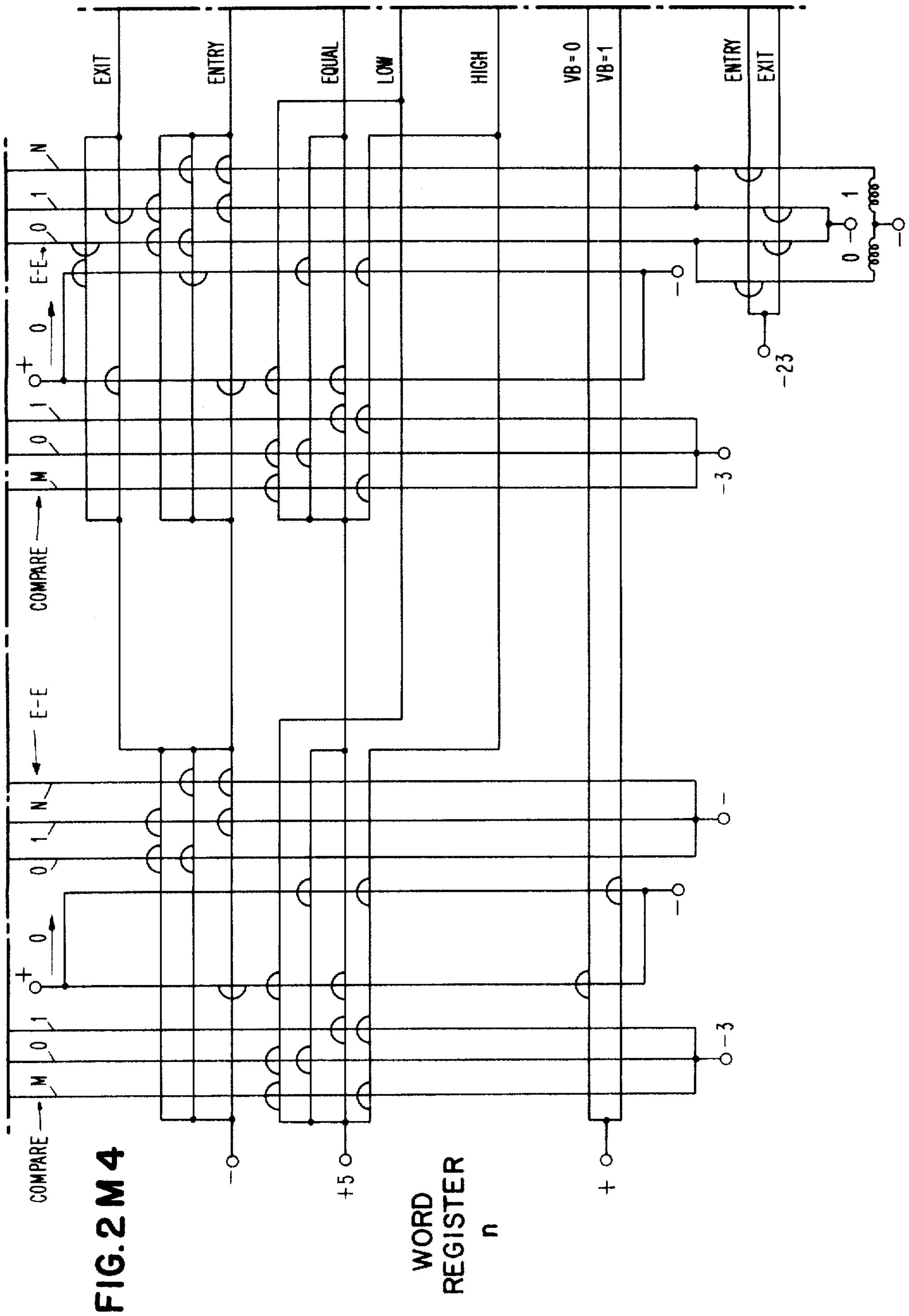
FIG. 2M4

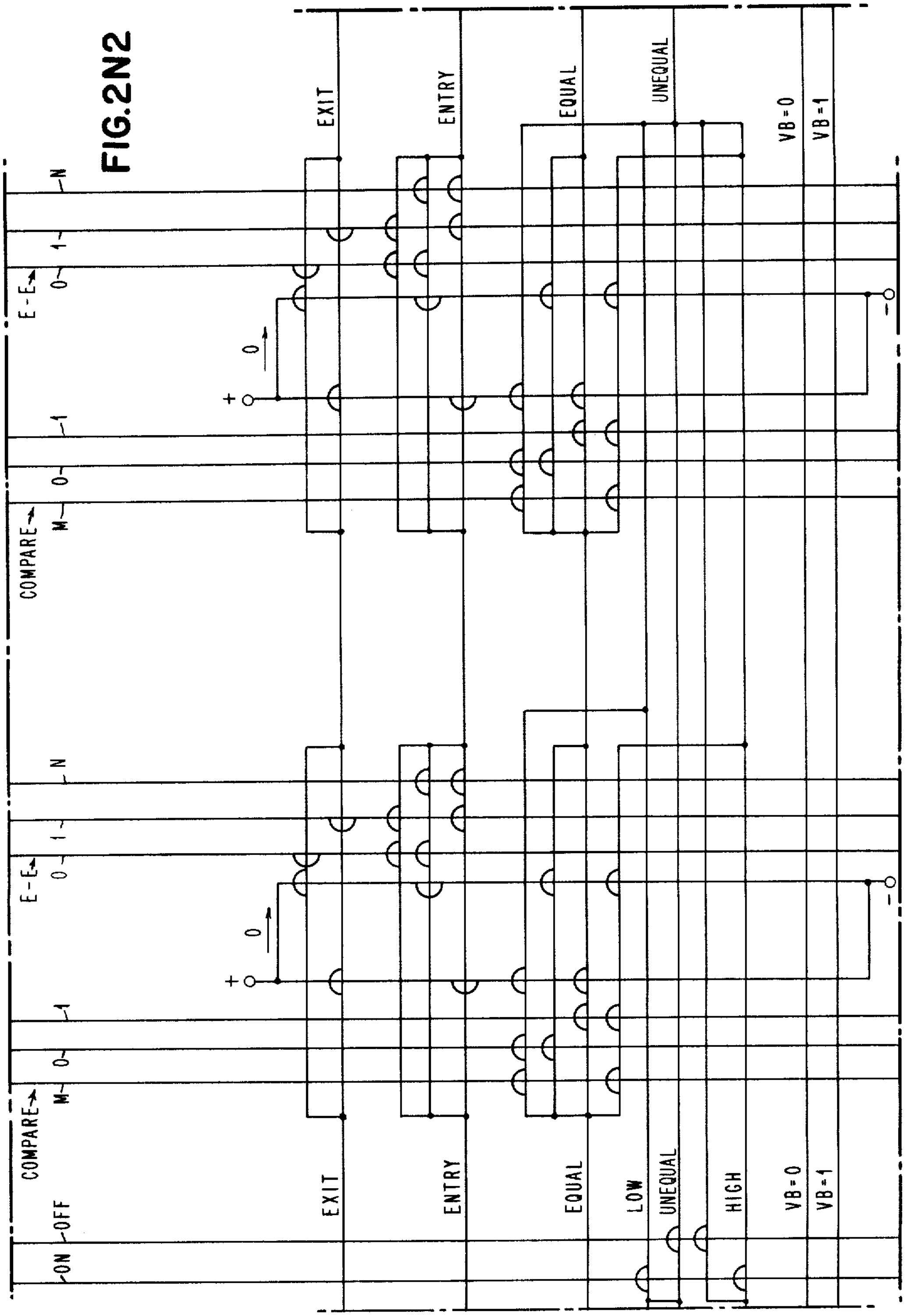
FIG.2N2

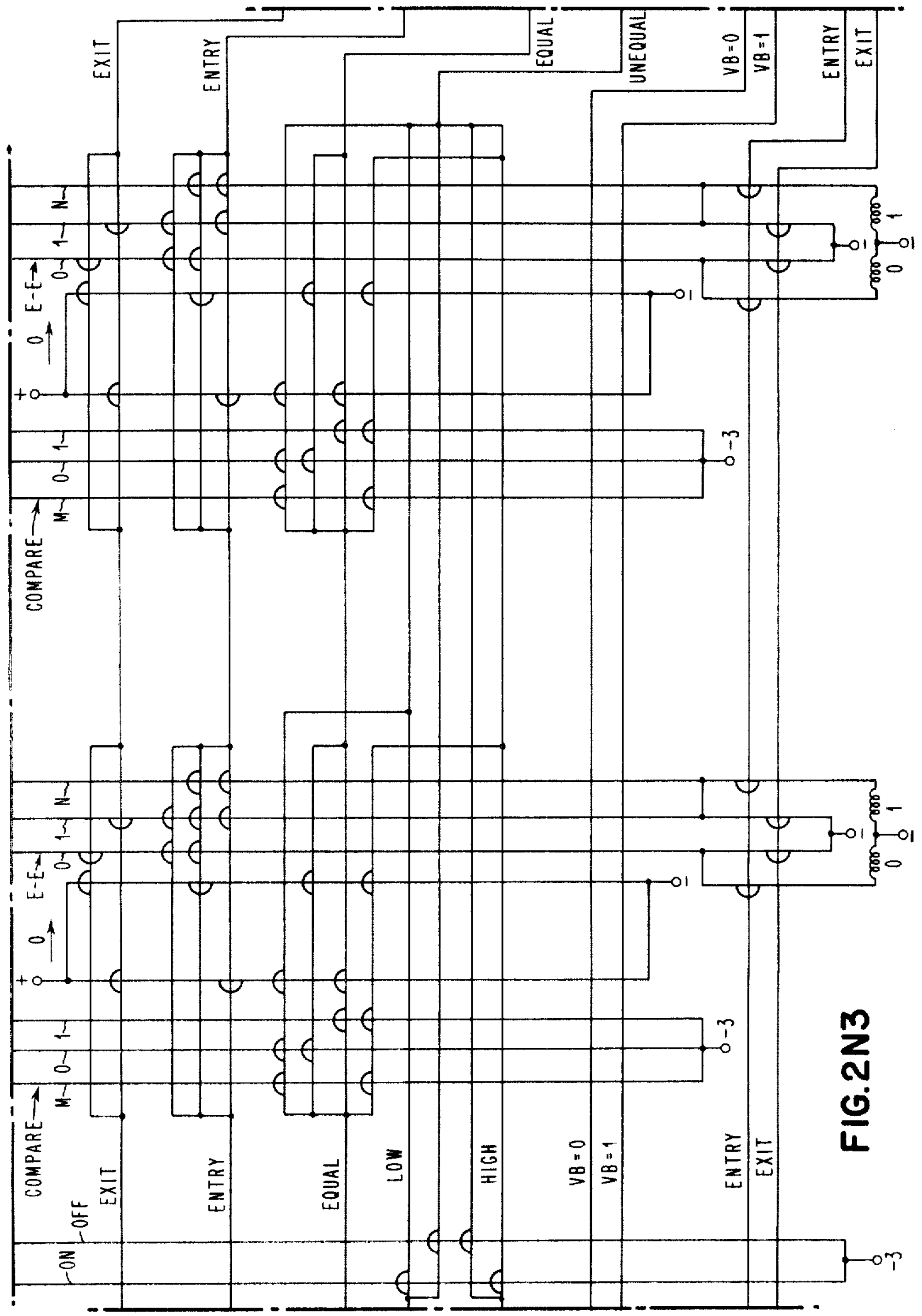
FIG.2N3

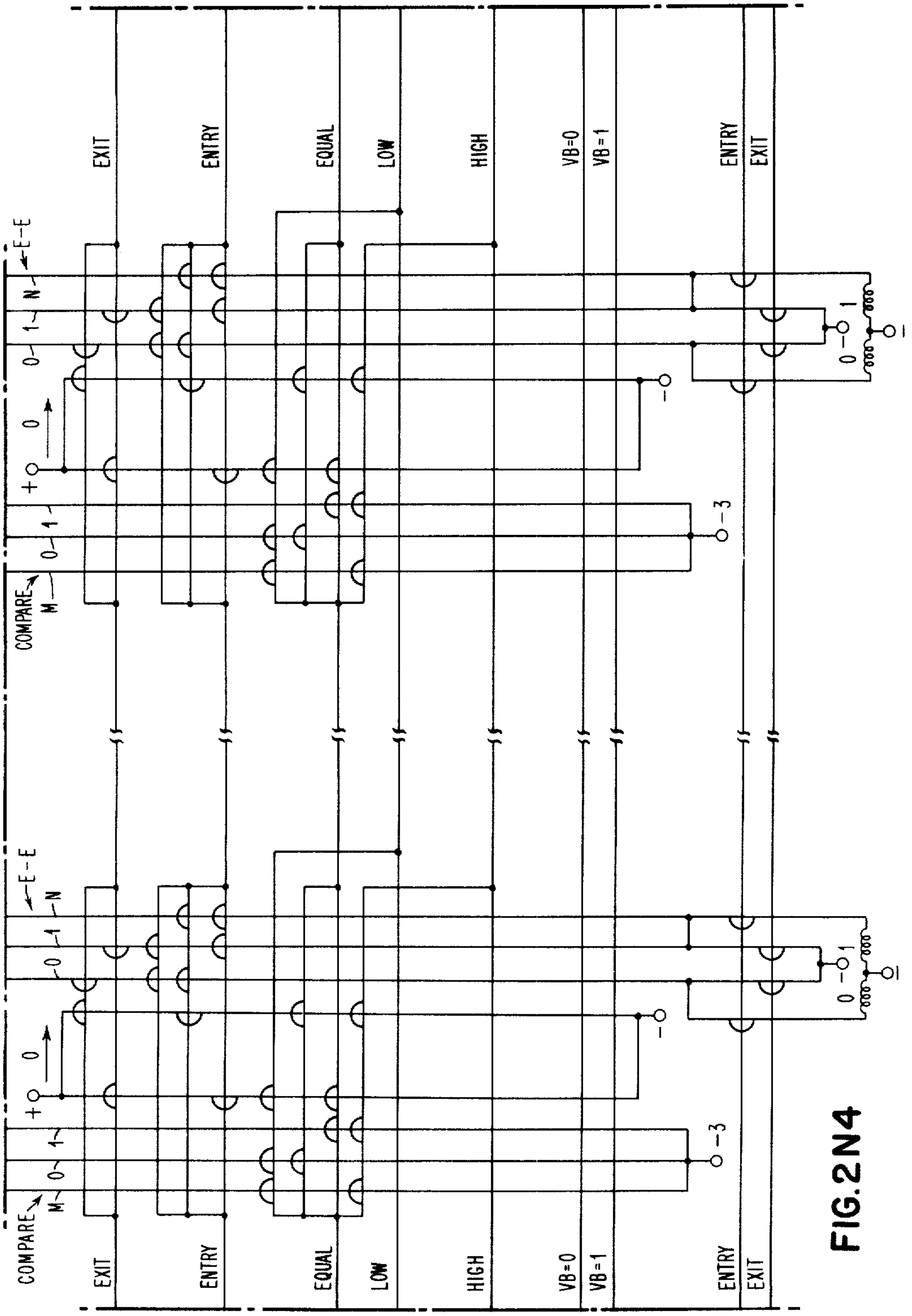
FIG.2N4

May 3, 1966 R. R. SEEBER 3,249,921

ASSOCIATIVE MEMORY ORDERED RETRIEVAL

Filed Dec. 29, 1961 49 Sheets-Sheet 47

ASSOCIATIVE MEMORY ORDERED RETRIEVAL

FIG. 5
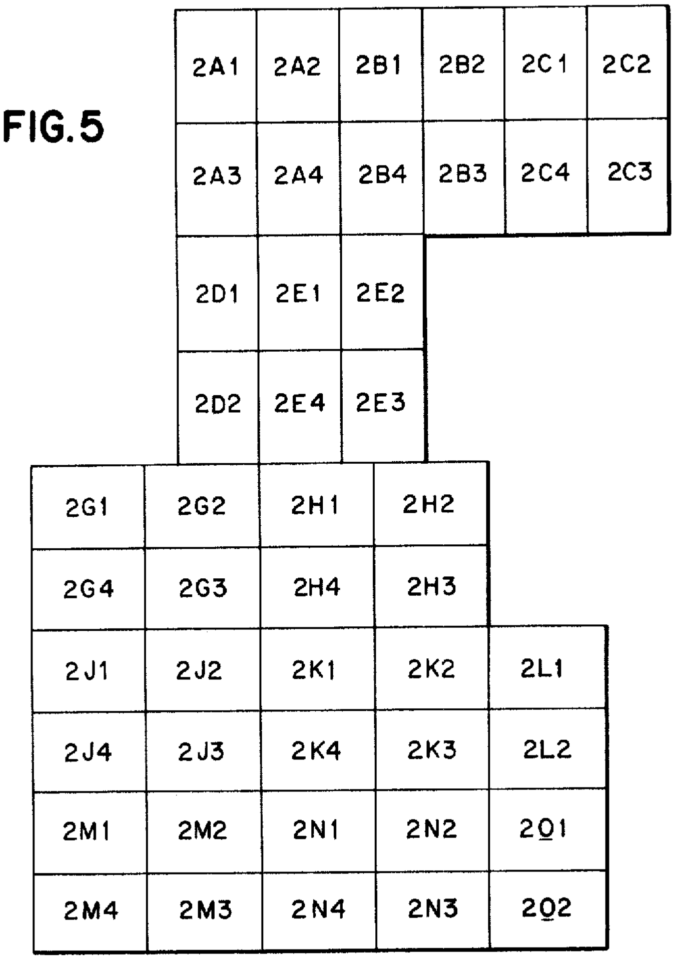
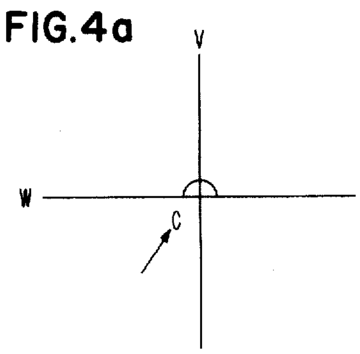
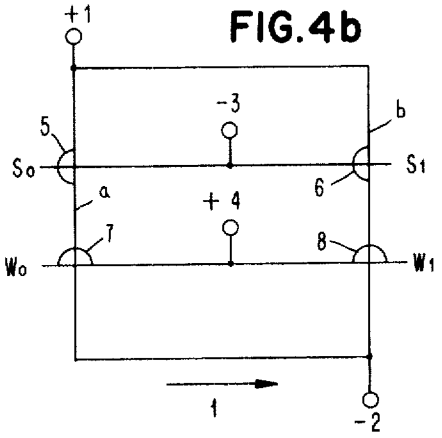
FIG. 4a, FIG. 4b

United States Patent Office 3,249,921
Patented May 3, 1966

3,249,921

ASSOCIATIVE MEMORY ORDERED RETRIEVAL

Robert R. Seeber, Poughkeepsie, N.Y., assignor to International Business Machines Corporation, New York, N.Y., a corporation of New York

Filed Dec. 29, 1961, Ser. No. 163,233
8 Claims. (Cl. 340—172.5)

This invention relates to memory systems in general, and more particularly to a fully associative memory system including sorting circuits and instructions supplied to such systems.

Memory systems can be classified by the manner in which selected discrete locations may be interrogated in order to perform read and write operations. Examples of such memory systems include memory systems having addresses identified with the physical location of the unit of data and associative memory systems that include catalog and tag memories. One form of such memory systems having addresses identified with the physical location of the data is the coordinate address memory system in which groups of selection lines are arranged in such a manner that energization of particular lines in each group is effective to select a unique word location. Associative memory systems are those in which a unit of data, such as a word, is located and selected by specifying the information content of an arbitrary portion of its structure. Whether one retrieves or modifies such unit of data is determined by an appropriate instruction. The associative region may extend over the entire word or only a portion thereof. Catalog memory systems normally require manual intervention to change the contents of the memory and include means to indicate whether or not a particular word is contained within the memory system by comparing the information stored in each register with the information contained in the particular word. Provisions may be incorporated to read the word out of storage.

The sorting of data for processing is a recurring problem of major proportions, particularly in business data processing. The concept of an associative memory reduces the need for sorting. For example, in a conventional memory, when a binary search is employed in a table look-up operation, the data must be in sorted order so that the search may be made; with an associative memory we may have direct access to items in a table by association without regard to the order in which they are stored, thus eliminating this need for sorting. There are still many places where sorting is necessary, particularly in preparing data for output. The associative memory proposed herein and to be described subsequently applies to any sorting operation that involves a high speed internal sort. The embodiment chosen to illustrate the invention employs a cryogenic memory and cryogenic switching circuits, but the principles of the invention can be carried out by other technologies. In the present invention, using Associative Memory with Ordered Retrieval (AMOR), in addition to the circuits employed by a conventional associative memory, there is employed a relatively simple circuit extending throughout memory plus additional logic in the control circuits for such memory. By using an algorism, one can locate the lowest ranking word in memory where such words may be in any random order and the sorting field may be selected at the time of sorting.

With an associative memory one may retrieve randomly stored words in order by using a counter to establish the interrogating tag. For example, if ninety employees have employee numbers consisting of two decimal digits and we wish to retrieve their records in employee-number order, we can start by retrieving employee number 00, then 01, 02, . . . 99. On ten of these retrieval tries, no retrieval will be made since only ninety of the codes have been used. But by advancing a counter a unit at a time, we have, in this case, a highly efficient ordered retrieval, since for 100 retrieval tries, we have succeeded in ninety cases. But if our sorting key was such that we had a non-dense set to be sorted, our efficiency would be quite different. For example, a ten-digit part number might be used where there were only a thousand part numbers. Employing the above method would require $10^{10}$ retrieval tries for $10^3$ successful retrievals.

For non-dense keys we need a more efficient algorism that will permit us to find the lowest-ranking key without examining all possible combinations. That is what the present invention, using the AMOR algorism, provides. Consider how the human brain approaches the problem of sorting the following four keys:

2 6 3 4 5
4 6 9 2 1
8 6 4 7 1
4 7 5 2 7

By looking only at the first digit, we could complete our sort except for the second and fourth keys which both begin with 4. In these two cases we need look at only one more digit to determine their correct order. Thus the sort can be completed without any reference to many of the right hand digits. The following shows this separation into the digits used for the sort, to the left of the line, and those not used.

2 | 6 3 4 5
4 6 | 9 2 1
8 | 6 4 7 1
4 7 | 5 2 7

The AMOR algorism works on a very similar basis, working on the binary bits of the key. Starting with the left-most bit, an interrogation is made, associatively separating the words in memory into those that match and do not match an interrogating zero in that single bit position. If there is more than one match, we must analyze the matching words further to the right to the point where, usually, there is but a single match. Having retrieved the lowest-ranking word, we can then proceed to the next higher word in much the same fashion.

What is disclosed and described herein is an implementation of an algorism for use with an associative memory. By circuitry to be described hereinafter, a set of randomly ordered words is retrieved in order by some non-preassigned key. This is in contrast to the operation of table look-up where usually the words are in order and we desire to retrieve only one of them.

Before we get into the automatic ordered retrieval properties of AMOR, it is desirable to discuss the salient features of the associative portion and to indicate how they differ from other such memories. Such salient features are described fully in copending applications entitled "Tag Address Memory," Ser. No. 809,987, filed on April 30, 1959 in the names of J. J. Lentz and R. R. Seeber, Jr. and "Memory System," Serial No. 836,753, filed on August 28, 1959 in the names of R. R. Seeber, Jr. and A. J. Scriver, Jr., both copending applications being assigned to the same assignee as applicant's assignee. The memory cycle consists of two phases established by the memory controls. During the first phase, the contents of the unmasked positions of an interrogation register condition the comparing circuits to their corresponding positions in the memory. For the positions that were masked, a mask signal is sent through the memory. A mask signal forces that position in memory to indicate an equal condition.

In the memory, a comparing current is established on an equal line going into the high order position of each word. As long as the memory positions are equal to their corresponding positions in the interrogation register or are masked, the comparing current will remain on the equal line. If at any position, there is an unequal condition, the comparing current will be diverted to the unequal line. At the end of each word register in memory, an indicator bit is set to 1 by current on the equal line, indicating an equal word register, or to a 0 by current on the unequal line. The indicator bit is part of the register select controls and is referred to as the equal bit. An equal word is defined as having its tag equal to the interrogating tag.

During the second phase of the memory cycle, the equal word register is read out of or written into depending upon the operation desired. These operations are performed by the memory control, register select control, and the read-write circuits. Details of these circuits will be discussed in conjunction with the drawings hereinafter.

In this memory system, provision is made for storage of data into the first vacant word register. A vacancy bit in each register is used to indicate whether that register is occupied or vacant. A 0 or 1 in the vacancy bit may respectively represent a vacant or occupied word register. The vacancy bit is designed so that it is possible to write into it during a read operation as well as during a write operation. Thus writing a 0 into the vacancy bit of a word register while reading that register results in a destructive read operation.

Provision is also made in this memory for handling multiple matched words. When a plurality of matched words results from an interrogation, the first matched word register is read and marked. By definition, a matched word is an unmarked equal word. The matched and marked word registers are identified by match and mark bits respectively. These bits, like the equal bit, are part of the register select controls. Therefore, during the next memory cycle, using the same tag, the next matched word is read and marked. This time the matched word is the second equal word. After all matched words have been read and marked, the mark bits are reset for all equal words.

Thus this associative memory system is basically a memory that has enough logic so that a simultaneous comparison may be made between the contents of the word registers and an interrogation register. This comparison indicates whether each word in the memory is equal or unequal (if desired, high and low indications are possible) to the information contained in the interrogation register. This comparison may be made on the entire word or on any portion thereof. As is indicated below, the features of the present invention shown and described herein with which this patent is primarily concerned are those features relating to the sorting and ordered retrieval of randomly stored words in a memory. Copending applications Serial No. 163,096 by R. R. Seeber and A. B. Lindquist and Serial No. 163,097 by A. B. Lindquist, both of which have the same title, filing date and assignee as this patent, are involved in other features of this invention as is also indicated below. However, it will be understood that the cohesion of description and correlation between the various inventive contributions requires interrelation of portions and features of all three applications. These features are:

(1) *Enter under tag selection.*—Information in an entry register may be entered into the first match word or into all matched words in memory during one memory cycle. This feature is of primary concern to application Serial No. 163,096 but is also of concern to application Serial No. 163,097.

(2) *Exit under tag selection.*—Matching words are retrieved, destructively or non-destructively. In the case of multiple matched words, one word at a time is retrieved until all words have been selected either destructively or non-destructively. This also applies to instruction words. This feature is also of primary concern to application Serial No. 163,096.

(3) *Selected field entry.*—Substitution of portions of a matched word or words in memory is provided without having to bring the word or words out of memory. Like the foregoing two features, this feature also is of primary concern to application Serial No. 163,096.

(4) *Automatic ordered retrieval of randomly stored data words.*—Simultaneous ascending and/or descending sequences of words identified by desired tags may be retrieved from randomly stored data. In this system, it takes, on the average, less than 3 N memory cycles to sort out N words in storage regardless of the size or number of tags in the word to be sorted on.

High ordered tags need not be placed physically to the left of lower ordered tags in the construction of a word.

Program control of the tags is by character in this system. However, the system may be changed to bit control of the tags, if desired. This feature is more particularly of concern to this patent.

(5) *Ordered retrieval modifications.*—By adding additional circuits, the average number of memory cycles to sort out N words is reduced from 3 N to 2.5 N. This feature is also of primary concern to this patent. Also, when doing table look-up on a set of randomly stored data words, it may be desirable to do interpolation. This system provides a means for obtaining the next highest and next lowest tag as an aid for interpolation. This feature is primarily of concern to application Serial No. 163,097.

(6) *Range retrieval.*—It is possible to retrieve data lying in the range between two limits. Also, that which is less than the lower limit, or higher than the higher limit, may be separately retrieved. Application Serial No. 163,097 is primarily concerned with this feature.

It is an object of the invention to provide an improved memory system that is fully associative.

It is yet another object of the invention to provide an improved fully associative memory employing superconductive elements.

It is yet another object of the invention to obtain either an ascending or descending sequence of words identified by desired tags from randomly stored data.

It is an other object to obtain such ascending and descending sequences of words identified by desired tags and either destroy or retain the information in memory during the obtaining of such ascending and descending sequences.

It is yet another object to employ selecting means such that an associative memory sort is obtained without requiring that higher ordered tags be placed physically to the left of lower ordered tags.

It is still another object to permit determination of the lowest ordered word in a randomly stored memory so that higher ranking words can be sequentially ordered.

It is a further object to provide associative searching means wherein any ordered character of an interrogation word can be associated with a selectable ordered character position in memory.

A still further object is to advantageously employ ternary counter means for rapid sorting of randomly stored data in a memory.

It is yet another object of this invention to provide an improved memory system having circuits for retrieving data on the basis of either a portion or all of the data content in memory.

The foregoing and other objects, features and advantages of the invention will be apparent from the following more particular description of a preferred embodiment of the invention as illustrated in the accompanying drawings.

FIGURES 2A and 2B show the ternary counter employed as part of the ordered retrieval system. A portion of FIGURE 2B also includes a portion of the Memory Control circuitry, of which the main portion is shown in FIGURE 2C.

FIGURES 2D and 2E depict the Character Select Matrix of the AMOR system as well as the control line interconnections for the Memory Control and the Character Select Matrix.

FIGURES 2G and 2H show the details of the Entry Register and Select Register of the AMOR system and 2J and 2K show the details of the first World Register in memory.

FIGURES 2M and 2N represent additional Word Registers in memory.

FIGURES 2L and 2O are additional controls for such additional corresponding Word Registers.

FIGURE 4A shows a basic cryotron element used throughout the present system and FIGURE 4B shows a two state storage device employing such cryotron elements.

FIG. 5 is a diagrammatic layout of FIGS. 2A, 2B, 2C, 2D, 2E, 2G, 2H, 2J, 2K, 2L, 2M, 2N, and 2O. However, because more than one sheet is needed to illustrate such figures in detail, FIG. 2A has been further broken down as a quartet of figures, namely, FIGS. 2A1, 2A2, 2A3 and 2A4. FIG. 2B is the quartet of FIGURES 2B1, 2B2, 2B3 and 2B4; FIG. 2C is the quartet of FIGS. 2C1, 2C2, 2C3, and 2C4; FIG. 2D is broken down into the set labeled FIGS. 2D1 and 2D2; FIG. 2E is the quartet of FIGS. 2E1, 2E2, 2E3 and 2E4; FIG. 2G becomes FIGS. 2G1, 2G2, 2G3, 2G4; FIG. 2H becomes FIGS. 2H1, 2H2, 2H3 and 2H4; FIG. 2J becomes 2J1, 2J2, 2J3 and 2J4; FIG. 2K becomes FIGS. 2K1, K2, 2K3 and 2K4; FIG. 2L becomes 2L1 and 2L2; FIG. 2M becomes FIGS. 2M1, 2M2, 2M3 and 2M4; FIG. 2N becomes 2N1, 2N2, 2N3 and 2N4; FIG. 2O becomes FIGS. 2O1 and 2O2.

Figure 1:
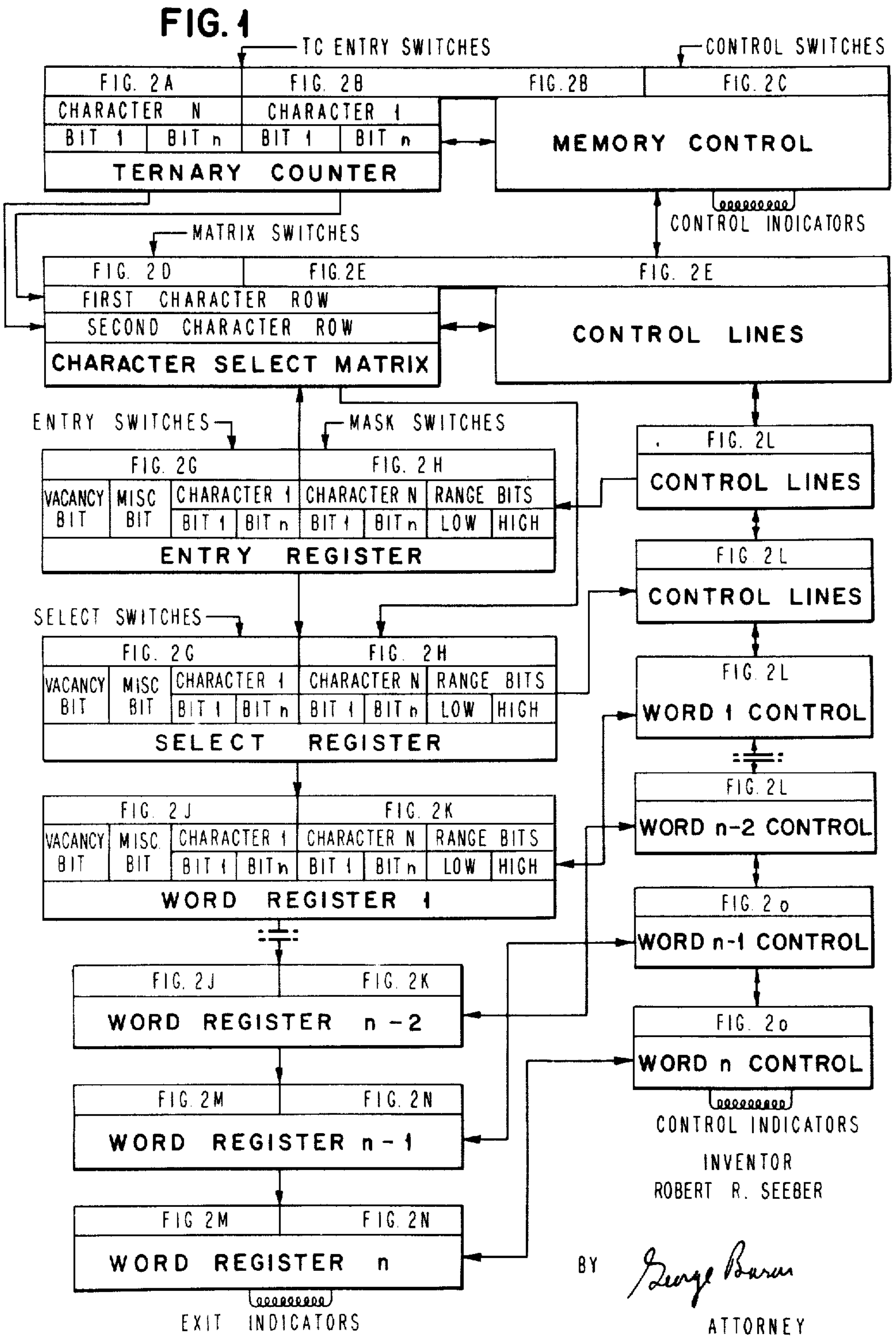
FIGURE 1 shows the block diagram for the AMOR system and also indicates the manner in which the FIGURES 2A to 2O are to be interconnected.
Figure 2N:
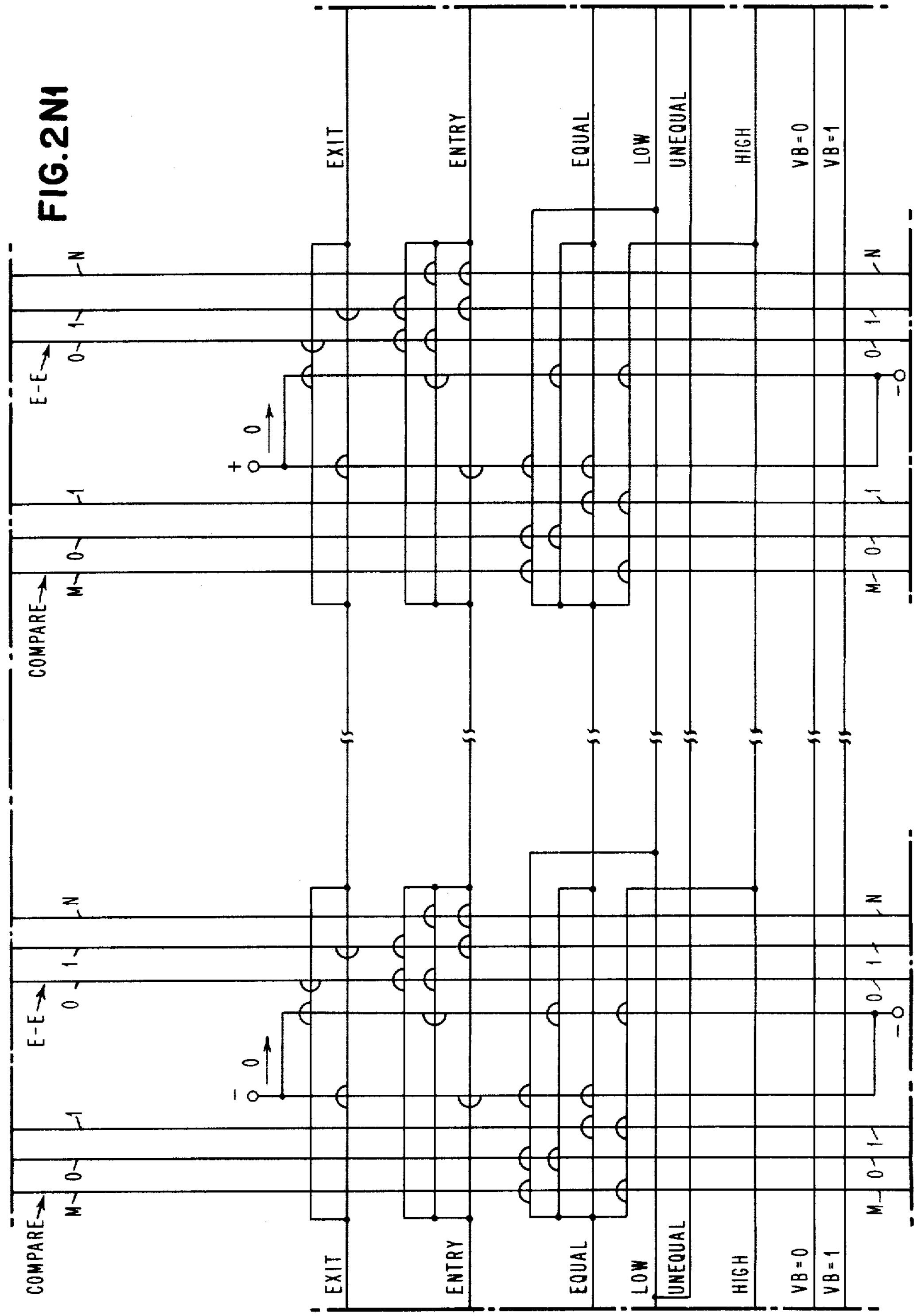
Figure 201:
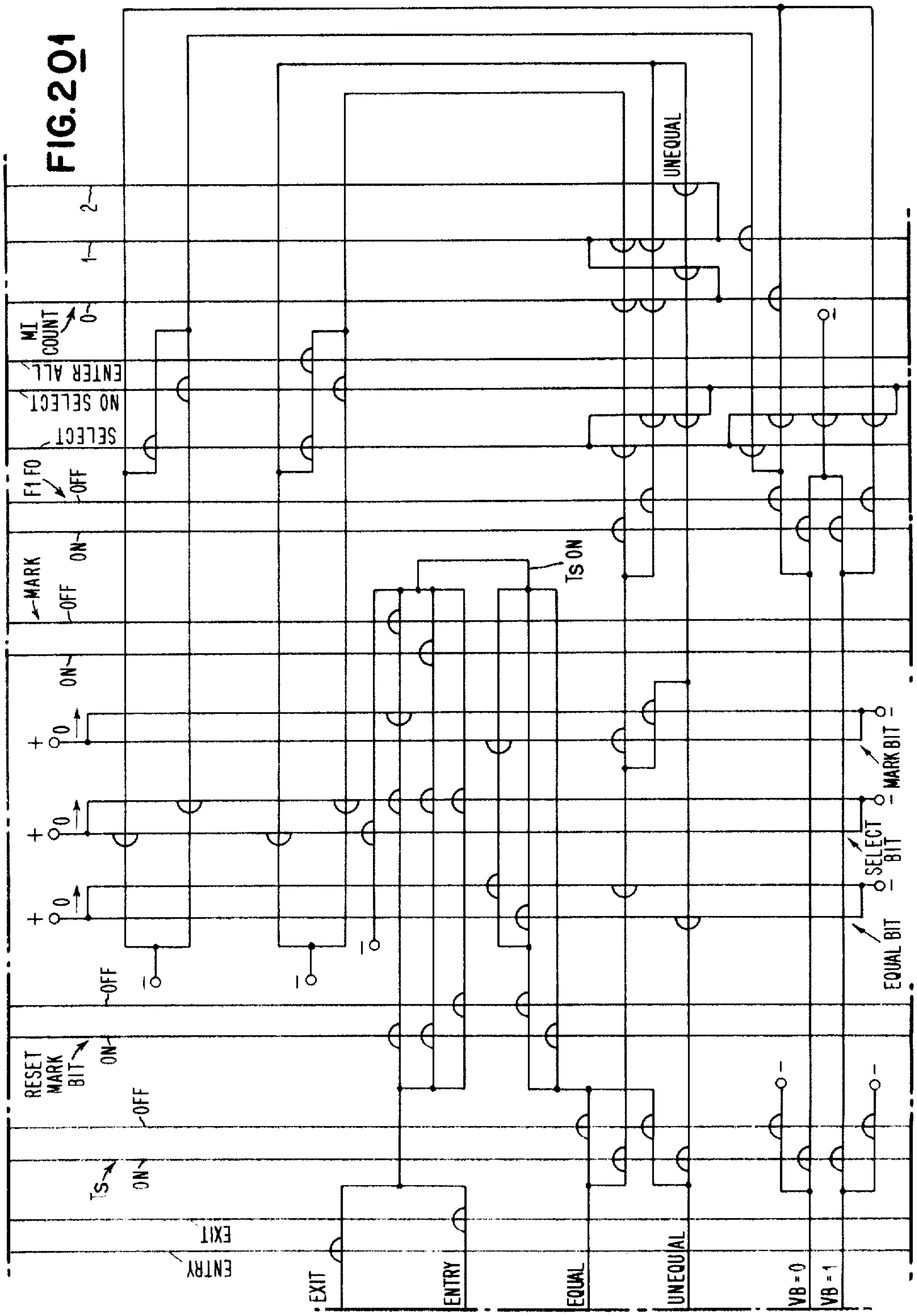
Figure 202:
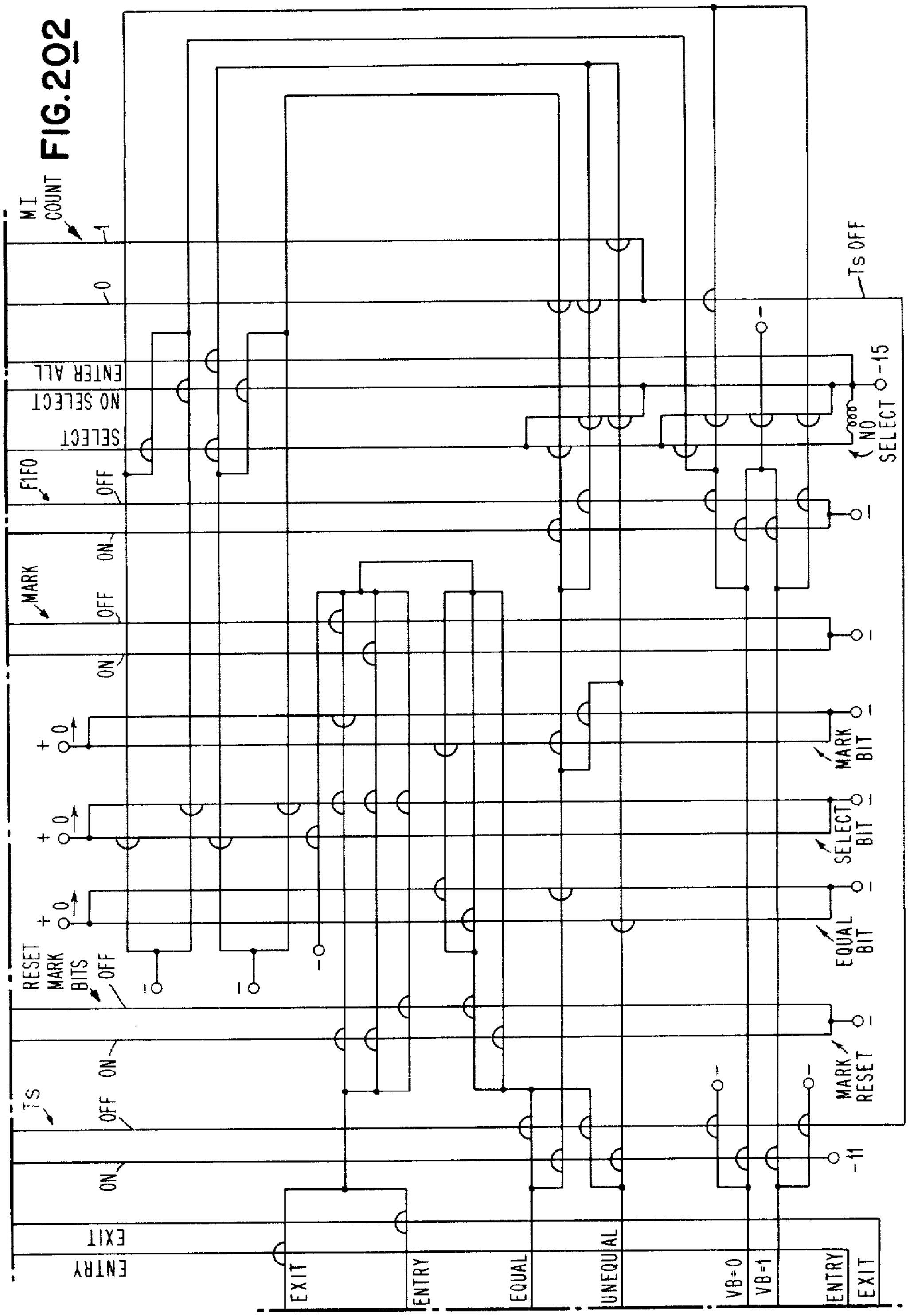

Throughout the specification, a reference to any of the detail FIGS. 2A, 2B, 2C will include a reference, by incorporation, to any of its quartet or duet of FIGS. 2A1, 2A2, . . . or 2B1, 2B2, . . . etc.

GENERAL DESCRIPTION

FIGURE 1 shows the block diagram for the AMOR system. The lines with the arrows indicate the communication between the blocks. Communication between AMOR and the rest of the computing system is accomplished by switches and indicators. Such interconnections of the Memory Controls, the Ternary Counter, the Entry Register, the Select Register, the Word Register N, and the Word N controls are shown diagrammatically and the specifics of such interconnections are shown in FIGS. 2A . . . to 2O.

In this block diagram, only four word registers of eight bits each are shown. The word registers consists of a Vacancy Bit, Miscellaneous Bit, Character Bits, and Range Bits. The Vacancy Bit is used to distinguish between the occupied and unoccupied word register. The Miscellaneous Bit is used in a selected field entry operation and Character Bits represent main storage of data. The Range Bits are used in a range retrieval operation. The purpose of these bits and blocks will become clear as the main features of AMOR are discussed in detail.

The main features of the AMOR system which were noted previously will be described generally prior to setting forth their implementation, using FIGS. 2A to 2O to aid in understanding such implementation.

(1) *Enter under tag selection*

To enter any information into the memory, the Mask Switches of the Entry Register (see FIGS. 2G and 2H) must be set to indicate which array of bits or characters should be used for comparing. With the exception of the Vacancy Bit, the Miscellaneous Bit, and the Range Bits, masking is done on a character basis. It is understood that a character could include any number of bits. If it is assumed, for example, that a character has 6 bits and if six characters are needed to define a field, then 36 ($6\times6$) bits are needed in making a field comparison, not including the Vacancy Bit, the Miscellaneous Bit and the Range Bits.

The information that is to be used as the tag and information to be entered into the memory is brought into the Entry Register through Entry Switches. An interrogation of the memory is performed using the designated tag fields, and the Word Registers containing the matched tags are indicated. Now, depending upon the desires of the programmer, the first matched word or the first vacant word after a group of matched words, or all matched words, are filled with the information that was stored in the Entry Register. Some examples of entry operations follow:

(*A*) *Enter into first vacant word register.*—To enter into the first vacant Word Register, the Vacancy Bit is the only bit that is used as a compare bit. Let us say a 1 stored in the Vacancy Bit position represents an occupied Word Register and a 0 represents a vacant Word Register. The Memory Controls are set to enter into the first matched Word Register, the Mask Switches are set to compart only on the Vacancy Bit, and a 0 is entered into the Vacancy Bit portion of the Entry Register along with the other information to be stored. The memory is interrogated and the first matched word, in this case the first vacant word, is located and then the contents of the Entry Register are transferred to that matched register. The Vacancy Bit is designed so that, although a 0 is entered into the Entry Register and a 0 is compared, a 1 is stored in the Vacancy Bit position of the selected Word Register, once entry of a word from the Entry Register to a Word Register takes place, thus indicating an occupied register.

(*B*) *Add a word to the end of a list.*—When adding a word to an already existing list of words in a memory such that a first-in-first-out (FIFO) system is insured, the name of the list is used as a tag and the Entry First and FIFO control switches are turned on. Then during an interrogation, the first vacant Word Register after the last matched word will be conditioned to accept the contents of the Entry Register. For a FIFO operation, a 1 is entered into the Vacancy position of the Entry Register and a 1 is compared and stored.

(*C*) *Reset all memory bits to 0.*—To reset all memory bits to 0, the memory controls are set to enter into all matched words, the Mask Switches are set to all mask, i.e. no compare condition, and all 0's are entered into the Entry Register. The memory interrogation would indicate all words in memory as matched, and so all 0's will be entered into the memory.

(2) *Exit under tag selection*

A word in storage is retrieved by association of at least a portion of its information content. In this system only one word at a time may be retrieved. In the case of multiple-like tags, two options are at the discretion of the programmer. These options are available through program control of the Memory Control Mark Switch.

With the Memory Control Mark Switch set to on, as each word is retrieved, it is marked to indicate that it has been retrieved. In this manner, all words containing the matched tags will be retrieved, and, as the last word of the group is retrieved, the marks are reset so that the group of words may be retrieved again if required at some later time. With the Memory Control Mark Switch set to the off position, the word is not marked as it is being retrieved. This implies that on the next interrogation of memory, with the same tag, that same word will be retrieved again. It should also be added here that the programmer may reset a group of Mark Bits at any desired time with the aid of a Reset Mark-Bits Switch.

The Vacancy Bit of the Entry Register will normally be used as part of the tag in an exit operation, and so such Vacancy Bit will contain a 1 if an exit of its associated word is desired. Recall that a 1 in the Vacancy Bit position indicates a non-vacant Word Register. The Vacancy Bit is also designed so that the complement of the contents of the Vacancy Bit position in the Entry Register may be entered in the Vacancy Bit position of a selected word register during an exit operation. Thus, it is possible to perform a non-destructive or destructive read-out by, respectively, setting the Vacancy Bit to no-entry or entry during an exit operation.

(3) *Selected field entry*

It is sometimes desirable to enter into, modify, or substitute only a portion of a selected word or words in the memory without taking the word out of memory. These operations are accomplished with the aid of the Select Register. With the exception of the Vacancy Bit, the Miscellanous Bits, and the Range Bits, control of the Select Register is by character through the Select Switches. These switches have three states: The "Entry-Exit" state, the "Sort" state, and the "Non-Entry" state.

When a Select Switch is set to the No-Entry state, the information contained in that particular bit or character position in the Entry Register will not affect the contents of the corresponding position in the matched Word Register. Selected field entry is helpful in updating of records. Take for example a payroll operation wherein this invention makes it possible to associate on an employee number and selectively enter into the matched employee record a new employee rate without taking that record from storage.

Another more elaborate example would be where it was desirable to change a department number from 540 to 610 in a group of payroll records. The procedure here would be to first tag on the payroll record code and selectively enter 0 into a Miscellaneous Bit position of all the payroll records. Then match on the department field of the payroll record code using the department code 540 and enter a 1 into the Miscellaneous Bit positions of all matched words that were previously set to 0. Next tag on the same payroll record code and compare on this Miscellaneous Bit position with a 1 and selectively enter 610 into the department field of these matched word registers.

(4) *Automatic ordered retrieval of randomly stored data words*

This is the main feature of this fully-associative memory system, hence the title: Associative Memory with Ordered Retrieval (AMOR). This sorting system has a certain similarity to a binary sort or to a punch-card block sort. For example, a human being is faced with sorting the following four numbers in order:

2 6 3 4 5
4 6 9 2 1
8 6 4 7 1
4 7 5 2 7 as was indicated as a problem earlier in this specification. He can do most of the sorting by looking only at the first digit. Only in the cases of the second and fourth numbers must he look beyond the first digit. AMOR works much in the same fashion, dealing with a bit at a time, working from left to right, i.e., from highest order bit to lowest order, but continuing to the right only so far as necessary to identify the single next-higher word.

The interrogation of the sorting field is done through a Ternary Counter in which the settings are modified as the sorting proceeds. The Ternary Counter keeps track of the bit-values being interrogated. The three states of each Ternary Counter position are designated as "M, 0, 1," representing "Mask, binary 0, binary 1." Carry left and right provisions are provided for. When a counter is in the M position, matching of a word in memory is not required in that bit position. When the counter is in the 0 position, a binary 0 is searched for in that position and similarly for a binary 1.

Except for the start of the sort operation, the rules for the operation of the Ternary Counter are a function of the Match Indicator. This indicator tells how many words in memory match the setting of the Ternary Counter but only in abbreviated form:

MI equals 0=no matches
MI equals 1=one match
MI equals P=more than one match

At the start of the sort operation, all of the positions of the Ternary Counter are set to the M state. After the first interrogation of the memory, using the state of the Ternary Counter and possibly some fixed tags in the Entry Register, for identifying the words on which the sort is to take place, the highest ordered position of the sorting field in the Ternary Counter is located and advanced. The rightmost position of the Ternary Counter is defined as the lowest ordered position of the sorting field and positions to the left thereafter are considered as successively higher ordered positions. Thus in the memory, if a field to be sorted consists of ten positions, the rightmost ten positions of the Ternary Counter will be used as the sorting or interrogating tag.

After each of the memory interrogations, the Match Indicator is consulted to determine the next state of the Ternary Counter. Before the rules are stated for establishing the next state of the Ternary Counter, it is desirable to mention two definitions. First, the lowest ordered position of the Ternary Counter whose state is either a 0 or a 1 will be defined as the Operating Position (OP). Second, the position immediately to the right of the OP will be defined as the Next Position (NP). The rules that are now stated tell not only how to advance the Ternary Counter, but also when to select a word out of memory so that it will be retrieved in an ascending order.

*Rule 1.*—When the *MI=P*, if the OP is the lowest order position of the Ternary Counter, indicating multiple like sorting keys, retrieve the first matched word and mark the retrieved word; if the OP is not the lowest order position, do not retrieve. Also, when the *MI=P*, the NP is to be advanced in preparation for the succeeding interrogation. (It should be observed that when the OP is the lowest order position of the Ternary Counter, the state of the Ternary Counter does not change until all multiple like sorting keys have been retrieved, at which time the Mark Bits are reset.)

*Rule 2.*—When *MI*=1, retrieve the matched word and advance the OP.

*Rule 3.*—When the *MI*=0, do not retrieve but advance the OP.

In addition to the above ordered retrieval rules, when a Ternary Counter position is advanced from the 1 state to the M state, a carry is produced and directed into the next higher ordered position. When a carry is directed into a position whose state is M, this indicates the end of the sort operation.

EXAMPLE 1

| Interrogations | State of Ternary Counter Bit Position | | | | | | State of MI | Rule Applied |
|---|---|---|---|---|---|---|---|---|
| | 1 | 2 | 3 | 4 | 5 | 6 | | |
| 1 | M | M | M | M | M | M | P | Start of Sort. |
| 2 | 0 | M | M | M | M | M | P | 1. |
| 3 | 0 | 0 | M | M | M | M | P | 1. |
| 4 | 0 | 0 | 0 | M | M | M | P | 1. |
| 5 | 0 | 0 | 0 | 0 | M | M | 1 | 2. |
| 6 | 0 | 0 | 0 | 1 | M | M | 1 | 2. |
| 7 | 0 | 0 | 1 | M | M | M | 0 | 3. |
| 8 | 0 | 1 | M | M | M | M | 1 | 2. |
| 9 | 1 | M | M | M | M | M | P | 1. |
| 10 | 1 | 0 | M | M | M | M | P | 1. |
| 11 | 1 | 0 | 0 | M | M | M | 0 | 3. |
| 12 | 1 | 0 | 1 | M | M | M | P | 1. |
| 13 | 1 | 0 | 1 | 0 | M | M | 1 | 2. |
| 14 | 1 | 0 | 1 | 1 | M | M | 1 | 2. |
| 15 | 1 | 1 | M | M | M | M | 1 | 2. |
| | M | M | M | M | M | M | | End of Sort. |

| Register No. | Word Bit Position | | | | | | Interrogation When Retrieved |
|---|---|---|---|---|---|---|---|
| | 1 | 2 | 3 | 4 | 5 | 6 | |
| 1 | 1 | 0 | 1 | 1 | 0 | 1 | 14 |
| 2 | 1 | 1 | 0 | 1 | 0 | 1 | 15 |
| 3 | 0 | 0 | 1 | 0 | 0 | 1 | 6 |
| 4 | 0 | 1 | 1 | 0 | 0 | 1 | 8 |
| 5 | 1 | 0 | 1 | 0 | 1 | 1 | 13 |
| 6 | 0 | 0 | 0 | 0 | 1 | 0 | 5 |

Example 1, above noted, shows the steps involved in sorting six words on six bits. Only six bits of the Ternary Counter and six bit positions of the memory are shown. The interrogations are numbered 1 through 15 and the states of the Ternary Counter and Match Indicator are shown for each interrogation. In addition, there is shown the rule that is applied to obtain the state of the Ternary Counter for the next interrogation. There is also shown to the right of each word a number which indicates the interrogation when this word was retrieved. Note that at the start of the sort operation, the Ternary Counter is in the all M state. Then, after the first interrogation, the high order bit position of the sorting field in the Ternary Counter, bit position 1 in the example, is advanced to a 0. Thereafter the Match Indicator dictates how the Ternary Counter is to be advanced. For example, after the seventh interrogation, using a tag of 001 MMM, the $MI=0$ which, according to Rule 3, tells us to advance the OP. The OP, as defined, is bit position 3 for the interrogation and since it is in the 1 state it is advanced to the M state which results in a carry into bit position 2. Bit position 2 is thus advanced from the 0 state to the 1 state and the state of the Ternary Counter for the next interrogation, interrogation 8, is 01MMMM.

In summary, note that the last two positions of the sorting field did not enter into the sort operation. Also note that fifteen retrieval tries were required to recover the six words. Extended trials on small random sets of words and mathematical analysis indicates the mean number of tries is about three for each successful retrieval.

(5) *Ordered retrieval modifications*

By modifying the previously stated ordered retrieval rules, it is possible to reduce the average number of retrieval tries from three to about two and one-half. These modified rules are the ones that are actually implemented in the schematic showing of the invention in FIG. 2 and are as follows:

*Rule 1.*—When the $MI=2$ or $P$, if the OP is the lowest order position of the Ternary Counter, indicating multiple like sorting keys, retrieve the first matched word and mark the retrieved word; if the OP is not the lowest order position, do not retrive. Also when the $MI=2$ or $P$, the NP is to be advanced in preparation for the succeeding interrogation. (It should be observed that when the OP is the lowest order position of the Ternary Counter, the state of the Ternary Counter does not change until all multiple like sorting keys have been retrieved, at which time the Mark Bits are reset.)

*Rule 2.*—When $MI=1$ (except when Rule 5 applies), retrieve the matched word and advance the OP.

*Rule 3.*—When $MI=0$, do not retrieve but advance the OP.

*Rule 4.*—At the start of a Match Indicator Cycle, record the position of the OP. The Match Indicator Cycle is defined as starting when the $MI=2$ and ending when the $MI=1$, providing that at some time between these two indications there was a $MI=1$ or a $MI=2_M$ where $2_M$ means a $MI=2$ during a multiple like tag.

*Rule 5.*—At the end of a Match Indicator Cycle, reset to M all Ternary Counter positions to the right of the recorded position (see Rule 4) and advance the recorded position. Also retrieve the matched word and reset the recorded bit.

*Rule 6.*—When $MI=0$, which has been preceded by either a $MI=2$ or $P$, advance the NP and do not select. But since Rule 3 also applies, the OP is also simultaneously advanced.

EXAMPLE 2

| Interrogation | State of Ternary Counter Bit Position | | | | | | MI | Rules Applied |
|---|---|---|---|---|---|---|---|---|
| | 1 | 2 | 3 | 4 | 5 | 6 | | |
| 1 | M | M | M | M | M | M | P | Start of Sort. |
| 2 | 0 | M | M | M | M | M | P | 1. |
| 3 | 0 | 0* | M | M | M | M | 2 | 1, 4. |
| 4 | 0 | 0* | 0 | M | M | M | 2 | 1. |
| 5 | 0 | 0* | 0 | 0 | M | M | 1 | 2. |
| 6 | 0 | 0* | 0 | 1 | M | M | 1 (end of MI cycle). | 5. |
| 7 | 0 | 1 | M | M | M | M | 1 | 2. |
| 8 | 1 | M | M | M | M | M | P | 1. |
| 9 | 1 | 0* | M | M | M | M | 2 | 1, 4. |
| 10 | 1 | 0* | 0 | M | M | M | 0 | 3, 6. |
| 11 | 1 | 0* | 1 | 0 | M | M | 1 | 2. |
| 12 | 1 | 0* | 1 | 1 | M | M | 1 (end of a Match Ind. cycle). | 5. |
| 13 | 1 | 1 | M | M | M | M | 1 | 2. |
| | M | M | M | M | M | M | | End of Sort. |

| | Word Bit Position | | | | | | Interrogation when Retrieved |
|---|---|---|---|---|---|---|---|
| | 1 | 2 | 3 | 4 | 5 | 6 | |
| | 1 | 0 | 1 | 1 | 0 | 1 | 12 |
| | 1 | 1 | 0 | 1 | 0 | 1 | 13 |
| | 0 | 0 | 0 | 1 | 0 | 1 | 6 |
| | 0 | 1 | 1 | 0 | 0 | 1 | 7 |
| | 1 | 0 | 1 | 0 | 1 | 1 | 11 |
| | 0 | 0 | 0 | 0 | 1 | 0 | 5 |

Example 2, noted above, shows the same data that was sorted in Example 1. However, in Example 2, the modified ordered retrieval rules were applied which resulted in a saving of two retrieval tries. The asterisks above the 0's shown at interrogations 3 through 6 and 9 through 12 indicate that these positions were the OP when Rule 4 was applied.

It is also possible with the aid of a Character Select Matrix to provide enough flexibility such that higher ordered sorting fields need not be placed physically in the memory to the left of lower ordered sorting fields. In addition, this matrix allows for simultaneous ascending and descending ordering of the desired sorting fields. All that is necessary to perform a descending sort on a desired field is to complement the output of that field as it comes from the Ternary Counter. The complement of M, 0, 1 is defined to be M, 1, 0 respectively.

The Character Select Matrix is controlled by the characters that are contained in a sort field select word which immediately precedes a sort instruction word. The character code in a character position of the sort field select word determines whether that character position is to be used for sorting or not for sorting. If the character is to be used for sorting, the code further tells what order in the sorting field the character position should take and also whether the sort on this position is to be ascending or descending.

Take a word in a memory register relative to personnel records that is composed of the following twelve characters:

| | | | | | | | | | | | |
|---|---|---|---|---|---|---|---|---|---|---|---|
| 1 | 2 | 3 | 4 | 5 | 6 | 7 | 8 | 9 | 10 | 11 | 12 |
| J | O | N | E | S | 2 | 1 | 6 | 1 | 5 | 1 | 0 |

It may be desired to sort by shift, which is field number 9, and the latter needs only one character to identify it, and by employee number, which is composed of three characters, 6, 7 and 8. It may also be desired to obtain the names of those who work on the first shift (character #9=1) in a descending order but obtain a sort of employee numbers by ascending order. A seven bit code is arbitrarily chosen to identify each character. An example of a 7 bit character code would look like this:

1 character portion of the Sort Field Select Word 0 0 0 0 0 0 0 ______ No sort.
0 0 0 0 0 1 0 ______ Ascending Sort, 1st (low order) position of sorting field.
0 0 0 0 0 1 1 ______ Descending Sort, 1st position of the sorting field.
0 0 0 0 1 0 0 ______ Ascending Sort, 2nd position of the sorting field.

etc.

With this code, a 64 character sorting field may be uniquely classified as to its ascending or descending ordering and to what relative position each character should take. The first bit, reading from right to left, indicates the kind of sort desired; for example, a "0" indicates ascending sort and a "1" a descending sort. Remaining six bits indicate the order in the sorting field the associated character position should take.

In the example given, the 6th character would be written as 0000110, the seventh character as 0000100, the eighth character as 0000010. All three characters state that they are part of an ascending sort and that character 6 is the 3rd position of the sorting field going from low to high order, character 7 is the 2nd position in going from low to high order, and character number 8 is the 1st position of the sorting field in going from low to high order. The ninth character, pertaining to the employee's work shift (e.g., 1st work shift, 2nd work shift or 3rd work shift) is written as 0001001, indicating that a descending sort on this character is desired and it occupies the 4th position of the sort in going from low to high order. Thus, the Character Select Matrix, when its inputs have been the previous coded information, the sort will treat character #9 as being of a higher order than character #8, even though in all the Word Registers in Memory, character #9 appears as a lower order characters 6, 7 and 8.

Another modification is that input circuits have been added to the Ternary Counter so that an external number may be stored in the counter. This allows the AMOR system to start sorting from a given number or numbers, either in an ascending order, descending order, or combination thereof. It should be noted here that in order to perform a descending sort starting from a given number, that number must be stored in its one's complement form in the Ternary Counter. Also these circuits allow for resetting of all Ternary Counter positions to the M state. These two features, being able to start sorting from a given number and being able to reset the Ternary Counter to the all M state at any desired sort cycle, allow a programmer to quickly find the next higher or next lower number from a given number in a set of randomly stored tags.

*Range retrieval*

The last two bits of each Word Register are called Range Bits. The last bit is referred to as the High Range Bit and the next to last as the Low Range Bit. These bits contain all of the properties of the other bits in the Word Register. When a word in a memory register is higher than the interrogating word, then its high line output sets its corresponding high Range Bit to a "1" and when such word is lower than the interrogating word, its low line output sets its corresponding low Range Bit to a "1." This feature provides for a quick identification of words in memory whose tags fall between a lower and upper bound and/or whose tags fall outside those bounds. After the Range Bits have been set in accordance with an initial interrogation, an appropriate retrieval of the high and low words can be made by interrogating on the Range Bits in the Entry Register and the Word Registers in the normal retrieval of first matched words of a plurality of matched words.

CIRCUIT DETAILS

FIGURE 2 refers to the details of the AMOR system. This figure is divided into sections labeled 2A through 2O.

The crossed film cryotron shown in FIG. 4*a* is used in the design of the system and is represented symbolically as a thin-film, single cross-over cryotron C. The gate conductor W is identified by a straight line having the diameter of a semi-circle superimposed on a straight line. The control conductor V is identified by a straight line at right angles to the gate conductor W and bisecting the diameter of the semi-circle.

For example, refer to FIGURE 4*b* which shows a two state storage device and its associated input and output circuits. The storage device consists of current source +1, current sink −2, and the two paths between the source and sink labeled *a* and *b*. Current flowing through path "*a*" represents a 1 in storage whereas current through path "*b*" represents a 0 in storage.

To store a 0, current is put on the $S_0$ line and no current on the $S_1$ line. This makes cryotron 5 resistive and leaves cryotron 6 superconductive. Thus the current from source +1 is directed through path *b* to current sink −2. Once the current from source +1 is established in path *b*, the current on line $S_0$ may be removed. However, the current on line *b* will continue to flow and no current will flow on line *a* even though line *a* is now superconductive.

To sense the state of the bistable storage device of FIG. 4*b*, current is applied to node +4. With current on the *b* line of the storage device, cryotron 8 would be resistive and cryotron 7 superconductive. Thus the current at node +4 would be directed through path $W_0$ indicating a 0 stored. If superconducting current had been flowing in path *a*, indicating a stored 1, cryotron 7 would be resistive and current entering at node +4 would be directed through path $W_1$, indicating the reading of a 1.

Adding another path to the storage device, as shown hereinafter, would make it a three state storage device. The input and output circuits would use the same principles as the two state device.

In illustrating the invention, "+" and "−" signs have been used to designate the connections to a current source, but the actual polarity of the connections of each source and sink may be interchanged. Also, many separate pairs of "+" and "−" signs are shown, but these separate circuits may be connected in series to a single common source. To retain constant input current during switching operations where slightly different characteristics of cryotrons would cause transient conditions, an inductance may be connected in series between outputs and inputs of the circuits to be described.

The memory circuit details will be discussed in four sections:

(1) Memory Controls
(2) Memory Interrogation
(3) Entry—Exit
(4) Ordered Retrieval

(*1*) *Memory controls*

The explanation of the memory controls will be oriented around the external memory control switches by which the rest of the computing system communicates with the AMOR system. Such memory control switches can be actuated by programmed instruction words through circuits not shown. The reasons for the switches and how they affect the rest of the memory control circuits will be discussed hereinafter.

(*A*) *Timing signal switch.*—The Timing Signal (TS) switch (Section 2C) generates the TS on and TS off signals which provide the clocking for the AMOR system. During the TS off time, information may be stored in the Ternary Counter (FIGS. 2A and 2B), Entry Register, and Select Register (FIGS. 2G and 2H) through their corresponding input switches and character Select Matrix. Also, an interrogation of the Word Registers (FIGS. 2J, 2K, 2M, and 2N) is performed by an ever-present comparison current and the Select Bits (FIGS. 2L and 2O) of the memory controls are set according to the type of operation desired. If the Select Bit of a word is set to 1 during the TS off time, then during the following TS on time that Word Register will be available to either enter information from the Entry Register or exit information to the output circuits. During the TS on time, the memory entry or exit of information is actually performed, and in the case of a sort operation, the Ternary Counter is advanced. In summary, one TS off signal followed by one TS on signal constitutes one memory cycle or memory access.

Since the TS on and TS off lines affect so many circuits, it will be desirable to discuss the details of these lines as we discuss the other circuits. It would, however, at this time be helpful to trace the TS on and off lines through the AMOR system starting from the TS switch and ending at the current sink −11 shown at the bottom of FIGS. 2C and 2O. TS on and OFF lines pass through cryotrons 513, 514, . . . 477, 484, 546, 548, to establish four memory control conditions, then traverse the Entry Register and Select Register to permit entry of information into those registers, proceeds downward through the Word Registers to provide appropriate timing for them, and the TS on line ends in sink −11. The TS off line retraverses all the Word Registers in memory to provide current for the count lines of the Match Indicator circuits prior to ending in the same sink −11. Each of the four memory control conditions has its own pair of TS on and TS off lines for carrying out the logic of the present memory controls and Ternary register.

(*B*) *Mark and mark reset switches.*—The Mark switch (FIG. 2C) is set to on when it is desired to mark a selected word. By definition a word may be marked during TS on time if its Select Bit is set to 1 (see Operation Switch) and there is no current on the Mark Reset on line. A marked word has its Mark Bit (FIGS. 2L and 2O) set to 1 which inhibits further selection of that word during subsequent TS off times. In other words, any current appearing on the Equal Line (see Word Register 1 controls) during a memory interrogation (TS off time) will pass through the gate of cryotron 32 (see FIG. 2L) the control of cryotron 40 setting its associated Equal Bit to 1, and then through the gate of cryotron 44 to the Matched Line if the Mark Bit is set to 0. If the Mark Bit is set to 1, the current on the Equal TS off line would pass through the gate of cryotron 46 to the No Matched line. With this feature, a group of multiple like tagged words may be retrieved by selecting and marking one word per memory cycle.

The Mark Reset switch (FIG. 2C) provides for the resetting to 0 of those Mark Bits, during TS on time, whose corresponding Equal Bits (FIG. 2L) had been set to 1 during the previous TS off time. There are three positions to this switch: on, off, and automatic. The on and off positions are obvious, but when the switch is in the automatic position the current from source +9 will pass through the gates of cryotrons 184, 186, 188 and 192 to the Mark Reset on line if the Match Indicator=1 and the Mark switch is on. For any other condition, the current from source +9 passes through either the gate of cryotron 190 or 194 to the Mark Reset off line. The purpose for the automatic position of the Mark Reset Switch is so the Mark Bits of multiple like-tagged words may be reset automatically when the last word of a group of multiple like-tag words is retrieved and the Mark Switch is set on.

The setting or resetting of the Mark Bits takes place during TS on time. Refer to the control circuits for Word Register 1 shown in FIG. 2L. Since the control circuits for each word are almost identical, only the details of Word Register 1 control circuits will be described as exemplary of similar control circuits. The current on either the Equal or Unequal line is directed on to the TS on line going through either the gate of cryotron 36 or 38 during TS on time. With current on the Mark Reset on line and with the Equal Bit set to 1, the current on the TS on line will pass through the gates of cryotrons 150 and 154 and through the control line of cryotron 156 resetting the Mark Bit to 0. In all other conditions, the current on the TS on line will either pass through the gate of cryotron 148 or cryotrons 150 and 152 and not affect the setting of the Mark Bit. Note, in all cases, the current appears at node 106.

The TS on current from node 106 goes up and is directed into one of four lines labeled *a*, *b*, *c*, and *d*. The current will appear on line *a* if the Select Bit is in the 0 state, for cryotrons 92, 98, and 102 will be resistive while cryotron 86 will be super-conducting. The current on line *a* goes into current sink −17 without going through the Entry or Exit circuits. Note, however, any current on either line *b*, *c*, or *d* will appear on the Select, TS on line which connects to the Exit and Entry lines going into the Word Register 1. The TS on current will be on the *b* line going through the gates of cryotrons 88, 92, and 94 only when there is current on the Mark on line, the Mark Reset off line, and the Select Bit is 1. The current on the *b* line makes cryotron 90 resistive, thus setting the Mark Bit to 1. Any current on line *c* or *d* does not affect the Mark Bit; the purpose for these lines is to direct the current from node 106 over to the Select, TS on line when the Select Bit is 1 and the Mark Bit is not to be marked.

(*C*) *FIFO switch.*—The FIFO switch (FIG. 2C) is set to on when a first-in-first-out entry operation is desired. When this switch is on, the memory controls will condition the first vacant Word Register after the last matched Word Register to accept the information contained in the Entry Register.

Current flowing down the FIFO on line makes the gate of cryotron 48 resistive (see FIGURE 2L1 and Word Register 1). Thus during TS off time, the current coming from the left on the Equal line through the gate of cryotrons 32 is directed through the gate of cryotron 50 to the control of cryotron 54, 60, 66 and 72 and on to the No Select line where it sets the Select Bit to 0 by making the gate of cryotron 84 resistive. The reason for making the gate of cryotron 54 resistive is in order to maintain the current coming down the Select 1st Matched line (see Operation Switch) so that it may be used further down the line to set up the 1st vacant Word Register after the last matched Word Register. Cryotrons 60, 66 and 72 are part of the Match Count circuits and direct the TS off current coming up the 0, 1 or 2 Count line to the next higher count line through the gates of cryotrons 62, 68 or 74. (See Match Indicator.)

Current on the FIFO on line also makes the gates of cryotrons 116 and 118 resistive. This allows the output of each Word Register Vacancy Bit to set its corresponding Select Bit. Current coming in from the left on the Vacancy Bit=0, TS off line (indicating a vacant Word Register; for example, the Vacancy Bit of its corresponding Word Register will be in a 0 state, causing cryotron 182 to be resistive and cryotron 180 to be in its superconductive state in FIG. 2J1) will pass through the gate of cryotron 120, and with current on either the 1, 2, or P Equal Count line, the $VB=0$, TS off current will control cryotron 126 and proceed through the gate of cryotron 132 to the FIFO No Select Line where it sets the Select Bit to 0 by going through the control of cryotron 144. With cryotron 126 resistive, the current on the Select 1st Matched line is prevented at this point from going over to the No Select line. If the word were after all matched words, then there would be current on the 0 Count line of the Match Indicator circuit through the control line of cryotron 132, and the current coming in on the $VB=0$, TS off line would go through the gate of cryotron 120, through the control of cryotron 124 (directing the current from the Select 1st Matched line over to the No. Select line) and through the gates of cryotrons 134, 136 and 138 to the FIFO Select line, indicating a vacancy word after the last matched word. The first vacant word after the last matched Word Register is defined as that word whose control circuits have current on both the FIFO Select line and Select 1st Matched line. If this condition exists, then the current on the FIFO Select line will pass through the gate of cryotron 140 to the control of cryotron 146, setting the Select Bit to 1 and then to sink −8. For all other conditions, during FIFO on, TS on time, the current will appear on the FIFO No Select line.

Also with the gate of cryotron 118 resistive, the current coming in on the $VB=1$, TS off line will pass through the gate of cryotron 122 and the control of cryotron 130 to the FIFO No Select line where it sets the Select Bit to 0 in going through the control of cryotron 144.

With current coming down the FIFO off line, cryotrons 50, 120 and 122 will be resistive. Thus current on the Equal TS line would pass through the gate of cryotron 48 and the controls of cryotron 40, 52, 58, 64 and 70. With cryotron 52 resistive, the current coming down the Select 1st Matched line will be diverted to the No Select line which indicates to the Word Registers below that a matched word has been found. Cryotrons 58, 64 and 70 perform the same operation as the previously discussed cryotrons 60, 66 and 72. The current coming in on the $VB=0$ or $VB=1$ TS off lines will be respectively passed through the gates of cryotrons 116 and 118 to the FIFO off line to sink −8. Current on the FIFO off line makes cryotron 128 resistive thus preventing current from the Select 1st Matched line from passing over to the No Select line.

(*D*) *Operation Switch*.—The Operation switch (FIG. 2C) indicates whether the AMOR system is to perform an entry into all matched Word Registers, an entry into the 1st matched Word Register, an exit, or a sort operation. Note that the four operation lines merge to form the Entry and Exit lines which continue down through the memory becoming the controls for cryotrons 340, 342, 176, 178 (FIG. 2L), 278, 280, 282 and 284 (FIG. 2M), ending at current sink −23.

Current source +13 shown in FIG. 2C provides a current for either the Select 1st Matched, No Select, or Enter All line depending upon the state of the Match Indicator, the Operation Switch, and the lowest ordered bit of the Ternary Counter, the latter being pertinent only during a sort operation.

If the Operation Switch is in the Entry All position and the Match Indicator is in either the 2 or P state, current from source +13 will flow through the path consisting of the gates of cryotrons 234, 232, 216, 214 and 212 to the Enter All line.

If the Operation Switch is in the Sort Position and the Match Indicator in the 1 state, the path from source +13 through the gates of cryotrons 240, 238, 236, 230 will continue to the Select 1st Matched line. With the Match Indicator in the 2 or P state and the Operation Switch in the Sort Position, current will flow through the gates of cryotrons 234, 232, 222, 220 and 218 on to the Test Low Order Bit line where it goes into the right most Ternary Bit position of the Ternary Counter (FIG. 2B).

The Ternary Counter is designed so that the right most bit position is always the lowest ordered bit position of the sorting field. Thus we have an indication of multiple like tags when this low order position is in either the 0 or 1 state and the Match Indicator is in the 2 or P state. So with the last ternary position in the 0 or 1 state, the current coming in on the Test Low Order Bit line will be directed on to the Select 1st Matched line through the gate of cryotron 252 (FIG. 2B1) to cause the first of the multiple like sorting keys or tags to be selected by actuating the appropriate select bit of a word register. Had the last ternary position been in the M state, the current coming in on the Test Low Order bit line would have been directed over to the No Select line through the gates of cryotrons 248 and 250.

It should be noted that there will be current from source +13 on only one of the three lines, namely, the Select 1st Matched, No Select, or Enter All lines when the Match Indicator is in the 1, 2 or P state. There will be no current on these lines when the Match Indicator is in the 0 state for the current from current source +13 will be directed through the gates of cryotrons 246, 244, and 242 to the current sink −15 (see FIG. 2C2). Also note the current sink −15 in FIG. 2O2 and pay particular attention to the No Select indicator that will communicate with the rest of the computing system.

Current coming down the Select 1st Matched line makes cryotrons 142 and 78 resistive (FIG. 2L1, Word Register 1) and indicates there have been no previous matched words. A matched word (current on the Matched line or on the FIFO Select line) directs the current on the Select 1st Matched line over to the No Select line by making cryotrons 52 or 124 resistive. Current on the No Select line prevents any matched word from becoming selected by making cryotrons 140 and 80 resistive. It is important to note that for a given word, the point at which the current is directed from the Select 1st Matched line to the No Select line is below the circuits, i.e., cryotrons 76 and 78, or 140 and 142, that are used to test whether this word is a 1st matched or 1st vacant Word Register. Current on the Enter All line allows all matched words to be selected for subsequent simultaneous entry into the Word Registers by making cryotron 76 resistive.

When there is current on the Select 1st Matched line, the current on the Matched line is directed through the gate of cryotron 80 and through the control of cryotron 82 setting the Select Bit to 1. When the Select Bit is set to 1 during the TS off time, the word associated with that set Select Bit is thereby conditioned, ready to enter or exit information during the following TS on time.

With current on the No Select line, the current on the Matched line will pass through the gates of cryotrons 76 and 78 setting the Select Bit to 0 by going through the control of cryotron 84, preventing the entry or exit of information on the following TS off time. Also note any current on the FIFO Select line would be directed over to the FIFO No Select line through the gate of cryotron 142, setting the Select Bit to 0 by going through the control of cryotron 144.

(*E*) *Range switch*.—The setting of the Range Bits for range retrieval is a special type of operation in that the contents of such Range Bits of the Word Registers are modified during an interrogation of the memory. When the Range switch (located in FIG. 2B2) is set to on, the current on the Range On line will make cryotrons 196 and 198 resistive (Word Register 1, FIG. 2K2). Thus any current on the Low line (coming from the left) would pass through the gate of cryotron 200 and set the Low Range Bit to 1 by making cryotron 204 resistive. Likewise, if there were current on the High line it would pass through the gate of cryotron 202 and set the High Range Bit to 1 by making cryotron 206 resistive. Note that the Low and the High lines merge to form the Unequal line. Also note that any current appearing on the Equal line does not affect either the Low or High Range Bits.

Thus, to obtain a retrieval of words whose values lie between the value of *x* and the value of *y*, the following procedure is carried out by the present invention:

(1) All Range Bits are set to their 0 states by an All Entry operation.

(2) With the Range Switch on, the value of *x* is placed in the Entry Register and a comparison is made between *x* and all words in memory, causing the Range Bits to be set either in the High or Low condition in accordance with such comparison.

(3) The value of *y* is then placed in the Entry Register with Range Switch still on. The Low and High Range Bits selected by step 2 remain in their selected states, but new High and Low Bits are selected by virtue of this new comparison. At the end of this step, when comparing current has settled, certain words will have both their Low and High Range Bits set to their respective 1 states. Such words fall between the range of *x* and *y*.

(4) Place 1's in the High and Low Range Bits of the Entry Register and retrieve all words in memory that match.

(*F*) *Enter ternary counter switch.*—The Enter Ternary Counter switch (FIG. 2C3) has three positions; the Reset (R), the Tag (T), and the Normal (N) position. In order to guarantee at the start of a sort operation that all controlling bits are in the reset state and that all positions of the Ternary counter are in the mask state, the Enter Ternary Counter Switch is set to the R position for only the first TS off time, after which it is set to the N position. With the Enter TC switch in the R position, the TS off current from current source +41 (FIG. 2C3) is directed on to the Reset line and then through the controls of cryotrons 539 and 543 setting a Duplicate Bit D to the Reset (R) state, through the controls of cryotrons 612 and 613 setting the P2 Bit and P2 Echo Bit to their respective 0 states and through the control of cryotron 518 (FIG. 2B3) setting the Sort Bit to 0. This guarantees that these bits will be set to the proper states at the start of a sort operation.

Figure 3:
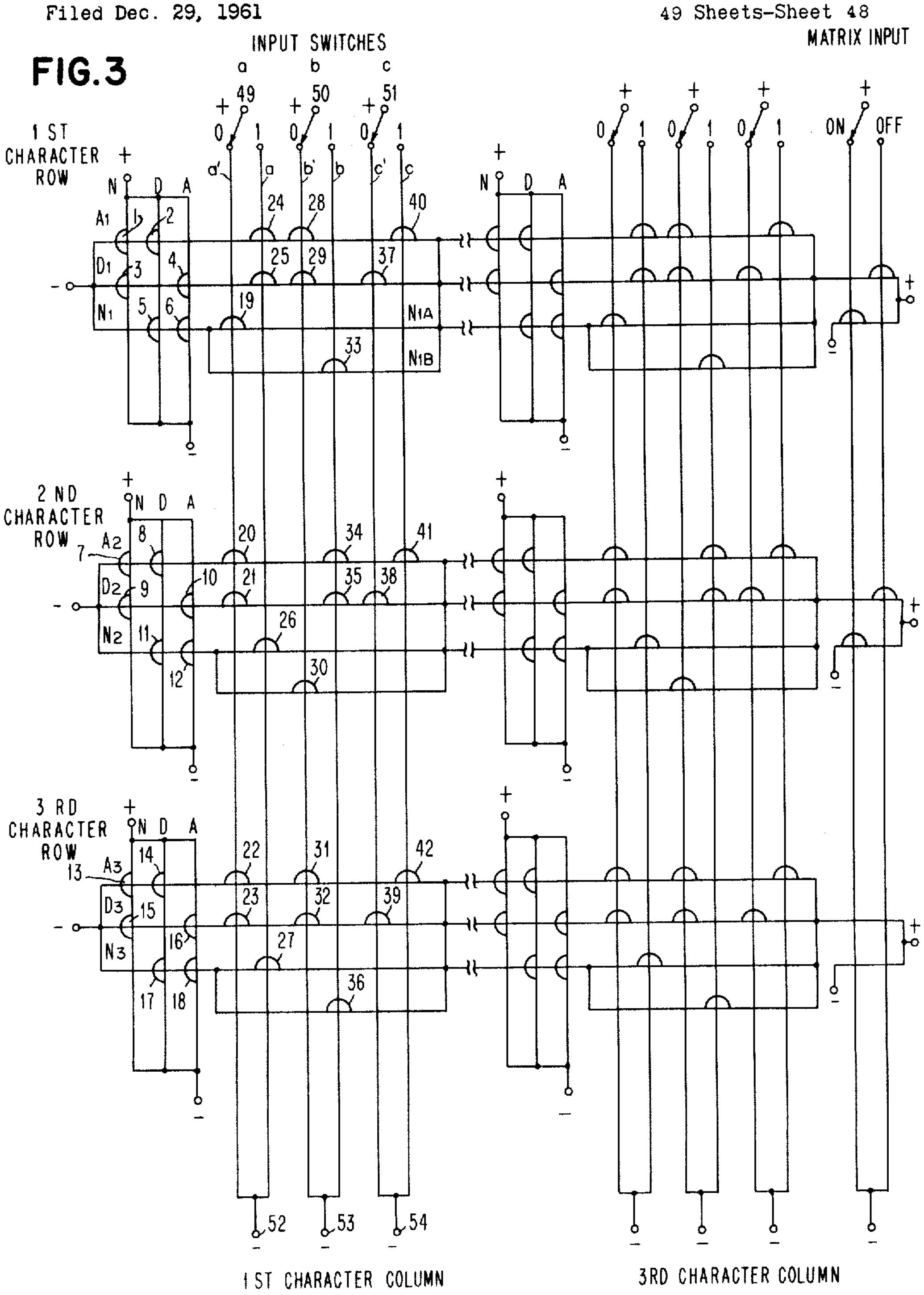
FIGURE 3 is a detailed showing of matrix switches for setting the Character Select Matrix flip-flops of FIGURES 2D and 2E.

Refer to Bit N of Character 1 of the Ternary Counter and note that the current on the Reset line makes cryotrons 568 and 569 resistive (FIG. 2B4), thus establishing superconducting current on the M line. Likewise, all of the other positions of the Ternary Counter are set to the M state. The current on the Reset line then comes back through Check Bits setting them to 0 prior to entering sink −43 (FIG. 2B1). See cryotron 570 of the Check Bit of Bit 1 of Character 1 (FIG. 2B1). Refer also to FIG. 2C3 and note that there will be current on the Reset line coming from source +41 through the gate of cryotron 546 only during TS off time. At TS on time, the current will be directed through the gate of cryotron 548 to current sink −43.

If it were desirable to start sorting from a given tag, then this tag would have to be put into the Ternary Counter, and the Enter Ternary Counter switch would have to be set to the T position for the 1st TS off time. With the Enter TC switch in the T position, the TS off current will be directed to the tag input line. The current on the Tag Input line goes through the control line of cryotron 516 (FIG. 2B3) and sets the Sort Bit associated with cryotron 516 to 1 and transfers the information from the TC Input switches to their corresponding ternary position. For example, refer to Bit *n* of Character 1 and note that if its TC Input Switch were set to 0, then the current on the Tag Input line would pass through the gates of cryotrons 558, 559 and then through the controls of cryotrons 564 and 565 (FIG. 2B4) establishing current on the 0 line of its corresponding Ternary Counter position. The setting of the TC Input switches is controlled by information coming from other parts of the computing system such as an Accumulator or Memory Buffer Register, not shown. The reason for setting a Sort Bit to 1 when starting a sort from a given tag is because it is not necessary to find the high order position at the start of this sort, as will be made more evident in describing a sorting operation hereinafter.

(*G*) *Combinations of memory control switches.*—The following Table 3 gives examples of AMOR operations that can be performed using various combinations of the above described switches.

TABLE 3

| Operation | Setting of Memory Control Switches | | | | | Enter TC |
|---|---|---|---|---|---|---|
| | Operation | Mark | FIFO | Mark Reset [1] | Range | |
| Enter All Matched Words | Entry ALL | OFF | OFF | AUTO | OFF | N. |
| Enter 1st Matched Word and Mark | Entry 1st | ON | OFF | AUTO | OFF | N. |
| Enter 1st Matched Word and No Mark | Entry 1st | OFF | OFF | AUTO | OFF | N. |
| Enter 1st Vacant Word after last Matched Word (FIFO). | Entry 1st | OFF | ON | AUTO | OFF | N. |
| Exit and Mark | Exit | ON | OFF | AUTO | OFF | N. |
| Exit and No Mark | Exit | OFF | OFF | AUTO | OFF | N. |
| Sort | Sort | ON | OFF | AUTO | OFF | (2). |
| Set up Range Bits | Exit | OFF | OFF | AUTO | ON | N. |
| Exit of Matched Word or next Higher or Lower (Search for Nearest Match) | Sort | ON | OFF | {(ON) (OFF)} | OFF | (3). |

[1] The Mark Reset switch may be set "on" at any time by the program. This will result in the resetting of the Mark Bits of all equal words during a memory interrogation. Or the Mark Reset switch may be set to "off," which will result in no resetting of the Mark Bits.
[2] R for 1st TS off, N thereafter.
[3] T for 1st memory cycle, N thereafter.

(2) *Memory interrogation*

A memory interrogation involves the following registers: Entry Register, Select Register, and the Word Registers (FIGS. 2G, 2H, 2J, 2K, 2M and 2N).

The Entry Register consists of the flip-flops labeled E, the Mask switches, and Data-Tag Input Switches. Information to be interrogated and/or stored in the memory is first brought into the Entry Register in the following manner. During TS off time, the current on the TS off line makes cryotron 2 (see FIG. 2G2) resistive. Since all bits of the Entry Register (FIGURES 2G1, 2G2, 2H1 and 2H2) are almost identical, only Bit 1 of Character 1 of that register as shown in FIG. 2G2 will be discussed. This allows the current source +1 to travel through the Data-Tag switch to set an E flip-flop to a "1" or "0" depending upon the position of the switch. If the switch were set to "0," then the current from source +1 would go through the "0" side of the switch and make cryotron 4 resistive. With cryotron 4 resistive, current from a source +S will be established down the right path of flip-flop E, indicating a "0" stored. The current from source +1 then continues down the TS off, I line to perform the memory interrogation.

The current on the TS off, I line is directed onto either the Mask or No Mask line going through the gate of cryotron 10 or 6 depending upon whether the Mask switch is set respectively to the Mask (M) or Compare (C) position. Note that there is only one Mask switch per character, except for the Vacancy and Miscellaneous Bits, which are individually controlled. Current coming down the No Mask line goes into an E Flip-Flop and out through either the 0 or 1 compare line through the gates of cryotrons 11 or 13 depending respectively upon whether the E flip-flop is in the 0 or 1 state. Current coming down either the Mask, 0, or 1 compare line feeds into the Select Register.

The Select Register (FIGS. 2G4, 2G3, 2H4 and 2H3) is made up of the binary flip-flops labeled B, the ternary flip-flops labeled T, and the input switches having three positions respectively labeled the Entry-Exit (*E—E*), Sort( S) and No Entry (NE) positions. Referring to flip-flop T for character 1, the input circuit starts with current source +25 and ends at current sink −27. For example, with the Entry-Exit Switch in the E—E position during TS off time, current from source +25 will pass through the gate of cryotron 15 and make cryotrons 17 and 19 resistive. This will establish current on the Entry-Exit line of flip-flop T. With flip-flop T in the Entry-Exit state, current coming down the Mask, Compare 0, or Compare 1 line will respectively pass through the gates of cryotrons 7, 8, or 9 to the compare M, 0, or 1 line. If the flip-flop T were in the Sort state, then the comparing current from the entry register would have been by-passed into the current source $S_{11M}$ by going through the gates of cryotrons 29 and 31, 33 and 35, or 37 and 39. Note that the current on line $S_{11M}$ then goes up and into the Character Select Matrix to select which position of the Ternary Counter is to be used to interrogate the character position in memory, which in this case is taken to be character position number 1. Note also that the flip-flops labeled B do not affect the currents of the comparing circuits coming from the Entry Register because there is no sorting provided for these bit positions.

Current on the Compare M, 0, or 1 line goes through FIGS. 2J and 2M to current sink −3 at the bottom of FIG. 2M4. The lines starting from current source +5 at the left of FIGS. 2J4 and 2M4, the Compare M, O, or I lines, and the Word Register flip-flops make up the comparing circuits. Since the comparing circuits for all memory bits are the same, it will be sufficient to study in detail just one such circuit.

Refer to Bit 1 of Character 1 of Word Register 1 in FIG. 2J. Current coming from source +5 in FIG. 2J1 and appearing on the Equal line indicates that the previous bits or bits to the left were all equal or in the masked condition, and as this equal curernt approaches the next bit it has four possible paths to take, path *a*, *b*, *c*, or *d*. Path *a* leads into the Low line which indicates that the tag in memory is lower, binary-wise, than the corresponding tag in the Entry Register or Ternary Counter and further comparison of bits to the right is by-passed. Current on path *b* or *c* indicates an Equal or Masked condition and feeds into the next bit position. Path *d* leads into the High line which indicates that the tag in memory is higher than the corresponding tag in the Entry Register or Ternary Counter. Again, an exit on a High line results in the by-passing of all subsequent bits in a word as far as comparison is concerned. The High and Low lines are needed to set the Range Bits, as was noted hereinabove, and after performing that function, the High and Low lines merge into a single unequal line (see FIG. 2K2).

Current coming down the Compare M line makes cryotrons 12 and 14 resistive, and so any current coming in from the left on the Equal line will be directed onto either path *b* or path *c* indicating in either case a mask or equal condition. Current on the Compare 0 line makes cryotrons 16 and 18 resistive leaving only path *c* or *d* superconductive. If a 0 were stored in the flip-flop of bit 1 of Word Register 1, then cryotron 30 would be resistive leaving only path *c* superconducting and indicating an equal condition. If a 1 were stored in the flip-flop, then cryotron 26 would be resistive leaving path *d* superconducting, thus indicating a high condition. Likewise with current coming down the Compare 1 line, an equal or low indication will be established depending respectively on whether a 1 or 0 had been stored in the flip-flop.

In addition to the equal, high, and low comparing circuits, there is a circuit used for reading the state of the Vacancy Bit of each Word Register. This circuit is used during the interrogation time of a FIFO operation as previously mentioned. Current from current source +7 (FIG. 2J1) will pass through the gate of cryotron 180 on to the $VB=0$ line when the Vacancy Bit is in the 0 state (indicating a vacant Word Register) making cryotron 182 resistive. When the Vacancy Bit is in the 1 state (indicating an occupied Word Register) cryotron 180 will be resistive and 182 superconducting. Thus the current from source +7 will be directed onto the $VB=1$ line.

To conclude the interrogation description, refer to FIG. 2L1 and recall that current from source +5 will be coming in on either the Equal or Unequal line and current from source +7 will be coming in on either the $VB=0$ or $VB=1$ line. These currents first approach the cryotrons controlled by the TS on and TS off lines. Thus, during the TS on time the current on either the Equal or Unequal line is directed respectively through the gates of cryotron 36 or 38 to the TS on line where it sets or resets the Mark Bit as previously described. In addition, during TS on time, the current on either the $VB=0$ or $VB=1$ line is directed to current sink −8 through cryotrons 112 and 114 respectively since the cryotrons 108 and 110 are resistive at this time.

During TS off time, the current on the Equal line passes through the gate of cryotron 32 to the Equal TS off line where it sets the Equal Bit to 1 (indicating an equal word) by making cryotron 40 resistive, continues through the gate of cryotron 44 if the Mark Bit were set to 0, and then to the gates of cryotrons 48 and 50 controlled by the FIFO on and off lines. At this point, note the effect of the FIFO Switch previously described. If the Mark Bit were set to 1, then the current on the Equal TS off line would have been directed to the Unequal TS off line going through the gate of cryotron 46. Also, during TS off time, the current on the Unequal line passes through the gate of cryotron 34 to the Unequal TS off line where it becomes the control for cryotrons 42, 56, 62, 68, 74 and 84. Cryotron 56 serves the same purpose as cryotron 54 (see FIFO Switch). Cryotrons 62, 68 and 74 prevent the current on either the Match Count 0, 1 or 2 line from passing over to the next higher count line. Cryotron 84 sets the Select Bit to 0, indicating a no select condition. The current on either the $VB=0$ line or $VB=1$ line during TS off time passes respectively through the gates of cryotrons 108 and 110 to the $VB=0$, TS off line or $VB=1$, TS off line. From this point the state of the FIFO Switch controls further operation as was previously described.

(*3*) *Entry—Exit*

An entry or exit operation, like the memory interrogation, involves the Entry Register, the Select Register and the Word Registers. Unlike the memory interrogation, which takes place during the TS off time, the entry or exit operation takes place during the TS on time.

(*A*) *Entry*.—Referring to FIG. 2H2, it can be seen that if an entry type operation is to be performed, current on the vertical Entry line coming from the setting of the Operation Switch will make cryotron 342 resistive. Thus the current from source +31 will pass through the gate of cryotron 340 on to the horizontal Entry line to control the Entry Register. Likewise, for an exit type operation, the current from source +31 is directed on to the horizontal Exit line.

Now refer to Bit 1 of Character 1 of the Entry Register as shown in FIG. 2G2. The current from source +1 during TS on time passes through the superconducting gate of cryotron 2 and then into flip-flop E. Assuming current on the Entry line, the current from source +1 will be directed through the gate of cryotron 290 since cryotron 286 and 288 will be resistive. From cryotron 290, the current will pass through the gate of either cryotron 292 to the E—E 0 line or through cryotron 294 to the E—E 1 line, depending respectively upon whether the flip-flop E was in the 0 or 1 state. The current on either the E—E 0 or 1 line then approaches the Select Register.

With the Select Register Flip-flop T in the Entry—Exit state (FIG. 2G3), the current on either the E—E 0 or 1 line will respectively pass through the gate of cryotron 304 or 306 and on the E—E 0 or 1 line going into the Word Registers. Had flip-flop T been in the No Entry state, the current on either E—E 0 or 1 line would have been directed over the E—E N (No Entry) line, respectively going through the gates of cryotrons 296 and 300 or 298 and 302.

Refer now to FIG. 2L1 and note the Select, TS on line. The current on the Select, TS on line will pass either through the gate of cryotron 176 or on the Exit line or through the gate of cryotron 178 on to the Entry line, depending respectively upon whether the operation is of an entry or exit type. Note that these are Exit and Entry lines for each Word Register and that they are controlled by their respective Select Bits.

Refer again to FIG. 2J2 which shows Bit 1 of Character 1 of Word Register 1. If there were current coming down the E—E N line, then the current coming in on the Entry line would be directed through the gates of cryotron 326 and 324 and would not affect the state of the Word Register flip-flop. With the current coming down the E—E 1 line, the current on the Entry line would pass through the gates of cryotrons 332 and 330 and through the control of cryotron 328 setting the Word Register flip-flop to a 1. Likewise, current on the E—E 0 line directs the current on the Entry line through the gates of cryotrons 338 and 336 and control line of cryotron 334, setting the Word Register flip-flop to 0.

Before going on to the exit type operation, it is desirable to take a look at the entry circuits for the Vacancy Bit. Note that the Entry 0 and 1 lines for the Vacancy Bit of the Entry Register (FIG. 2G) have been modified so that during a normal FIFO off condition entry, when a 0 or 1 is in the Vacancy Bit of the Entry Register, a comparison is made with the 0 or 1 respectively in the Vacancy Bit of the Word Registers in the normal fashion. However, the entry into the Vacancy Bit of a selected Word Register is reversed. That is, a 0 in the Entry Register Vacancy Bit will be written as a 1 in the selected Word Register Vacancy Bit and a 1 in the Entry Register Vacancy Bit will be written as a 0 in the selected Word Register Vacancy Bit. The above noted reversal occurs when the FIFO off line (FIG. 2H2) drives cryotron 901 resistive, causing current from source +302 to pass through the gate of cryotron 902 to the horizontal FIFO off line. In FIG. 2G1, this horizontal FIFO off line drives cryotrons 701 and 702 resistive so that current on the Entry 0 line of the Vacancy Bit of the Entry Register is diverted to the Entry 1 line of the selected Vacancy Bit of the Word Register, and vice versa, cryotrons 703 and 704 are driven resistive during the FIFO on condition, so a normal entry during the FIFO on condition does not result in such reversal. There is also one other peculiarity that should be noted about the Vacancy Bit and that is that the horizontal entry and exit lines of each Word Register are merged prior to their entry into its associated Vacancy Bit (see FIG. 2J1) so that information may be entered into such Vacancy Bit during either an exit or entry type operation. This means that there is never an exit of information from Word Register Vacancy Bit. An appropriate corresponding simplification is made in the Vacancy Bit of the Entry Register so that at any TS on time, an entry operation of the content of the Entry Register Vacancy Bit into the Word Regiser Vacancy Bit of a selected word can be made, subject to control by the Select Register. The above characteristics of the Vacancy Bits permit destructive or non-destructive read-out of selected words from memory.

(*B*) *Exit.*—Referring back to Bit 1 of Character 1 of the Entry Register (FIG. 2G2), during TS on time when an exit type operation is being performed, the current from source +1 will go through the gate of cryotron 2, into flip-flop E, and out through either the gate of cryotron 286 to the E—E 0 line or through the gate of cryotron 288 to the E—E 1 depending upon the state of the flip-flop of the selected Word Register. The current on either the E—E 0 or 1 line will then go through the Select Registers as discussed earlier and then into the Word Registers.

The selected Word Register from which information is to be retrieved will have current on its Exit line. Referring to the flip-flop representing Bit 1 of Character 1 of Word Register 1 (Section 2J2), it can be seen that the E—E line will be made resistive when such flip-flop is in the 1 state since the current on the Exit line will be directed through the control of cryotron 318 and the gate of cryotron 316. Had a 0 been stored in the flip-flop, then the E—E 1 line would be resistive because of the current on the Exit line going through the control of cryotron 322 and the gate of cryotron 320.

The current coming down either the E—E 1 or 0 line may be traced to the output circuits shown at the bottom of FIG. 2M. Current on the Exit line makes cryotrons 284 and 282 in FIG. 2M3 resistive thus passing the current coming down the E—E 0 or 1 line through the gate of either cryotron 280 or 278 to the 0 or 1 output indicators, such indicators communicating with the rest of the computing system not shown. In case there were no selected Word Registers for retrieval of information, there would be current on both the E—E 0 and 1 lines, and such divided currents would each be insufficient to actuate either output indicator.

(*4*) *Ordered retrieval*

The principal circuits involved in an ordered retrieval are the Character Select Matrix (FIGS. 2D and 2E), the Ternary Counter (FIGS. 2A and 2B), and the Match Indicator (FIG. 2C).

(*A*) *Character select matrix.*—The purpose of the Character Select Matrix is four-fold:

(1) To direct the comparing current sources for each bit position in memory to the desired bit positions in the Ternary Counter when sorting on these memory positions is desired.

(2) To direct the outputs of the character positions in the Ternary Counter to the desired character positions in the memory.

(3) To indicate whether the character positions in the memory are to be sorted ascendingly or descendingly.

(4) To determine at the start of a sorting operation, the operating position in the Ternary Counter.

The Character Select Matrix (FIGS. 2D and 2E) is an N by M matrix of ternary flip-flops where each flip-flop has an ascending (A), descending (D), or not used (N) state. The letter M represents the number of characters in the memory word. The letter N is the number of characters in the Ternary Counter, and in this system where the entire matrix is set by only one instruction word, the maximum N is determined by the number of bits used to represent a character. $N=2^{(b-1)}-1$ where $b$=number of non-parity bits per character. Thus, if we select $b$ to equal 7, as we did in a previous example, we could control, at most, 63 Ternary Counter character positions.

The horizontal lines (M, 0, 1) of the Character Select Matrix carry information coming from the Ternary Counter. The vertical lines ($M_M$, $0_M$, $1_M$) carry information going into the character positions in the memory. The ternary flip-flop takes the information from the desired horizontal lines and transfers it to the desired vertical lines. In addition it should be noted that each ternary flip-flop represents a character position of the Ternary Counter and a character position of the Word Registers in the memory. Also, in any given column and in any given row of flip-flops, one and only one flip-flop may be set to either the A or D state, and all other flip-flops in that column or row must be set to the N state.

(1) *Input to the character select matrix*

The setting of the Character Select Matrix flip-flops is through the Matrix Input Switches (see FIGURE 3). These switches will be set by a sort field select word containing special characters necessary to set their corresponding character column flip-flops. Three bits are sufficient to illustrate the manner of selecting a ternary flip-flop and are shown in FIGURE 3. FIGURE 3 contains, by way of example, a 3 by 3 Character Select Matrix and their accompanying input lines and switches.

Using the output of the switches shown in FIG. 3 as an input to a column in the Character Select Matrix, we can make the following assignment and truth table. Note that FIG. 3 is solely illustrative of the operation of input means broadly for setting the Character Select Matrix of the Ternary Bit positions shown in FIGS. 2D and 2E.

| Character Output Switch | | | Assignment |
|---|---|---|---|
| *a* | *b* | *c* | |
| 0 | 0 | 0 | No Sort. |
| 0 | 0 | 1 | No Sort. |
| 0 | 1 | 0 | Ascending first. |
| 0 | 1 | 1 | Descending first. |
| 1 | 0 | 0 | Ascending second. |
| 1 | 0 | 1 | Descending second. |
| 1 | 1 | 0 | Ascending third. |
| 1 | 1 | 1 | Descending third. |

In the code, letter *c* indicates the type of sort, $c=0$ indicates an ascending sort, whereas $c=1$ indicates a descending sort. Letters *a* and *b* combine in the usual binary fashion to indicate whether the first (01), the second (10), or third (11) character position of the Ternary Counter is to be associated with the character position in which the code appears.

TRUTH TABLE

| Input | | | Output | | | | | | | | |
|---|---|---|---|---|---|---|---|---|---|---|---|
| *a* | *b* | *c* | $A_1$ | $D_1$ | $N_1$ | $A_2$ | $D_2$ | $N_2$ | $A_3$ | $D_3$ | $N_3$ |
| 0 | 0 | 0 | ---- | ---- | 1 | ---- | ---- | 1 | ---- | ---- | 1 |
| 0 | 0 | 1 | ---- | ---- | 1 | ---- | ---- | 1 | ---- | ---- | 1 |
| 0 | 1 | 0 | 1 | ---- | ---- | ---- | ---- | 1 | ---- | ---- | 1 |
| 0 | 1 | 1 | ---- | 1 | ---- | ---- | ---- | 1 | ---- | ---- | 1 |
| 1 | 0 | 0 | ---- | ---- | 1 | 1 | ---- | ---- | ---- | ---- | 1 |
| 1 | 0 | 1 | ---- | ---- | 1 | ---- | 1 | ---- | ---- | ---- | 1 |
| 1 | 1 | 0 | ---- | ---- | 1 | ---- | ---- | 1 | 1 | ---- | ---- |
| 1 | 1 | 1 | ---- | ---- | 1 | ---- | ---- | 1 | ---- | 1 | ---- |

Since all three columns are identical, it will be necessary to discuss only the first column. Refer to the leftmost character column in FIGURE 3 and note the three input switches *a*, *b*, and *c* associated with the column. Current will pass from current source +49 to current sink −52 through either the 0 or 1 side of the switch on to either *a'* or *a* line. Likewise current will be established on the *b'* or *b*, and *c'* or *c* lines depending upon the state of the *b* or *c* switches. Thus 000, 001, etc. may be respectively represented as $a'b'c'$, $a'b'c$, etc.

Refer now to the upper leftmost flip-flop of FIG. 3. Current flowing on the $A_1$ line will set the flip-flop to the A state by making cryotrons 1 and 2 resistive. Similar current on either the $D_1$ or $N_1$ line will respectively set the flip-flop to the D or N state. Since this flip-flop represents the low order or first ternary character, we would like current on the $A_1$ line when we want the memory character represented by this matrix column to be sorted ascendingly and be the low order or, in the present scheme of sorting, the rightmost character in the sorting field. According to our assignment and truth table, current should be on the $A_1$ line when the input switches are in the 010 selection condition, i.e. $a'bc'$ state. Another way of expressing this is to write the Boolean equation:

$$A_1=a'bc'$$

We can prove this to be true by noting that current on the *a'b*, and *c'* lines will respectively make cryotrons 19, 33 and 37 resistive, thus respectively blocking current on the $N_{1A}$, $N_{1B}$, and $D_1$ lines, leaving only the $A_1$ line superconducting. Note also that current will flow only on the $D_1$ line if the setting of the Input Switch is $a'bc$, i.e. $D_1=a'bc$. According to the assignment we have chosen, we would like current on the $N_1$ line if the input switches are set to either $a'b'c'$ or $a'b'c$ or $ab'c'$ or $ab'c$ or $abc'$ or $abc$; i.e. $N_1=a'b'c'+a'b'c+ab'c'+abc'+abc$. Using the rules of Boolean algebra this reduces to:

$$N_1=a+b'$$

In other words, there will be current on the $N_1$ line if the output of the *a* bit is 1 or the output of the *b* bit is 0 or if both *a* is 1 and *b* is 0.

Likewise it can be seen that input circuits for the flip-flops representing the second and third character positions of the Ternary Counter for a given column may be expressed by the following Boolean equations derived from the assignment and truth tables previously given:

$A_2=ab'c'$ $A_3=abc'$
$D_2=ab'c$ $D_3=abc$
$N_2=a'+b$ $N_3=a'+b'$ (2) *Directing the ternary comparing current sources*

In order to discuss the directing of the comparing current sources to the desired ternary bit position, we now refer back to FIGURE 2. In the memory character position where sorting is desired, the comparing current source for each bit position of the character starts at the Entry Register (FIGS. 2G and 2H) during TS off time, passes through the Select Register and then goes up into the corresponding character column of the Character Select Matrix. Refer to FIG. 2D which shows the matrix column representing the first character position in the memory. At the bottom of FIG. 2D, note the lines $S_{11M}$ and $S_{n1M}$ which respectively represent the current source lines for the first and nth bit positions of the first memory character. Lines $S_{1MM}$ and $S_{nMM}$ respectively represent current source lines for the first and *n*th bit positions of the last memory character.

Current on the $S_{11M}$ line approaches the ternary flip-flop of the *n*th character row of the Character Select Matrix, and if the ternary flip-flop of such matrix is in the A or D state, such current will pass through the gate of cyrotron 382 and on to the $S_{1NT}$ line. The $S_{1NT}$ line is the current source line for the first bit position of the *n*th ternary character (see FIGS. 2E, 2B, and 2A). With the ternary flip-flop in the N state, the current on the $S_{11M}$ line would pass through the gates of cryotrons 384 and 386 and up to the next character row of the Character Select Matrix. With all the flip-flops below the first character row set to the N state, there would be current on the $S_{11M}$ line approaching the ternary flip-flop of the first character row. With this latter flip-flop set to the N state, the current on the $S_{11M}$ line would pass through the gates of cryotrons 402 and 404 (FIG. 2D1) indicating an error, since there should be no current on the $S_{11M}$ line when all flip-flops of that column are set to the N state. For current on the $S_{11M}$ line indicates that a sort is desired, and setting all ternary bits of the Character Select Matrix to N denies a sort, thus representing an inconsistency in the sort instruction. With this flip-flop in the A or D state, the current on the $S_{11M}$ line would pass through the gate of cryotron 406 on to the $S_{11T}$ line. Likewise the current on the $S_{n1M}$ line may be traced on to either the $S_{n1T}$ or $S_{nNT}$ lines.

Referring to the Ternary Counter (FIGS. 2A and 2B), we can see where the comparing currents on the $S_{11T}$, $S_{n1T}$, $S_{1NT}$, and $S_{nNT}$ lines go into the Ternary Counter. First, the comparing currents pass through the Ternary Echo Bits, setting these bits to the same states as the ternary bits. For example, refer to Bit 1 of Character N of the Ternary Counter (FIG. 2A). The current coming in on the $S_{1NT}$ line will be directed to either the $M_T$, $0_T$ or $1_T$ line depending upon the state of the ternary bit. For example, if the ternary bit were in the 0 state, cryotrons 428 and 434 (FIG. 2A3) would be resistive, causing current on the $S_{1NT}$ line to be directed onto the $0_T$ line. The current coming down the $0_T$ line would make FIG. 2A1 cryotrons 418 and 420 resistive, setting the Ternary Echo Bit of Bit 1 to the 0 state. From there the current will go into the Character Select Matrix where it will be directed into the proper memory character position for memory interrogation depending upon the setting of the Character Select Matrix.

*(3) Directing the ternary comparing outputs*

The information coming in on the $M_T$, $0_T$, or $1_T$ lines from the first or low order character position of the Ternary Counter feeds into the leftmost flip-flop of the first or top row of the Character Matrix, information from the second character of the Ternary Counter feeds into the second row of the Character Matrix, etc.

Refer to the upper, leftmost ternary flip-flop of the Character Select Matrix shown in FIG. 2D1. With that flip-flop set to the N state, cryotrons 344 through 349 will be resistive. Thus the current on the Ternary Counter Character 1, Bit $n$, $1_T$ (one of the three lines $M_T$, $0_T$, $1_T$) line will pass through the gates of cryotrons 350 and 360 on to the next flip-flop in that row. Likewise, all the currents representing Character 1 will be passed onto the next flip-flop in the first row.

With the leftmost flip-flop of the first row set to A, then the gates of cryotrons 360 through 369 will be resistive. The current on the Ternary Counter Character 1 Bit $n$, $1_T$ line will go through cryotron 344 and 351 to the Memory Character 1, Bit $n$, $1_M$ line going down the first column and into the Select Register (FIG. 2G) and into the first character positions of the Word Registers to perform a memory interrogation. Likewise, all the currents representing Character 1 will be directed down the first column and into the Select Register.

With the ternary flip-flop of the Character Select Matrix in the D state, cryotrons 350 through 359 will be resistive. The current on the Ternary Counter Character 1, Bit $n$, $1_T$ line will pass through the gate of cryotrons 344 and 361 to the Memory Character 1, Bit $n$, $0_M$ line going down the first column. Also the current on the Ternary Counter Character 1, Bit $n$, $0_T$ line will go through the gates of cryotrons 345 and 353 to the Memory Character 1, Bit $n$, $1_M$ line, and the current on the Ternary Counter Character 1, Bit $n$, $M_T$ line will go through the gate of cryotron 346 to the Memory Character 1, Bit $n$ ,$M_M$ line of the first column. Thus, with the upper, leftmost flip-flop of the Character Select Matrix set to the D state, all the information coming into such flip-flop will be complemented and directed into the first column of memory. The complement of M, 0, and 1 is M, 1, and 0 respectively. The complement output results in a descending sort.

*(4) Determining the starting operating position of the ternary counter*

The Character Select Matrix is also used at the start of a sort operation to determine the operating position of the Ternary Counter. You will recall that at the start of a sort operation, the Operating Position of the Ternary Counter is at the high order position of the sort, which is determined by the number of characters being sorted. Note the current sources +33 and +35 to the left of the ternary flip-flops in the Character Select Matrix in FIGS. 2D1 and 2D2. These sources supply current on to either the Used or Not Used lines for each character row. For instance, current from source +33 will travel through the gates of cryotrons 438 and 440 to the Not Used line when the upper left ternary flip-flop of the Character Select Matrix is in the N state. With such flip-flop in either the A or D state, this current will be directed through the gate of cryotrons 442 to the Used line. Refer now to the next ternary flip-flop of the first character row (FIG. 2E1) and note that if this flip-flop is in the A or D state and there is current coming in on the Not Used (N) line, it will be directed through the gate of cryotrons 448 to the Used (U) line. Thus if there is a flip-flop set to either A or D in any character position of this row, there will be current on the U line; otherwise the current will be on the N line. These lines then direct the current up into FIG. 2B to control the sort TS on signal which will establish the operating position in the Ternary Counter.

(B) *Match indicator.*—The Match Indicator is a storage type circuit that indicates whether there has been 0, 1, 2 or P (more than 2) matched Word Registers during the last memory interrogation. The Match Indicator is used to control sorting, resetting of the Mark Bits, and may also be interrogated by the computer program to control other functions.

The TS off current coming up the Count line 0, 1, 2 or P sets the Match Indicator (FIG. 2C3) respectively to a 0, 1 2, or P with the aid of cryotrons 254 through 265. For example, the current coming in on the 0 Count line would make the gates of cryotrons 254, 255, and 256 resistive, thus establishing superconducting current on the 0 line of the Match Indicator. Interrogation of the Match Indicator by the computer program is provided by the output circuit with current source +19 and ending with current sink −21 and using cryotrons 266 through 277. For example, with current coming down the 0 line of the Match Indicator, the gates of cryotrons 269, 272 and 275 will be resistive. Thus current from source +19 will be established on the 0 output line passing through the superconducting gates of cryotrons 268, 267, and 266 and through a "0" output coil to the current sink −21. Current through the "0 output" coil would actuate a suitable indicating circuit or mechanism not shown.

(C) *Ternary counter.*—We have already discussed the read out of the Ternary Counter, the transfer of information from the Ternary Bit Register into the Ternary Echo Bit Register (see Character Select Matrix), the resetting of the Ternary Counter and the input of a constant into the Ternary Counter prior to the start of a sort operation (see Enter Ternary Counter Switch). These all take place during TS off time. We will now discuss the advancing of the Ternary Counter which takes place during the Sort, TS on time.

The current source +37, in the upper right part of FIG. 2C2, feeds current through the gates of cryotrons 514, 502, 503, and 504 on to the Sort, TS on line during the Sort, TS on time. The current on the Sort TS on line then sets the P2 Bit to 1 by going through the gates of cryotrons 528 and 529 and the control of cryotron 530 (FIG. 2C1) when the Match Indicator is in the 2 or P state. If the Match Indicator (MI) is in the 1 state, then the current on the Sort TS on line would pass through the gates of cryotrons 531, 532 and 600 and the control of cryotron 533 setting the P2 Bit to 0. If the *MI*—0, then the current would pass through the gates of cryotrons 601, 602, and 603 and not change the state of the P2 Bit. The current then continues on the Sort TS on line going into the Ternary Counter (FIG. 2B).

Note, during any operation other than a sort operation, at TS on time, the current from source +37 is bypassed to current sink —39 by going through the gate of cryotron 501. Also, during TS off time, the current from source +37 is sent through the gate of cryotron 513 on to the TS off line. The current on the TS off line transfers the information from the P2 Bit to the P2 Echo Bit (P2EB) by going into the transfer circuit consisting of cryotrons 535 through 537. The current then continues on the TS off line going into FIG. 2B).

Refer to the right of FIG. 2B2 and note the Sort Bit, the Sort Echo Bit, and the TS off and Sort, TS on lines coming into these bits. The current on the TS off line transfers the information from the Sort Bit into the Sort Echo Bit. With the Sort Bit in the 0 state, cryotron 509 will be resistive, thus the current on the TS off line will go through the control of cryotron 506 setting the Sort Echo Bit to 0, and then through the gate of cryotron 507 to current sink —39. Likewise, a 1 stored in the Sort Bit is transferred to the Sort Echo Bit.

The first time that current appears on the Sort TS on line, it will pass through the gate of cryotrons 511, since the Sort Echo Bit will be in the 0 state (see Enter Ternary Counter Switch), and then through the control of cryotron 512, setting the Sort Bit to 1. With the Enter Ternary Counter switch set to the No Entry (N) state, the current on the 1st Sort, TS on line will then pass through the gate of cryotron 511 and then approach the Character N and U lines coming from the Character Select Matrix. The current will then be directed onto one of the 1st Sort, TS on lines for one of the Characters 1 through N of the Ternary Counter, depending on the status of Not Used (N) and Used (U) lines coming from the Character Select Matrix. Gates of cryotrons 519, 520, 521, 522, with other cryotron gates not shown, form a priority circuit to determine the highest order, used character position of the Ternary Counter. Since there will be current on the Sort, TS on line only in the case of a sort operation, and since at least one character position of the Ternary Counter (Character 1) should be used if there is to be a sort, current on the N line for Character 1 will indicate an error. In this case current from the 1st sort, TS on line will pass through the gate of cryotron 519 to the Error line. If Character position 1 is the only position used, current will be on the U line for Character 1 and on the N lines for all other characters. In this case, current from the 1st sort, TS on line will pass through the gate character 520 to the 1st Sort, TS on, Character 1 line and then in to Bit 1 of character N of the Ternary Counter to set that bit position to 0. If *N*—1 characters are used, current from the 1st Sort, TS on line will pass through the gates of cryotrons 520, 521, and others not shown onto the 1st Sort, TS on, Character *N*—1 line and then into Bit 1 of character *N*—1 (not shown) of the Ternary Counter to set that bit position to 0. Finally, if all N characters are used, the current on the 1st Sort, TS on line will pass through the gates of cryotrons 520, 522, and others not shown onto the 1st Sort, TS on, Character N line and then into Bit 1 of Character N of the Ternary Counter to set that bit position to 0.

Since the ternary positions are almost identical, the exceptions will be noted and it will be necessary to discuss only the details of one bit position. Refer to Bit 1 of Character 1 of the Ternary Counter as shown in FIG. 2B1 and note that any current on the 1st Sort, TS on, Character 1 line will go into the Advance (ADV) line and advance the state of that position from its previous setting of M (recall that prior to a sort operation all Ternary Counter bit positions have been set to their respective M states) to 0 by going through the gates of cryotrons 518 and 519 and the controls of cryotrons 524 and 525 (FIG. 2B4) and then to current sink —39 through the gate of cryotron 595 (FIG. 2A4). This establishes the operation position (OP) whose identity is defined as the rightmost, i.e. lowest ordered bit position of the Ternary Counter whose state is either 0 or 1. Note the exception from symmetry here in that only the first bit of each character may accept an advance (ADV) signal during the 1st Sort, TS on time.

Now during the TS off time, following the 1st Sort, TS on time, the 1 in the Sort Bit flip-flop of the Ternary Counter will be transferred to the Sort Echo Bit. Thus during the second and succeeding Sort, TS on times, the current on the Sort TS on line will be directed through the gate of cryotron 510 to the Sort, TS on, Except 1st line where it feeds into the Match Indicator, Duplicate Bit, Duplicate Echo Bit, and P2 Bit and P2 Echo Bit circuits (FIG. 2C).

When sorting, the Match Indicator (MI), Duplicate Bit (DB), Duplicate Echo Bit (DEB), the P2 Bit and P2 Echo Bit (P2EB) are used to establish the proper input and control currents going into the Ternary Counter. The rules by which these input and control currents are determined were stated earlier, but they are repeated here.

*Rule 1.*—When the *MI*=2 or P, if the OP is the lowest order position of the Ternary Counter, indicating multiple like sorting keys, select the first matched register and mark the selected register; if the OP is not the lowest order, do not select. Also when the *MI*=2 or *P*, the NP is to be advanced in preparation for the succeeding interrogation. It should be observed that when the OP is the lowest order position of the Ternary Counter, the state of the Ternary Counter does not change until all multiple like sorting keys have been retrieved, at which time the Mark Bits are reset.

*Rule 2.*—When *MI=1* (except when Rule 5 applies), retrieve the matched word and advance the OP.

*Rule 3.*—When *MI*=0, do not retrieve but advance the OP.

*Rule 4.*—At the start of a Match Indicator Cycle, record the position of the OP. The Match Indicator Cycle is defined as starting when the *MI*=2 and ending when the *MI*=1, providing that at some time between these two indications there was a *MI*=1 or a *MI*=$2_M$ where $2_M$ means a *MI*=2 during a multiple like tag.

*Rule 5.*—At the end of a Match Indicator Cycle, reset to M all Ternary Counter positions to the right of the recorded position (see Rule 4) and advance the checked position. Also retrieve the matched word and reset the recorded bit.

*Rule 6.*—When *MI*=0, which has been preceded by either a *MI*=2 or *P*, advance the NP and do not select. But since Rule 3 also applies, the OP is also simultaneously advanced.

Four input lines are needed to carry the currents that satisfy these rules for advancing the Ternary Counter. In addition, two control lines are required in order to satisfy Rule 6. Table 2 lists the four input and two control lines that carry current when the rules indicated are satisfied.

TABLE 2

| Name of Line | Rules Satisfied |
|---|---|
| Input lines: | |
| 1. Adv. OP | 2, 3 |
| 2. Set to M | 5 |
| 3. Check OP | 4 |
| 4. Adv. NP | 1 |
| Control lines: | |
| 1. P2EB=1 | 6 |
| 2. P2EB=0 | All except 6 |

Refer to FIG. 2C and note the Duplicate Bit and Duplicate Echo Bit that are tri-state devices or ternary bits. They tell the past history of the Match Indicator. That is to say, at the start of the Match Indicator cycle, these ternary bits are each in the Reset (R) state. (See Enter Ternary Counter Switch.) At the start of a Match Indicator Cycle (the first $MI=2$ condition), the Duplicate Bit is set to the Duplicate (D) state. At the next TS off cycle, the D state of the Duplicate Bit is transferred to the Duplicate Echo Bit. Then on any subsequent TS on time, when $MI=1$ or $MI=2_M$, the Duplicate Bit is set to the Single (S) state. The Duplicate Bit is returned to the Reset (R) state when the Duplicate Echo Bit is in the S state and the Match Indicator is in the 1 state. It should be noted that the Duplicate Bit is set during the Sort, TS on (Except 1st) time according to the state of the Match Indicator, the low order bit of the Ternary Counter, and the Duplicate Echo Bit. The information is transferred from the Duplicate Bit to the Duplicate Echo during the TS off time by the transfer circuit consisting of cryotrons 485 through 496.

Referring to the four Ternary Counter input lines noted above, we can say that the current on these lines is a function of the state of the Duplicate Echo Bit (DEB) and the Match Indicator. Thus, there will be current on the ADV. OP line when $MI=0$, passing through the gates of cryotrons 450, 451, and 452, or when $MI=1$ and the *Duplicate Echo Bit=R* or *D*, passing respectively through the gates of cryotrons 453, 454, 455, 456, and 457 or through the gates of cryotrons 453, 454, 455, 458, and 459. Note, that in addition, when the $DEB=D$ and the $MI=1$, the current on the line passing through the gates of cryotrons 453, 454, 455, 458, and 459 will set the Duplicate Bit to the S state by making cryotrons 460 and 461 resistive.

Current will appear on the Set to M line when $MI=1$ and *Duplicate Echo Bit=S*, passing through the gates of cryotrons 453, 454, 455, 462, and 463. The current appearing on the Set to M line also sets the Duplicate Bit to R by going through the controls of cryotrons 464 and 465. Current will be on the Check OP line when $MI=2$ and *Duplicate Echo Bit=R* by going through the gates of cryotrons 466, 467, 468, 469 and 470. Note that the current on the Check OP line will also set the Duplicate Bit to D by going through the controls of cryotrons 471 and 472.

There will be current on the Adv. NP line when $MI=2$ and $DEB=D$ or $S$ by going through the gates of cryotrons 466, 467, 488 and 473 or when $MI=P$ by going through the gates of cryotrons 474, 475, 476. Refer to FIG. 2B1 and note the lowest order bit position of the Ternary Counter, namely, bit *n* of character position 1. When this position is in either the 0 or 1 state, indicating a multiple like tag since MI has already been indicated as equal to 2 or P, the current on the Adv. NP line will be directed through the gate of cryotron 606 of bit *n* of character position 1 onto the Multiple Like Tag (MLT) line. The current on this line then passes into the Duplicate Bit ternary bit and Duplicate Echo Bit ternary bit shown in FIG. 2C1. Here it will set the Duplicate Bit to the S state if $DEB=D$ by going through the controls of cryotrons 607 and 608 and the gates of cryotrons 609 and 610. If $DEB=R$ or $S$, the current will not change the state of the DB by going through the gate of cryotron 611. At this point, as was noted before, retrieval of multipel like tags will continue with the unchanged latest setting of the Ternary Counter until all matched words are retrieved.

The two Control lines, *P2 Echo*=0 and 1, are a function of the Timing Signal, the Match Indicators, and the P2 Echo Bit. During TS on time, there will be current on the *P2 Echo*=0 line when $MI=0$ and the P2 Echo Bit equals 0. This current will pass through the gates of cryotrons 477, 478, 479, 480 and 483 (FIGS. 2C1 and 2C2) and then into the Ternary Counter. There will also be current on the *P2 EB*=0 line when the $MI=1$, 2 or $P$ and TS is in the On condition, such current passing through the gates of cryotrons 477 and 481. When $MI=0$ and the *P2 Echo Bit*=1, the current during TS on time will pass through the gates of cryotrons 477, 478, 479, 480, and 482 on to the *P2 Echo*=1 line.

How the currents on these six lines change the state of the Ternary Counter will now be discussed. First of all we should note that the current on any of the input lines (Adv. OP, Set to M, Check OP, Adv. OP) is mutually exclusive. Also note that there will always be current on either one of the control lines during TS on time.

Refer to Bit 1 of Character 1 (FIG. 2B) of the Ternary Counter and note its comprising elements, namely, Check Bit (CB), Check Echo Bit (CEB), Ternary Echo Bit (TEB), and the Ternary Bit (TB). The CB is a binary flip-flop whose 1 state indicates that this bit position of the Ternary Counter was the OP at the start of a Match Indicator Cycle (see Rule 4). The CEB is set equal to the CB during the TS off time and at the end of the Match Indicator Cycle such CEB is tested in order to locate the checked or recorded ternary position. The TEB is set equal to the TB during a Sort TS off time (see Character Select Matrix) and during the TS on time the TEB is interrogated by current on either the Adv. NP, Check OP, or Adv. OP line to determine whether that position is the OP. Also when a ternary position is to be advanced, the state of the TEB determines what state the TB is to be set to. Another purpose of the TEB is, when a carry is generated, the TEB is tested to see if the sort operation is completed. An indication of an end of sort is when the carry signal is sent to a next higher ordered ternary position whose TEB is in the M state. The TB is a three state storage device having states M, 0, and 1 which is set during the Sort, TS on times or during a TS off time when a constant is entered into the ternary counter (see Enter Ternary Counter).

Looking at the detail of this ternary position, notice how the current on either the Adv. NP, Check OP, or the Adv. OP locates the OP. If the Bit 1 of Character 1 position of the Ternary Counter were in the M state, the current on any of such three lines would respectively pass through cryotrons 582 and 583, 585 and 586, or 587 and 588 (FIG. 2B1) on to the next higher ordered position. However, with the position in either a 0 or 1 state the current appearing on either the Adv. NP, Check OP, or Adv. OP line will be bypassed through cryotrons 581, 584, or 589, respectively. The position where the current on these three input lines is bypassed off of these lines is the OP.

Assume that Bit 1 of Character 1 of the Ternary Counter is the OP. Any current on the Adv. OP line will pass through the gate of cryotron 589 to the Adv. line which feeds the advancing circuit. The advancing circuit consisting of cryotrons 516 through 527 (FIGS. 2B1 and 2B4) reads the state of the TEB and sets the state of the TB such that the state of the TB will be M, 0, or 1 if the state of the TEB were 1, M, or 0, respectively. For example, assume the state of the $TEB=0$, then the current on the Adv. line would pass through the gates of cryotrons 516 and 517 down to the controls of cryotrons 526 and 527 setting the TB to the 1 state. Any current on the Adv. NP line will be directed through the gate of cryotron 581 to the Adv. line of the next position. The direction of the arrows on the lines indicates the direction of current flow on these lines. Thus any current appearing on the Adv. NP line will advance the next position. The current on the Check OP line will pass through the gate of cryotron 584, through the control of cryotron 577, setting the $CB=1$ which is the manner of recording the start of a Match Indicator Cycle, and then into the Advance line of the next bit position. This satisfies Rule 4.

Assume the end of a Match Indicator Cycle; current will appear on the set to M line (Rule 5). The current on the set to M line will first set the TB of the lowest order position to M and then interrogates the state of the CEB of the next higher ordered position. The Check Bit and Check Echo Bit are not employed in the low order ternary position in that they do not produce any saving of interrogation cycles in that position. Looking at Bit 1 of Character 1, if the $CEB=0$, then the current on the Set to M line will pass through the gate of cryotron 576, through the control of cryotrons 579 and 580, setting that $TB=M$ and then into the next higher ordered position. If the $CEB=1$, then the current on the set to M line would pass through the gate of cryotron 575, through the control of cryotron 578, setting the corresponding $CB=0$, and then into the Adv. line of that position. Thus the current on the set to M line resets to M all positions to the right of the checked or recorded position, resets to 0 the CB of the checked position, and advances the TB of the checked position. This satisfies Rule 5.

The Check Bit and Check Echo Bit also contain cryotron 570 and cryotrons 571 through 574. The current on the Reset Line goes through the control of cryotron 570 to set the $CB=0$ (see Enter TC Switch). Cryotrons 571 through 574 make up the transfer circuit which transfers the information in the CB to the CEB during TS off time.

The TEB cryotrons that have not yet been discussed are 592 through 594. These cryotrons direct the carry signal coming into the TEB either to the Advance line or End of Sort line. Note that there will be current on the Carry line when the next lower position has been advanced from the 1 to the M state. Such current on the carry line will pass through the gate of cryotron 592 to the Advance line if the $TEB=0$ or 1. If the $TEB=M$, the current on the carry line will pass through the gates of cryotrons 593 and 594 to the End of Sort line going to current sink −39, indicating an end of sort operation.

A look at Table 2 indicates that there will be current on both the *ADV. OP* and $P2\ EB=1$ lines when Rule 6 is satisfied. When this rule applies, the OP will be in the 0 state and the NP will be in the M state. Assume that Bit 1 of Character 1 is the OP, and note that the current on the $P2\ EB=1$ line makes cryotron 595 resistive. Thus the current on the Adv. OP line will be directed through the gates of cryotrons 589, 516, 517, through controls of cryotrons 526, 527, and through the gate of 596 to the Set to 0 line going into the NP. Assuming Bit N is the NP, the current on the Set to 0 line sets the TB to 0 by going through the controls of cryotrons 590 and 591. Another look at Table 2 will show that there will be current on the $P2\ EB=0$ line at all times except when Rule 6 is satisfied. The current on $P2\ EB=0$ line makes cryotron 596 resistive. So any current on either the advance to 0 or 1 line of the advancing circuit will be passed through the gate of cryotron 595 to current sink −39.

The detailed description of the manner in which the four input lines to the Ternary Counter, namely, Adv. OP, Set to M, Check OP and Adv. OP are actuated as well as the manner in which the control lines $P2\ EB=1$ and $P2\ EB=0$ are made to carry superconducting current enable one to follow the chosen algorism for carrying out a sort, be it ascending or descending. This sort permits one to obtain an ordered retrieval of randomly stored words in memory and the controls remain relatively few, whereas the number of words in memory is very large and the number of bits per word is also larger than conventional memories. The present associative memory can perform many versatile operations, such as a first-in-first out sort, search for the nearest match in a randomly ordered array of words, a retrieval of words lying between a given range, etc. Table 3, appearing under heading G entitled "Combinations of Memory Control Switches," lists the various combinations of Memory Control Switch settings for obtaining different operations. By selecting the appropriate settings one may obtain entries into and exits from memory in accordance with the wishes of the programmer and may obtain the diversified sorting operations shown in such Table 3.

Since future memories must be of very large capacity yet be relatively small in size, the present associative memory is exceedingly compatible with such future memories in that it is designed to perform very rapid operations on large memories without taking such words out of memory, and such operations can be performed on an entire word or portions of a word.

What is claimed is:

1. An associative memory system having word storage wherein the latter are randomly stored in a plurality of registers,
   - means for locating the lowest-ranking word in such randomly stored array of words without removing said word from said plurality of registers, and
   - further means for locating all higher ranking words in an ordered sequence without removing said words from their random order in the said register memory.

2. An associative memory system having word storage which are randomly stored in a plurality of parallel registers, each word being stored in binary form and having a bit position corresponding to different orders of a word, a tag register corresponding to preselected bit positions of each word in memory, means including a selector switch for making a parallel simultaneous comparison of each of said preselected bit positions of each word of every said parallel register with said tag register, and means for actuating said selector switch prior to a comparison so as to alter the relative order of the bits in memory with respect to said tag register without physically changing the position of said preselected bits in memory.

3. A system for performing an ordered retrieval of information stored as binary words in random order in a plurality of parallel registers including a ternary counter having a plurality of ternary bit positions, each ternary bit position having three stable states identified as M, 0 and 1 and there being a ternary bit position for each binary position of interest in said parallel registers, a selection matrix for associating the same order bit positions of the ternary counter with the same order positions of the bits in each word register wherein the M state of a ternary counter bit position bypasses a comparison between itself and its corresponding bit position in memory, means for making a simultaneous comparison of the content of the highest ordered bit positions in each word register with the highest ordered bit position of said ternary counter, a match indicator circuit for indicating whether there are 0, 1 or a plurality of matches between said highest orderd ternary bit position and said highest ordered bit positions in memory, and means for advancing the ternary counter in response to the number of matches existing between the ternary counter bit position state and the respective states of the corresponding same order bit positions in memory.

4. Means for providing a sorting of binary words stored in a random fashion in memory, each word having a plurality of characters that are set in an ordered fashion with higher ordered characters being placed physically to the left of lower ordered characters in each of such words, an interrogation register having a plurality of characters that are also set in an ordered fashion with higher ordered characters being placed physically to the left of lowe ordered characters in such interrogation register, and a matrix switch for associating any odered character position in the interrogation register with any ordered character position in memory.

5. The invention as defined in claim 4 wherein means are provided for complementing the output of the interrogation register contents when said matrix switch makes its association.

6. Means for providing a sorting of binary words stored in a random fashion in memory, each word having a plurality of characters wherein higher ordered characters are placed physically to the left of lower ordered characters in each of such words, an interrogation register capable of containing a plurality of characters also arranged therein so that higher ordered characters are placed physically to the left of lower ordered characters therein, a means for performing a simultaneous comparison of the character contents of the interrogation register with preselected character contents of all words in memory as part of a sorting opeartion without removing such words from their locations in memory, and a matrix switch actuable to associate a high ordered character in said interrogation register with a low ordered character in said word registers so that such low odered character is treated as a high ordered character during a sorting operation without changing the physical location of said low ordered character in memory.

7. The invention as defined in claim 6 including means for simultaneously performing an ascending sort of certain memory character positions and a descending sort of other memory character positions.

8. A system for performing an ordered retrieval of information stored as words in random order in a plurality of parallel registers, said words being composed of characters whose high to low order proceeds from left to right, an interrogation register for storing a plurality of character positions forming a key word whose high ordered characters are placed physically to the left of lower ordered characters in said interrogation register, means for making a simultaneous comparison of the highest ordered character position of the key word with the corresponding highest ordered character in all words in memory without removing the latter from their positions in such memory, means for indicating the number of words in memory whose respective highest ordered character matches the highest ordered character in said interrogation register, means for altering the contents of said interrogation when there is a plurality of such matches so that the highest and next highest characters in the interrogation register are simultaneously compared with the corresponding characters in all the words in memory, and means for making alterations in the contents of said interrogation register to include a word having additional low ordered characters until a single match is indicated between the content of the interrogation register and the words in memory.

References Cited by the Examiner

UNITED STATES PATENTS

| | | | |
|---|---|---|---|
| 2,973,508 | 2/1961 | Chadurjian | 340—174 |
| 3,017,610 | 1/1962 | Auerbach et al. | 340—172.5 |
| 3,030,609 | 4/1962 | Albrecht | 340—172.5 |
| 3,031,650 | 4/1962 | Koerner | 340—173 |
| 3,093,814 | 6/1963 | Wagner et al. | 340—173.1 |
| 3,170,142 | 2/1965 | Astrahan | 340—172.5 |

OTHER REFERENCES

Pages 115–120, December 1956, Slade et al., A Cryotron Catalog Memory System, Proceedings of the Eastern Joint Conference.

Pages 179–187, December 13–15, 1960, Seeber, "Associative Self-Sorting Memory," Proceeding of the Eastern Joint Computer Conference, vol. 18.

ROBERT C. BAILEY, *Primary Examiner.*

MALCOLM A. MORRISON, *Examiner.*

P. J. HENON, *Assistant Examiner.*